United States Patent
Ding et al.

(10) Patent No.: US 11,325,995 B2
(45) Date of Patent: May 10, 2022

(54) METALLOCENE CATALYSTS FOR POLYETHYLENE

(71) Applicant: CHEVRON PHILLIPS CHEMICAL COMPANY LP, The Woodlands, TX (US)

(72) Inventors: Errun Ding, Bartlesville, OK (US); Qing Yang, Bartlesville, OK (US); Carlton E. Ash, Owasso, OK (US); Randall S. Muninger, Dewey, OK (US); Jim B. Askew, Barnsdall, OK (US); Zhou Chen, Tulsa, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 89 days.

(21) Appl. No.: 16/797,875

(22) Filed: Feb. 21, 2020

(65) Prior Publication Data
US 2021/0261697 A1    Aug. 26, 2021

(51) Int. Cl.
| C07F 17/00 | (2006.01) |
| C08F 4/6592 | (2006.01) |
| C08F 210/16 | (2006.01) |
| C08F 10/02 | (2006.01) |

(52) U.S. Cl.
CPC .......... *C08F 4/65927* (2013.01); *C07F 17/00* (2013.01); *C08F 10/02* (2013.01); *C08F 210/16* (2013.01)

(58) Field of Classification Search
CPC ..... C07F 17/00; C08F 4/65927; C08F 210/16
See application file for complete search history.

(56) References Cited

U.S. PATENT DOCUMENTS

| 3,242,099 | A  | 3/1966  | Manyik et al. |
| 4,794,096 | A  | 12/1988 | Ewen |
| 4,808,561 | A  | 2/1989  | Welborn, Jr. |
| 5,576,259 | A  | 11/1996 | Hasegawa et al. |
| 5,807,938 | A  | 9/1998  | Kaneko et al. |
| 5,919,983 | A  | 7/1999  | Rosen et al. |
| 6,107,230 | A  | 8/2000  | McDaniel et al. |
| 6,165,929 | A  | 12/2000 | McDaniel et al. |
| 6,294,494 | B1 | 9/2001  | McDaniel et al. |
| 6,300,271 | B1 | 10/2001 | McDaniel et al. |
| 6,316,553 | B1 | 11/2001 | McDaniel et al. |
| 6,355,594 | B1 | 3/2002  | McDaniel et al. |
| 6,376,415 | B1 | 4/2002  | McDaniel et al. |
| 6,391,816 | B1 | 5/2002  | McDaniel et al. |
| 6,395,666 | B1 | 5/2002  | McDaniel et al. |
| 6,524,987 | B1 | 2/2003  | Collins et al. |
| 6,548,441 | B1 | 4/2003  | McDaniel et al. |
| 6,750,302 | B1 | 6/2004  | McDaniel et al. |
| 6,831,141 | B2 | 12/2004 | McDaniel et al. |
| 6,936,667 | B2 | 8/2005  | Jensen et al. |
| 6,992,032 | B2 | 1/2006  | McDaniel et al. |
| 7,026,494 | B1 | 4/2006  | Yang et al. |
| 7,041,617 | B2 | 5/2006  | Jensen et al. |
| 7,064,225 | B2 | 6/2006  | Thom et al. |
| 7,148,298 | B2 | 12/2006 | Jensen et al. |
| 7,199,073 | B2 | 4/2007  | Martin et al. |
| 7,226,886 | B2 | 6/2007  | Jayaratne et al. |
| 7,294,599 | B2 | 11/2007 | Jensen et al. |
| 7,312,283 | B2 | 12/2007 | Martin et al. |
| 7,470,758 | B2 | 12/2008 | Jensen et al. |
| 7,501,372 | B2 | 3/2009  | Thorn et al. |
| 7,517,939 | B2 | 4/2009  | Yang et al. |
| 7,576,163 | B2 | 8/2009  | Yang et al. |
| 7,601,665 | B2 | 10/2009 | McDaniel et al. |
| 7,619,047 | B2 | 11/2009 | Yang et al. |
| 7,629,284 | B2 | 12/2009 | Jensen et al. |
| 7,678,934 | B2 | 3/2010  | Hirota et al. |

(Continued)

FOREIGN PATENT DOCUMENTS

| EP | 3031831 B1 | 6/2019 |
| WO | 1999014219 A1 | 3/1999 |
| WO | 2001053362 A1 | 7/2001 |

OTHER PUBLICATIONS

International Search Report and Written Opinion issued in corresponding application No. PCT/US2021/018439, dated Jun. 15, 2021, 10 pages.
IUPAC Compendium of Chemical Terminology, 2nd Ed. (1997).
Hawley's Condensed Chemical Dictionary, 11 Ed., John Wiley & Sons, 1995, 3 pages.
Cotton et al., "Advanced Inorganic Chemistry," 6th Ed., Wiley-Interscience, 1999, 4 pages.

(Continued)

*Primary Examiner* — Caixia Lu
(74) *Attorney, Agent, or Firm* — Eversheds Sutherland (US) LP

(57) ABSTRACT

Disclosed are metallocene compounds, catalyst compositions comprising a metallocene compound, processes for polymerizing olefins, methods for making catalyst compositions, olefin polymers and articles made from olefin polymers. In an aspect, a metallocene compounds contain a fluorenyl ligand and a cyclopentadienyl ligand which are bridged by a linking group, in which the metallocene is characterized by [1] the cyclopentadienyl ligand being substituted with a $C_2$-$C_{18}$ heterohydrocarbyl group having an oxygen atom positioned 5 atoms distance or less from the cyclopentadienyl ligand and [2] the linking group having a pendant $C_3$-$C_{12}$ alkenyl group having a terminal C=C double bond. It has been discovered that a catalyst composition comprising a metallocene compound having these features can produce polyethylene having a low melt index in the absence of a second metallocene.

27 Claims, 2 Drawing Sheets

(56) References Cited

U.S. PATENT DOCUMENTS

| | | |
|---|---|---|
| 7,732,542 B2 | 6/2010 | Yang et al. |
| 7,884,163 B2 | 2/2011 | Benham et al. |
| 8,637,691 B2 | 1/2014 | Yang et al. |
| 9,637,566 B2 | 5/2017 | Kwon et al. |
| 10,239,975 B2 | 3/2019 | McDaniel et al. |
| 10,870,712 B2 * | 12/2020 | Song .................. C08F 4/61922 |
| 2010/0076167 A1 | 3/2010 | McDaniel |

OTHER PUBLICATIONS

Hieber et al., entitled "Some correlations involving the shear viscosity of polystyrene melts," Rheologica Acta, 1989, vol. 28, pp. 321-332.

Hieber et al., entitled "Shear-Rate-Dependence Modeling of Polymer Melt Viscosity," Polymer Engineering and Science, 1992, 32(14), pp. 931-938.

Bird et al., entitled "Dynamics of Polymeric Liquids," vol. 1, Fluid Mechanics, 2nd Edition, John Wiley & Sons, 1987, 3 pages.

\* cited by examiner

METALLOCENE CATALYSTS FOR POLYETHYLENE

TECHNICAL FIELD OF THE DISCLOSURE

This disclosure relates to catalysts and catalyst compositions for producing polyethylene, including linear low density polyethylene, and processes for preparing the same.

BACKGROUND OF THE DISCLOSURE

Polyethylene is useful for the fabrication of numerous products such as films, food service articles, fuel tanks, geomembranes, medical devices, pipe, molded articles of all types, and many other polyethylene (PE) products. The production of polyethylene can be carried out using metallocene catalysts. However, there remains a need for new metallocene-based catalyst compositions for the production of polyethylene having desired properties, such as a low melt index (MI).

One challenge in the production of LLDPE is to develop a single metallocene which can be used in the catalytic process to make a low melt index polymer. Therefore, new metallocenes having a low hydrogen response would be useful, because they may provide LLDPE having the desired properties such as relatively higher molecular weight and low MI and also relatively narrow molecular weight distributions in the presence of hydrogen.

SUMMARY OF THE DISCLOSURE

This disclosure provides for metallocene compounds, catalyst compositions comprising a metallocene compound, processes for polymerizing olefins, methods for making catalyst compositions, olefin polymers and copolymers and articles made from olefin polymers and copolymers. In an aspect, this disclosure describes metallocene compounds, catalyst compositions, and process for using the catalyst compositions to prepare polyethylene including linear low density polyethylene (LLDPE), in which the polymerization can be conducted with a single metallocene. The metallocene catalysts have a relatively low hydrogen response such that the catalyst compositions and processes can provide low melt index (MI) and relatively narrow molecular weight distribution polyethylene.

The metallocene-based catalyst composition can further comprise a co-catalyst such as an organoaluminum compound, and an activator (or "activator-support") such as a solid oxide treated with an electron-withdrawing anion. Other activators for the new metallocenes can be used including aluminoxanes such as methylaluminoxane, an organoboron compound, a borate or organoborate activator, an ionizing ionic compound, and the like. In one aspect, both a co-catalyst such as an alkylation agent and an activator can be used in forming the catalyst composition.

In one aspect, this disclosure provides a metallocene compound having the formula: $(X^1)(X^2)(X^3)(X^4)M^1$, wherein $M^1$ is titanium, zirconium, or hafnium; $X^1$ is a substituted or an unsubstituted fluorenyl ligand, wherein any substituent is selected independently from a $C_1$ to $C_{12}$ hydrocarbyl or a $C_1$ to $C_{12}$ heterohydrocarbyl; $X^2$ is a cyclopentadienyl ligand substituted with a $C_2$-$C_{18}$ heterohydrocarbyl group comprising an oxygen atom positioned 5 atoms distance or less from the cyclopentadienyl ligand; wherein $X^1$ and $X^2$ are bridged by a linking group of the formula $>ER^1R^2$, wherein E is C or Si, $R^1$ is hydrogen or a $C_1$-$C_{12}$ hydrocarbyl group, and $R^2$ is an unsaturated $C_3$-$C_{12}$ alkenyl group having a terminal C=C double bond; and $X^3$ and $X^4$ are independently selected from a halide, hydride, a $C_1$-$C_{20}$ hydrocarbyl group, a $C_1$-$C_{20}$ heterohydrocarbyl group, tetrahydroborate, or $OBR^A{}_2$ or $OSO_2R^A$ wherein $R^A$ is independently a $C_1$-$C_{12}$ hydrocarbyl group.

Another aspect of this disclosure provides a catalyst composition for polymerizing olefins, the catalyst composition comprising: (a) metallocene compound having the formula $(X^1)(X^2)(X^3)(X^4)M^1$ as described immediately above; (b) optionally, a co-catalyst comprising an organoaluminum compound, an organoboron compound, an organozinc compound, an organomagnesium compound, an organolithium compound, or any combination thereof; and (c) an activator comprising a solid oxide treated with an electron-withdrawing anion (activator-support), an organoboron compound, an organoborate compound, an ionizing ionic compound, an aluminoxane compound, or any combination thereof. Accordingly, this disclosure also describes in an aspect a method of making a catalyst composition, the method comprising contacting in any order: (a) metallocene compound having the formula: $(X^1)(X^2)(X^3)(X^4)M^1$, as described immediately above; (b) optionally, a co-catalyst as described above; and (c) an activator as described above.

According to another aspect, this disclosure provides a process for polymerizing olefins, the process comprising contacting at least one olefin monomer and a catalyst composition under polymerization conditions to form an olefin polymer, wherein the catalyst composition comprises:

(a) metallocene compound having the formula:

$(X^1)(X^2)(X^3)(X^4)M^1$, wherein $M^1$ is titanium, zirconium, or hafnium;
$X^1$ is a substituted or an unsubstituted fluorenyl ligand, wherein any substituent is selected independently from a $C_1$ to $C_{12}$ hydrocarbyl or a $C_1$ to $C_{12}$ heterohydrocarbyl;
$X^2$ is a cyclopentadienyl ligand substituted with a $C_2$-$C_{18}$ heterohydrocarbyl group comprising an oxygen atom positioned 5 atoms distance or less from the cyclopentadienyl ligand;
wherein $X^1$ and $X^2$ are bridged by a linking group of the formula $>ER^1R^2$, wherein E is C or Si, $R^1$ is hydrogen or a $C_1$-$C_{12}$ hydrocarbyl group, and $R^2$ is an unsaturated $C_3$-$C_{12}$ alkenyl group having a terminal C=C double bond; and
$X^3$ and $X^4$ are independently selected from a halide, hydride, a $C_1$-$C_{20}$ hydrocarbyl group, a $C_1$-$C_{20}$ heterohydrocarbyl group, tetrahydroborate, or $OBR^A{}_2$ or $OSO_2R^A$ wherein $R^A$ is independently a $C_1$-$C_{12}$ hydrocarbyl group;

b) optionally, a co-catalyst comprising an organoaluminum compound, an organoboron compound, an organozinc compound, an organomagnesium compound, an organolithium compound, or any combination thereof; and c) an activator comprising a solid oxide treated with an electron-withdrawing anion, an organoboron compound, an organoborate compound, an ionizing ionic compound, an aluminoxane compound, or any combination thereof.

These and other embodiments and aspects of the processes, methods, and compositions including catalyst compositions are described more fully in the Detailed Description and claims and further disclosure such as the Examples provided herein.

DETAILED DESCRIPTION OF THE DISCLOSURE

General Description

Figure 1:
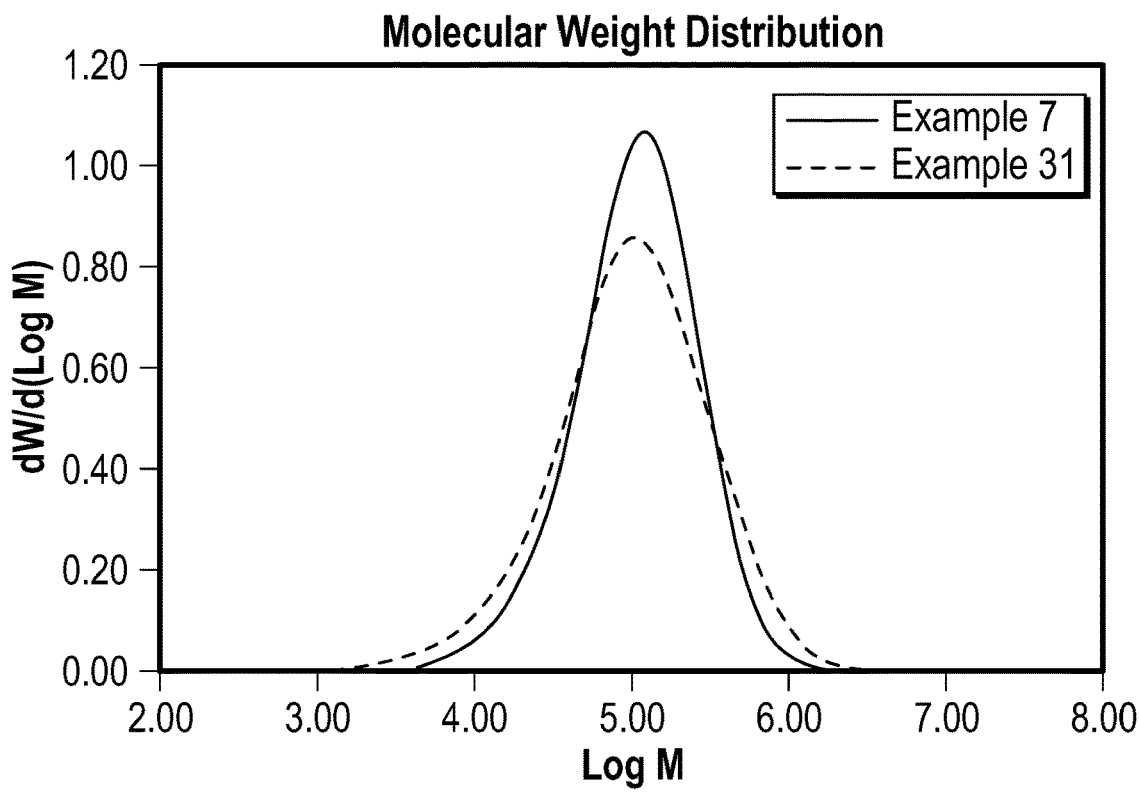
FIG. 1 illustrates the molecular weight distribution (MWD) profile comparison of two MI 0.25 dg/min polyethylenes, one produced using metallocene 1 according to Example 7 and the other produced using metallocene 4 according to Example 31.

This disclosure provides for new metallocene compounds, catalyst compositions comprising a metallocene compound, processes for polymerizing olefins, methods for making catalyst compositions, as well as olefin polymers and copolymers prepared as using the catalytic processes and articles made from the polymers. In an aspect, this disclosure provides for catalytic processes for polymerizing olefins to form a polyethylene using new metallocene-based catalyst compositions comprising a single metallocene compound. The metallocene catalyst can exhibit a low hydrogen response such that it can provide a low melt index which also has a relatively narrow molecular weight distributions in the presence of hydrogen, without the need to use an additional metallocene in the catalyst composition.

In one aspect, there is provided a metallocene compound which contains a substituted or unsubstituted fluorenyl ligand and a cyclopentadienyl ligand which are bridged by a linking group, in which the compound is characterized by [1] the cyclopentadienyl ligand being substituted with a $C_2$-$C_{18}$ heterohydrocarbyl group having an oxygen atom positioned 5 atoms distance or less from the cyclopentadienyl ligand and [2] the linking group having a pendant $C_3$-$C_{12}$ alkenyl group having a terminal C=C double bond. It has been surprisingly discovered that when such a metallocene is combined with an optional co-catalyst such as a organoaluminum compound and an activator such as a solid oxide treated with an electron withdrawing anion, the resulting catalyst composition can polymerize ethylene and an optional co-monomer to form relatively low melt index polyethylene using only the single metallocene compound as the catalyst in the presence of hydrogen.

In an aspect, and while not intending to be bound by theory, a co-catalyst such as trialkylaluminum compounds can function as alkylating agents and can be used when desired, such as when the metallocene is not already alkylated. Also while not intending to be bound by theory, an activator can function as a Lewis acid and can interact with the metallocene catalyst to form a cationic complex or incipient cationic complex, which can function as an active site for olefin polymerization. Activators can include, but are not limited to, a solid oxide treated with an electron-withdrawing anion (activator-support), an aluminoxane, an organoboron compound, a borate or organoborate compound, an ionizing ionic compound, or combinations thereof.

The solid oxide treated with an electron-withdrawing anion is fully described herein, and may also be referred to throughout this disclosure using terms such as a solid oxide that has been chemically-treated with an electron withdrawing anion, a chemically treated solid oxide (CTSO), a solid super acid (SSA), or an activator-support, and these terms are used interchangeably. Examples of the solid oxide that can be used to prepare the chemically-treated solid oxide include, but are not limited to, silica, alumina, silica-alumina, silica-coated alumina, aluminum phosphate, boehmite, heteropolytungstates, titania, zirconia, magnesia, boria, zinc oxide, silica-zirconia, silica-titania, or any combination thereof. Examples of the electron withdrawing anion and the source for the electron withdrawing anion may that can be used to prepare the chemically-treated solid oxide include, but are not limited to, fluoride, chloride, bromide, iodide, sulfate, bisulfate, fluorosulfate, fluoroborate, phosphate, fluorophosphate, trifluoroacetate, triflate, mesylate, thiosulfate, fluorozirconate, fluorotitanate, trifluoroacetate, and the like, Each of the catalyst composition components and processes for making and using the catalyst composition for polymerizing olefins is fully described herein. Definitions of terms that are used in this disclosure are set out.

Definitions

To define more clearly the terms used herein, the following definitions are provided, and unless otherwise indicated or the context requires otherwise, these definitions are applicable throughout this disclosure. If a term is used in this disclosure but is not specifically defined herein, the definition from the IUPAC Compendium of Chemical Terminology, $2^{nd}$ Ed (1997) can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Regarding claim transitional terms or phrases, the transitional term "comprising", which is synonymous with "including," "containing," or "characterized by," is inclusive or open-ended and does not exclude additional, unrecited elements or method steps. The transitional phrase "consisting of" excludes any element, step, or ingredient not specified in the claim. The transitional phrase "consisting essentially of" limits the scope of a claim to the specified materials or steps and those that do not materially affect the basic and novel characteristic(s) of the claimed invention. A "consisting essentially of" claim occupies a middle ground between closed claims that are written in a "consisting of" format and fully open claims that are drafted in a "comprising" format. Unless specified to the contrary, describing a compound or composition "consisting essentially of" is not to be construed as "comprising," but is intended to describe the recited component that includes materials which do not significantly alter composition or method to which the term is applied. For example, a feedstock consisting essentially of a material A can include impurities typically present in a commercially produced or commercially available sample of the recited compound or composition. When a claim includes different features and/or feature classes (for example, a method step, feedstock features, and/or product features, among other possibilities), the transitional terms comprising, consisting essentially of, and consisting of, apply only to feature class to which is utilized and it is possible to have different transitional terms or phrases utilized with different features within a claim. For example a method can comprise several recited steps (and other non-recited steps) but utilize a catalyst composition preparation consisting of specific steps but utilize a catalyst composition comprising recited components and other non-recited components. While compositions and methods are described in terms of "comprising" various components or steps, the compositions and methods can also "consist essentially of" or "consist of" the various components or steps.

The terms "a," "an," and "the" are intended, unless specifically indicated otherwise, to include plural alternatives, e.g., at least one. For instance, the disclosure of "an organoaluminum compound" is meant to encompass one organoaluminum compound, or mixtures or combinations of more than one organoaluminum compound unless otherwise specified.

The terms "configured for use" or "adapted for use" and similar language is used herein to reflect that the particular recited structure or procedure is used in an olefin polymerization system or process. For example, unless otherwise specified, a particular structure "configured for use" means it is "configured for use in an olefin polymerization reactor system" and therefore is designed, shaped, arranged, constructed, and/or tailored to effect an olefin polymerization, as would have been understood by the skilled person.

Groups of elements of the periodic table are indicated using the numbering scheme indicated in the version of the periodic table of elements published in *Chemical and Engineering News,* 63(5), 27, 1985. In some instances, a group of elements may be indicated using a common name assigned to the group; for example alkali metals for Group 1 elements, alkaline earth metals for Group 2 elements, transition metals for Group 3-12 elements, and halogens or halides for Group 17 elements.

For any particular compound disclosed herein, a general structure or name presented is also intended to encompass all structural isomers, conformational isomers, and stereoisomers that can arise from a particular set of substituents, unless indicated otherwise. Thus, a general reference to a compound includes all structural isomers unless explicitly indicated otherwise; e.g., a general reference to pentane includes n-pentane, 2-methyl-butane, and 2,2-dimethyl-propane, while a general reference to a butyl group includes an n-butyl group, a sec-butyl group, an iso-butyl group, and a tert-butyl group. Additionally, the reference to a general structure or name encompasses all enantiomers, diastereomers, and other optical isomers whether in enantiomeric or racemic forms, as well as mixtures of stereoisomers, as the context permits or requires. For any particular formula or name that is presented, any general formula or name presented also encompasses all conformational isomers, regioisomers, and stereoisomers that can arise from a particular set of substituents.

Groups may be specified according to the atom that is bonded to the metal or bonded to another chemical moiety as a substituent, such as an "oxygen-bonded group," which is also called an "oxygen group." For example, an oxygen-bonded group includes species such as hydrocarbyloxide (—OR where R is a hydrocarbyl group, also termed hydrocarboxy), alkoxide (—OR where R is an alkyl group), aryloxide (—OAr where Ar is an aryl group), or substituted analogs thereof, which function as ligands or substituents in the specified location. Therefore, an alkoxide group and an aryloxide group are each a subgenus of a hydrocarbyloxide (hydrocarbyloxy) group.

Unless otherwise specified, any carbon-containing group for which the number of carbon atoms is not specified can have, according to proper chemical practice, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 carbon atoms, or any range or combination of ranges between these values. For example, unless otherwise specified or unless the context requires otherwise, any carbon-containing group can have from 1 to 30 carbon atoms, from 1 to 25 carbon atoms, from 1 to 20 carbon atoms, from 1 to 15 carbon atoms, from 1 to 10 carbon atoms, or from 1 to 5 carbon atoms, and the like. In an aspect, the context could require other ranges or limitations, for example, when the subject carbon-containing group is an aryl group or an alkenyl group, the lower limit of carbons in these subject groups is six carbon atoms and two carbon atoms, respectively. Moreover, other identifiers or qualifying terms may be utilized to indicate the presence or absence of a particular substituent, a particular regiochemistry and/or stereochemistry, or the presence of absence of a branched underlying structure or backbone, and the like.

Various numerical ranges are disclosed herein. When Applicant discloses or claims a range of any type, Applicant's intent is to disclose or claim individually each possible number that such a range could reasonably encompass, including end points of the range as well as any sub-ranges and combinations of sub-ranges encompassed therein, unless otherwise specified. For example, by disclosing a temperature of from 70° C. to 80° C., Applicant's intent is to recite individually 70° C., 71° C., 72° C., 73° C., 74° C., 75° C., 76° C., 77° C., 78° C., 79° C., and 80° C., including any sub-ranges and combinations of sub-ranges encompassed therein, and these methods of describing such ranges are interchangeable. Moreover, all numerical end points of ranges disclosed herein are approximate, unless excluded by proviso. As a representative example, if Applicant states that one or more steps in the processes disclosed herein can be conducted at a temperature in a range from 10° C. to 75° C., this range should be interpreted as encompassing temperatures in a range from "about" 10° C. to "about" 75° C.

Values or ranges may be expressed herein as "about", from "about" one particular value, and/or to "about" another particular value. When such values or ranges are expressed, other embodiments disclosed include the specific value recited, from the one particular value, and/or to the other particular value. Similarly, when values are expressed as approximations, by use of the antecedent "about," it will be understood that the particular value forms another embodiment. It will be further understood that there are a number of values disclosed therein, and that each value is also herein disclosed as "about" that particular value in addition to the value itself. In another aspect, use of the term "about" means ±15% of the stated value, ±10% of the stated value, ±5% of the stated value, or ±3% of the stated value.

Applicant reserves the right to proviso out or exclude any individual members of any such group of values or ranges, including any sub-ranges or combinations of sub-ranges within the group, that can be claimed according to a range or in any similar manner, if for any reason Applicant chooses to claim less than the full measure of the disclosure, for example, to account for a reference that Applicant may be unaware of at the time of the filing of the application. Further, Applicant reserves the right to proviso out or exclude any individual substituents, analogs, compounds, ligands, structures, or groups thereof, or any members of a claimed group, if for any reason Applicant chooses to claim less than the full measure of the disclosure, for example, to account for a reference or prior disclosure that Applicant may be unaware of at the time of the filing of the application.

The term "substituted" when used to describe a group, for example, when referring to a substituted analog of a particular group, is intended to describe any non-hydrogen moiety that formally replaces a hydrogen in that group, and is intended to be non-limiting. A group or groups can also be referred to herein as "unsubstituted" or by equivalent terms such as "non-substituted," which refers to the original group in which a non-hydrogen moiety does not replace a hydrogen within that group. Unless otherwise specified, "substituted" is intended to be non-limiting and include inorganic substituents or organic substituents as understood by one of ordinary skill in the art.

A chemical "group" may be described according to how that group is formally derived from a reference or "parent" compound, for example, by the number of hydrogen atoms formally removed from the parent compound to generate the group, even if that group is not literally synthesized in this manner. These groups can be utilized as substituents or coordinated or bonded to metal atoms. For example, an "alkyl group" formally can be derived by removing one hydrogen atom from an alkane, while an "alkanediyl group" (also referred to as a "alkylene group") formally can be derived by removing two hydrogen atoms from an alkane. Moreover, a more general term can be used to encompass a variety of groups that formally are derived by removing any number ("one or more") of hydrogen atoms from a parent compound, which in this example can be described as an "alkane group," which encompasses an "alkyl group," an "alkanediyl group," and materials have three or more hydrogen atoms, as necessary for the situation, removed from the alkane. The disclosure that a substituent, ligand, or other chemical moiety can constitute a particular "group" implies that the known rules of chemical structure and bonding are followed when that group is employed as described. When describing a group as being "derived by," "derived from," "formed by," or "formed from," such terms are used in a formal sense and are not intended to reflect any specific synthetic method or procedure, unless specified otherwise or the context requires otherwise.

The term "hydrocarbon" whenever used in this specification and claims refers to a compound containing only carbon and hydrogen. Other identifiers can be utilized to indicate the presence of particular groups in the hydrocarbon (e.g., halogenated hydrocarbon indicates that the presence of one or more halogen atoms replacing an equivalent number of hydrogen atoms in the hydrocarbon).

The term "hydrocarbyl" group is used herein in accordance with the definition specified by IUPAC as follows: a univalent group formed by removing a hydrogen atom from a hydrocarbon (that is, a group containing only carbon and hydrogen). Non-limiting examples of hydrocarbyl groups include ethyl, phenyl, tolyl, propenyl, cyclopentyl, and the like. The term "hydrocarbylene" group is also used herein in accordance with the definition specified by IUPAC as follows: a "hydrocarbylene" group refers to a divalent group formed by removing two hydrogen atoms from a hydrocarbon or a substituted hydrocarbon, the free valencies of which are not engaged in forming a double bond. By way of example and comparison, examples of hydrocarbyl and hydrocarbylene groups include, respectively: aryl and arylene; alkyl and alkanediyl (or "alkylene"); cycloalkyl and cycloalkanediyl (or "cycloalkylene"); aralkyl and aralkanediyl (or "aralkylene"); and so forth. For example, an "arylene" group is used in accordance with IUPAC definition to refer to a bivalent group derived from arenes by removal of a hydrogen atom from two ring carbon atoms, which may also be termed an "arenediyl" group. Examples of hydrocarbylene groups include but are not limited to: 1,2-phenylene; 1,3-phenylene; 1,2-propandiyl; 1,3-propandiyl; 1,2-ethandiyl; 1,4-butandiyl; 2,3-butandiyl; and methylene (—$CH_2$—).

The term "heterohydrocarbyl" group is used herein to refer to a univalent group, which can be linear, branched or cyclic, formed by removing a single hydrogen atom from [a] a heteroatom or [b] a carbon atom of a parent "heterohydrocarbon" molecule, the heterohydrocarbon molecule being one in which at least one carbon atom is replaced by a heteroatom. Examples of "heterohydrocarbyl" groups formed by removing a single hydrogen atom from a heteroatom of a heterohydrocarbon molecule include, for example: [1] a hydrocarbyloxide group, for example, an alkoxide (—OR) group such as tert-butoxide or aryloxide (—OAr) group such as a substituted or unsubstituted phenoxide formed by removing the hydrogen atom from the hydroxyl (OH) group of a parent alcohol or a phenol molecule; [2] a hydrocarbylsulfide group, for example, an alkylthiolate (—SR) group or arylthiolate (—SAr) group formed by removing the hydrogen atom from the hydrogensulfide (—SH) group of an alkylthiol or arylthiol; [3] a hydrocarbylamino group, for example, an alkylamino (—NHR) group or arylamino (—NHAr) group formed by removing a hydrogen atom from the amino (—$NH_2$) group of an alkylamine or arylamine molecule; and [4] a trihydrocarbylsilyl group such as trialkylsilyl (—$SiR_3$) or triarylsilyl (—$SiAr_3$) group. Examples of "heterohydrocarbyl" groups formed by removing a single hydrogen atom from a carbon atom of a heterohydrocarbon molecule include, for example, heteroatom-substituted hydrocarbyl groups such as a heteroatom-substituted alkyl group such as trimethylsilylmethyl (—$CH_2SiMe_3$) or methoxymethyl (—$CH_2OCH_3$) or a heteroatom-substituted aryl group such as p-methoxy-substituted phenyl (—$C_6H_5$-p-$OCH_3$).

An "aliphatic" compound is a class of acyclic or cyclic, saturated or unsaturated, carbon compounds, excluding aromatic compounds, e.g., an aliphatic compound is a non-aromatic organic compound. An "aliphatic group" is a generalized group formed by removing one or more hydrogen atoms (as necessary for the particular group) from a carbon atom of an aliphatic compound. Aliphatic compounds and therefore aliphatic groups can contain organic functional group(s) and/or atom(s) other than carbon and hydrogen.

The term "alkane" whenever used in this specification and claims refers to a saturated hydrocarbon compound. Other identifiers can be utilized to indicate the presence of particular groups in the alkane (e.g., halogenated alkane indicates that the presence of one or more halogen atoms replacing an equivalent number of hydrogen atoms in the alkane). The term "alkyl group" is used herein in accordance with the definition specified by IUPAC: a univalent group formed by removing a hydrogen atom from an alkane. Similarly, an "alkylene group" refers to a group formed by removing two hydrogen atoms from an alkane (either two hydrogen atoms from one carbon atom or one hydrogen atom from two different carbon atoms). An "alkane group" is a general term that refers to a group formed by removing one or more hydrogen atoms (as necessary for the particular group) from an alkane. An "alkyl group," "alkylene group," and "alkane group" can be acyclic or cyclic and/or linear or branched unless otherwise specified. Primary, secondary, and tertiary alkyl groups are derived by removal of a hydrogen atom from a primary, secondary, and tertiary carbon atom, respectively, of an alkane. The n-alkyl group can be derived by removal of a hydrogen atom from a terminal carbon atom of a linear alkane. The groups of the form $RCH_2$ (R≠H), $R_2CH$ (R≠H), and $R_3C$ (R≠H) are primary, secondary, and tertiary alkyl groups, respectively, wherein R is itself alkyl group.

The term "carbocyclic" group is used herein to refer to a group in which a carbocyclic compound is the parent compound, that is, a cyclic compound in which all the ring members are carbon atoms. The carbocyclic group is formed by removing one or more hydrogen atoms from the carbocyclic compound. For example, a carbocyclic group can be a univalent group formed by removing a hydrogen atom from a carbocyclic compound. Non-limiting examples of carbocyclic groups include, for example, cyclopentyl, cyclohexyl, phenyl, tolyl, naphthyl and the like.

A "cycloalkane" is a saturated cyclic hydrocarbon, with or without side chains, for example, cyclobutane. Other identifiers can be utilized to indicate the presence of particular groups in the cycloalkane (e.g., halogenated cycloalkane indicates that the presence of one or more halogen atoms replacing an equivalent number of hydrogen atoms in the cycloalkane). Unsaturated cyclic hydrocarbons having one endocyclic double or one triple bond are called cycloalkenes and cycloalkynes, respectively. Those having more than one such multiple bond are cycloalkadienes, cycloalkatrienes, and so forth. Other identifiers can be utilized to indicate the presence of particular groups in the cycloalkenes, cycloalkadienes, cycloalkatrienes, and so forth.

A "cycloalkyl" group is a univalent group derived by removing a hydrogen atom from a ring carbon atom from a cycloalkane. Examples of cycloalkyl groups include cyclobutyl, cyclopentyl, cyclohexyl, and cycloheptyl groups. For clarity, other examples of cycloalkyl groups include a 1-methylcyclopropyl group and a 2-methylcyclopropyl group are illustrated as follows.

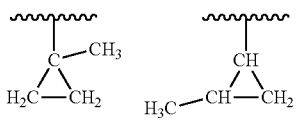

A "cycloalkane group" refers to a generalized group formed by removing one or more hydrogen atoms (as necessary for the particular group and at least one of which is a ring carbon) from a cycloalkane.

The term "alkene" whenever used in this specification and claims refers to an olefin that has at least one carbon-carbon double bond. The term "alkene" includes aliphatic or aromatic, cyclic or acyclic, and/or linear and branched alkene unless expressly stated otherwise. The term "alkene," by itself, does not indicate the presence or absence of heteroatoms and/or the presence or absence of other carbon-carbon double bonds unless explicitly indicated. Other identifiers may be utilized to indicate the presence or absence of particular groups within an alkene. Alkenes may also be further identified by the position of the carbon-carbon double bond. Alkenes, having more than one such multiple bond are alkadienes, alkatrienes, and so forth, and may be further identified by the position of the carbon-carbon double bond.

An "alkenyl group" is a univalent group derived from an alkene by removal of a hydrogen atom from any carbon atom of the alkene. Thus, "alkenyl group" includes groups in which the hydrogen atom is formally removed from an $sp^2$ hybridized (olefinic) carbon atom and groups in which the hydrogen atom is formally removed from any other carbon atom such as an $sp^3$ hybridized carbon atom. For example and unless otherwise specified, 1-propenyl (—CH=CHCH$_3$), 2-propenyl [(CH$_3$)C=CH$_2$], and 3-propenyl (—CH$_2$CH=CH$_2$) groups are all encompassed with the term "alkenyl group." In this aspect, the 3-propenyl (—CH$_2$CH=CH$_2$) group is considered an alkenyl group having a terminal C=C double bond, as is 4-butenyl (—CH$_2$CH$_2$CH=CH$_2$). Other identifiers may be utilized to indicate the presence or absence of particular groups within an alkene group. Alkene groups may also be further identified by the position of the carbon-carbon double bond. Similarly, a "cycloalkenyl" group is a univalent group derived from a cycloalkene by removal of a hydrogen atom from any carbon atom of the cycloalkene, whether that carbon atom is $sp^2$ hybridized (olefinic) or $sp^3$ hybridized carbon atom.

The term "olefin" is used herein in accordance with the definition specified by IUPAC: acyclic and cyclic hydrocarbons having one or more carbon-carbon double bonds apart from the formal ones in aromatic compounds. The class "olefins" subsumes alkenes and cycloalkenes and the corresponding polyenes. Ethylene, propylene, 1-butene, 2-butene, 1-hexene and the like are non-limiting examples of olefins. The term "alpha olefin" as used in this specification and claims refers to an olefin that has a double bond between the first and second carbon atom of the longest contiguous chain of carbon atoms. The term "alpha olefin" includes linear and branched alpha olefins unless expressly stated otherwise.

An "aromatic group" refers to a generalized group formed by removing one or more hydrogen atoms (as necessary for the particular group and at least one of which is an aromatic ring carbon atom) from an aromatic compound. Thus, an "aromatic group" as used herein refers to a group derived by removing one or more hydrogen atoms from an aromatic compound, that is, a compound containing a cyclically conjugated hydrocarbon that follows the Hückel (4n+2) rule and containing (4n+2) pi-electrons, where n is an integer from 1 to about 5. Aromatic compounds and hence "aromatic groups" may be monocyclic or polycyclic unless otherwise specified. Aromatic compounds include "arenes" (hydrocarbon aromatic compounds) and "heteroarenes," also termed "hetarenes" (heteroaromatic compounds formally derived from arenes by replacement of one or more methine (—C=) carbon atoms by trivalent or divalent heteroatoms, in such a way as to maintain the continuous pi-electron system characteristic of aromatic systems and a number of out-of-plane pi-electrons corresponding to the Hückel rule (4n+2)). While arene compounds and heteroarene compounds are mutually exclusive members of the group of aromatic compounds, a compound that has both an arene group and a heteroarene group that compound generally is considered a heteroarene compound. Aromatic compounds, arenes, and heteroarenes may be mono- or polycyclic unless otherwise specified. Examples of arenes include, but are not limited to, benzene, naphthalene, and toluene, among others. Examples of heteroarenes include, but are not limited to furan, pyridine, and methylpyridine, among others. As disclosed herein, the term "substituted" may be used to describe an aromatic group wherein any non-hydrogen moiety formally replaces a hydrogen in that group, and is intended to be non-limiting.

An arene is an aromatic hydrocarbon, with or without side chains (e.g., benzene, toluene, or xylene, among others). An "aryl group" is a group derived from the formal removal of a hydrogen atom from an aromatic hydrocarbon ring carbon atom from an arene compound. One example of an "aryl group" is ortho-tolyl (o-tolyl), the structure of which is shown here.

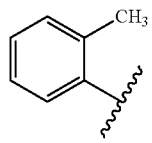 [SMILES: *c1ccccc1C]

The arene can contain a single aromatic hydrocarbon ring (e.g., benzene or toluene), contain fused aromatic rings (e.g., naphthalene or anthracene), and contain one or more isolated aromatic rings covalently linked via a bond (e.g., biphenyl) or non-aromatic hydrocarbon group(s) (e.g., diphenylmethane).

A "heterocyclic compound" is a cyclic compound having at least two different elements as ring member atoms. For example, heterocyclic compounds may comprise rings containing carbon and nitrogen (for example, tetrahydropyrrole), carbon and oxygen (for example, tetrahydrofuran), or carbon and sulfur (for example, tetrahydrothiophene), among others. Heterocyclic compounds and heterocyclic groups may be either aliphatic or aromatic.

An "aralkyl group" is an aryl-substituted alkyl group having a free valance at a non-aromatic carbon atom, for example, a benzyl group and a 2-phenylethyl group are examples of an "aralkyl" group.

A "halide", also referred to as a "halo" group or a halogen substituent or group has its usual meaning. Examples of halides include fluoride, chloride, bromide, and iodide.

The term "polymer" is used herein generically to include olefin homopolymers, copolymers, terpolymers, and so forth. A copolymer is derived from an olefin monomer and one olefin comonomer, while a terpolymer is derived from an olefin monomer and two olefin comonomers. Accordingly, "polymer" encompasses copolymers, terpolymers, etc., derived from any olefin monomer and comonomer(s) disclosed herein. Similarly, an ethylene polymer would include ethylene homopolymers, ethylene copolymers, ethylene terpolymers, and the like. As an example, an olefin copolymer, such as an ethylene copolymer, can be derived from ethylene and a comonomer, such as 1-butene, 1-hexene, or 1-octene. If the monomer and comonomer were ethylene and 1-hexene, respectively, the resulting polymer could be categorized an as ethylene/1-hexene copolymer.

In like manner, the scope of the term "polymerization" includes homopolymerization, copolymerization, terpolymerization, etc. Therefore, a copolymerization process could involve contacting one olefin monomer (e.g., ethylene) and one olefin comonomer (e.g., 1-hexene) to produce a copolymer.

The term "co-catalyst" is used generally herein to refer to compounds such as organoaluminum compounds, organoboron compounds, organozinc compounds, organomagnesium compounds, organolithium compounds, and the like, that can constitute one component of a catalyst composition, when used, for example, in addition to an activator-support. The term "co-catalyst" is used regardless of the actual function of the compound or any chemical mechanism by which the compound may operate. In one aspect, a co-catalyst can function as an alkylating agent for a metallocene, or a co-catalyst can function to transfer a hydride ligand to the metallocene. Therefore, in an aspect, a co-catalyst can function to provide an activatable ligand (for example, an alkyl or a hydride) to the metallocene, which can engage in olefin polymerization when activated. In this aspect, and while not intending to be bound by theory, it is thought that when the metallocene itself comprises an activatable hydrocarbyl or hydride ligand without being contacting with a co-catalyst, an active catalyst can form without the use of a co-catalyst.

The term "activator", as used herein, refers generally to a substance that is capable of converting a transition metal component such as a metallocene compound into an active catalyst that can polymerize olefins. In an aspect, the transition metal or metallocene compound can have an activatable ligand which can function as a site for olefin polymerization upon activation. The term "activator" is used regardless of the actual activating mechanism. Illustrative activators include activator-supports, aluminoxanes, organoborate compounds, ionizing ionic compounds, and the like, including combinations thereof.

The terms "solid oxide treated with an electron withdrawing anion", "chemically-treated solid oxide", "treated solid oxide", "treated solid oxide compound," and the like, are used herein to indicate a solid, inorganic oxide of relatively high porosity, which can exhibit Lewis acidic or Brønsted acidic behavior, and which has been treated with an electron-withdrawing component such as an anion or anion source, and which is calcined. The catalyst composition component referred to as the "activator-support" comprises, consists of, consists essentially or, or is selected from a solid oxide treated with an electron-withdrawing anion. The electron-withdrawing component is typically an electron-withdrawing anion source compound. Thus, the chemically-treated solid oxide can comprise a calcined contact product of at least one solid oxide with at least one electron-withdrawing anion source compound. Typically, the chemically-treated solid oxide comprises at least one acidic solid oxide compound. The terms "support" and "activator-support" are not used to imply that these components are inert, and such components should not be construed as an inert component of the catalyst composition.

An "organoaluminum compound," is used to describe any compound that contains an aluminum-carbon bond. Thus, organoaluminum compounds include, but are not limited to, hydrocarbyl aluminum compounds such as trihydrocarbyl-, dihydrocarbyl-, or monohydrocarbylaluminum compounds; hydrocarbylaluminum halide compounds; hydrocarbylalumoxane compounds; and aluminate compounds which contain an aluminum-organyl bond such as tetrakis(p-tolyl) aluminate salts. An "organoboron" compound, an "organozinc compound," an "organomagnesium compound," and an "organolithium compound" are used in an analogous fashion to describe any compound that contains a direct metal-carbon bond between an organic group and the recited metal.

The terms "catalyst composition," "catalyst mixture," "catalyst system," and the like, do not depend upon the actual product or composition resulting from the contact or reaction of the initial components of the claimed catalyst composition/mixture/system, the nature of the active catalytic site, or the fate of the co-catalyst, the metallocene compound(s), any olefin monomer used to prepare a precontacted mixture, or the activator (e.g., activator-support), after combining these components. Therefore, the terms "catalyst composition," "catalyst mixture." "catalyst system," and the like, encompass the initial starting components of the composition, as well as whatever product(s) may result from contacting these initial starting components, and this is inclusive of both heterogeneous and homogenous catalyst systems or compositions. The terms "catalyst composition," "catalyst mixture," "catalyst system," and the like, are used interchangeably throughout this disclosure.

The term "contact product" is used herein to describe compositions wherein the components are contacted together in any order, in any manner, and for any length of time. For example, the components can be contacted by blending or mixing. Further, contacting of any component can occur in the presence or absence of any other component of the compositions described herein. Combining additional materials or components can be done by any suitable method. Further, the term "contact product" includes mixtures, blends, solutions, slurries, reaction products, and the like, or combinations thereof. Although "contact product" can include reaction products, it is not required for the respective components to react with one another. Similarly, the term "contacting" is used herein to refer to materials which can be blended, mixed, slurried, dissolved, reacted, allowed to react, treated, or otherwise contacted in some other manner.

The term "precontacted" mixture is used herein to describe a first mixture of catalyst components that are contacted for a first period of time prior to the first mixture being used to form a "postcontacted" or second mixture of catalyst components that are contacted for a second period of time.

As used herein, the term "sulfur oxoacid anion" in the context of suitable sulfur oxoacid anion sources that can be used to prepare the sulfur oxoacid anion-modified solid oxide, include both substituted including halide-substituted and non-substituted sulfur oxoacid anions. For example, the term "sulfur oxoacid anion" is intended to include but not be limited to, sulfate, bisulfate, fluorosulfate, alkyl sulfonate (for example, mesylate or methanesulfonate), aryl sulfonate (for example, tosylate or toluenesulfonate), fluoroalkyl sulfonate (for example, triflate or trifluoromethanesulfonate), fluoroaryl sulfonate (for example, for example, [CF$_3$C$_6$H$_4$SO$_3$]$^-$), and thiosulfate, and any combination thereof. For example, the alkyl sulfonate can be a C$_1$-C$_{10}$ alkyl sulfonate, the aryl sulfonate can be a C$_6$-C$_{14}$ aryl sulfonate, the fluoroalkyl sulfonate can be a C$_1$-C$_{10}$ fluoroalkyl sulfonate, and the fluoroaryl sulfonate can be a C$_6$-C$_{14}$ fluoroaryl sulfonate.

Also as used herein, the term "phosphorus oxoacid anion" in the context of suitable phosphorus oxoacid anion sources that can be used to prepare the phosphorus oxoacid anion-modified solid oxide, include both substituted including halide-substituted and non-substituted phosphorus oxoacid anions. For example, the term "phosphorus oxoacid anion" is intended to include but not be limited to, phosphate, monofluorophosphate, difluorophosphate, or similar anions, or any combination thereof. Unless specified otherwise, the term "fluorophosphate" or "fluorophosphates" include both monofluorophosphate ([PO$_3$F]$^{2-}$) and difluorophosphate ([PO$_2$F$_2$]$^-$).

Although any methods, devices, and materials similar or equivalent to those described herein can be used in the practice or testing of the invention, the typical methods, devices and materials are herein described.

All publications and patents mentioned herein are incorporated herein by reference for the purpose of describing and disclosing, for example, the constructs and methodologies that are described in the publications, which might be used in connection with the presently described invention. The publications discussed throughout the text are provided solely for their disclosure prior to the filing date of the present application. Nothing herein is to be construed as an admission that the inventors are not entitled to antedate such disclosure by virtue of prior invention.

Catalyst Compositions

The present invention is directed generally to new metallocene compounds, new catalyst systems and catalyst compositions comprising the metallocene compounds, methods for preparing the catalyst compositions, methods for using the catalyst compositions to polymerize olefins, the polymer resins produced using such catalyst compositions, and articles produced using these polymer resins.

In an aspect, the subject metallocene compounds may be characterized by a low hydrogen response such that under olefin polymerization conditions, they may provide LLDPE having the desired properties such as relatively higher molecular weight and low MI and also relatively narrow molecular weight distributions, even in the presence of hydrogen. In a further aspect, this disclosure provides a process for polymerizing olefins comprising contacting at least one olefin monomer and a catalyst composition comprising at least one of the disclosed metallocene compounds. The catalyst compositions can further comprise a co-catalyst such as an organoaluminum compound, an activator such as a solid oxide treated with an electron-withdrawing anion (activator-support), or both.

Accordingly, in aspects of this disclosure, the metallocene which can produce low melt index polyethylene can have the formula:

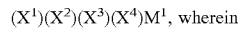

$(X^1)(X^2)(X^3)(X^4)M^1$, wherein $M^1$ is titanium, zirconium, or hafnium;

$X^1$ is a substituted or an unsubstituted fluorenyl ligand, wherein any substituent is selected independently from a C$_1$ to C$_{12}$ hydrocarbyl or a C$_1$ to C$_{12}$ heterohydrocarbyl;

$X^2$ is a cyclopentadienyl ligand substituted with a C$_2$-C$_{18}$ heterohydrocarbyl group comprising an oxygen atom positioned 5 atoms distance or less from the cyclopentadienyl ligand;

wherein $X^1$ and $X^2$ are bridged by a linking group of the formula >ER$^1$R$^2$, wherein E is C or Si, R$^1$ is hydrogen or a C$_1$-C$_{12}$ hydrocarbyl group, and R$^2$ is a C$_3$-C$_{12}$ alkenyl group having a terminal C=C double bond; and $X^3$ and $X^4$ are independently selected from a halide, hydride, a C$_1$-C$_{20}$ hydrocarbyl group, a C$_1$-C$_{20}$ heterohydrocarbyl group, tetrahydroborate, or OBR$^4{}_2$ or OSO$_2$R$^4$ wherein R$^4$ is independently a C$_1$-C$_{12}$ hydrocarbyl group.

Another aspect of this disclosure provides a catalyst composition for polymerizing olefins, the catalyst composition comprising: (a) a metallocene compound having the formula $(X^1)(X^2)(X^3)(X^4)M^1$ as described immediately above; (b) optionally, a co-catalyst comprising an organoaluminum compound, an organoboron compound, an organozinc compound, an organomagnesium compound, an organolithium compound, or any combination thereof; and (c) an activator comprising a solid oxide treated with an electron-withdrawing anion (activator-support), an organoboron compound, an organoborate compound, an ionizing ionic compound, an aluminoxane compound, or any combination thereof. Also described in an aspect is a method of making a catalyst composition, the method comprising contacting in any order: (a) a metallocene compound having the formula: $(X^1)(X^2)(X^3)(X^4)M^1$, as described immediately above; (b) optionally, a co-catalyst as described above; and (c) an activator as described above. According to another aspect, this disclosure further provides a process for polymerizing olefins, the process comprising contacting at least one olefin monomer and a catalyst composition under polymerization conditions to form an olefin polymer, wherein the catalyst composition comprises: (a) a metallocene compound having the formula $(X^1)(X^2)(X^3)(X^4)M^1$ as described immediately above; (b) optionally, a co-catalyst comprising an organoaluminum compound, an organoboron compound, an organozinc compound, an organomagnesium compound, an organolithium compound, or any combination thereof; and (c) an activator comprising a solid oxide treated with an electron-withdrawing anion (activator-support), an organoboron compound, an organoborate compound, an ionizing ionic compound, an aluminoxane compound, or any combination thereof.

The Metallocene

This disclosure provides a metallocene compound which contains a substituted or unsubstituted fluorenyl ligand and a cyclopentadienyl ligand which are bridged by a linking group, in which the compound is characterized by [1] the cyclopentadienyl ligand being substituted with a $C_2$-$C_{18}$ heterohydrocarbyl group having an oxygen atom positioned 5 atoms distance or less from the cyclopentadienyl ligand and [2] the linking group having a pendant $C_3$-$C_{12}$ alkenyl group having a terminal C=C double bond. While not intending to be theory bound, it is believed that this combination of features provides the polymerization activity and polymer properties observed. Therefore, in one aspect, the metallocene compound of this disclosure can have the formula: $(X^1)(X^2)(X^3)(X^4)M^1$, wherein:

$M^1$ is titanium, zirconium, or hafnium;

$X^1$ is a substituted or an unsubstituted fluorenyl ligand, wherein any substituent is selected independently from a $C_1$ to $C_{12}$ hydrocarbyl or a $C_1$ to $C_{12}$ heterohydrocarbyl;

$X^2$ is a cyclopentadienyl ligand substituted with a $C_2$-$C_{18}$ heterohydrocarbyl group comprising an oxygen atom positioned 5 atoms distance or less from the cyclopentadienyl ligand;

wherein $X^1$ and $X^2$ are bridged by a linking group of the formula $>ER^1R^2$, wherein E is C or Si, $R^1$ is hydrogen or a $C_1$-$C_{12}$ hydrocarbyl group, and $R^2$ is a $C_3$-$C_{12}$ alkenyl group having a terminal C=C double bond; and $X^3$ and $X^4$ are independently selected from a halide, hydride, a $C_1$-$C_{20}$ hydrocarbyl group, a $C_1$-$C_{20}$ heterohydrocarbyl group, tetrahydroborate, or $OBR^4{}_2$ or $OSO_2R^4$ wherein $R^4$ is independently a $C_1$-$C_{12}$ hydrocarbyl group.

In this metallocene structure, $M^1$ can be Ti; alternatively, $M^1$ can be Zr; alternatively, $M^1$ can be Hf; or alternatively, $M^1$ can be Zr or Hf.

As described, $X^1$ can be a substituted or an unsubstituted fluorenyl ligand, which is linked to a cyclopentadienyl ligand. The $X^1$ ligand can be unsubstituted, it can be monosubstituted, or it can be disubstituted, in each case not including the linking or bridging group described in detail hereinbelow, which links the fluorenyl and the cyclopentadienyl ligands. In an aspect, $X^1$ can be a 2,7-dihydrocarbyl-substituted or 2,7-diheterohydrocarbyl-substituted fluorenyl ligand, wherein each hydrocarbyl and each heterohydrocarbyl is selected independently from a $C_1$ to $C_{12}$ or a $C_1$ to $C_8$ hydrocarbyl or a $C_1$ to $C_{12}$ or a $C_1$ to $C_8$ heterohydrocarbyl, respectively. In another aspect, $X^1$ can be a 2,7-dihydrocarbyl-substituted or 2,7-diheterohydrocarbyl-substituted fluorenyl ligand wherein each hydrocarbyl is selected independently from methyl, ethyl, n-propyl, isopropyl, tert-butyl, trimethylsilyl, neopentyl, or trimethylsilylmethyl. For example, $X^1$ can be a 2,7-diisopryopyl-substituted or a 2,7-di-t-butyl-substituted fluorenyl ligand.

Also regarding the metallocene compound of the formula: $(X^1)(X^2)(X^3)(X^4)M^1$ set out above, $X^2$ can be a cyclopentadienyl ligand substituted with a $C_2$-$C_{18}$ heterohydrocarbyl group comprising an oxygen atom positioned 5 atoms distance or less from the cyclopentadienyl ligand. In another aspect, the $C_2$-$C_{18}$ heterohydrocarbyl group of the $X^2$ cyclopentadienyl ligand can comprise an oxygen atom positioned 5 atoms from the cyclopentadienyl ring, 4 atoms from the cyclopentadienyl ring, 3 atoms from the cyclopentadienyl ring, or 2 atoms from the cyclopentadienyl ring.

In an aspect, the heterohydrocarbyl group of $X^2$ can be selected from $[CH_2]_nOR^3$, wherein n is selected from an integer from 1 to 4 and $R^3$ is selected from a $C_1$-$C_{12}$ hydrocarbyl group or a $C_1$-$C_{12}$ heterohydrocarbyl group. For example, the heterohydrocarbyl group of $X^2$ can be selected from $[CH_2]_nOCH_3$, $[CH_2]_nOCH_2CH_3$, $[CH_2]_nOC_6H_5$, $[CH_2]_nOC_6H_4$-4-$CH_3$, or $[CH_2]_nOC_6H_4$-4-$OCH_3$, wherein n is selected from an integer from 1 to 4. According to another aspect, the heterohydrocarbyl group of $X^2$ can be selected from $CH_2CH_2OCH_3$, $CH_2CH_2OC_6H_5$, $CH_2CH_2CH_2OCH_3$, or $CH_2CH_2CH_2CH_2OC_6H_5$.

In a further aspect, the $X^1$ and $X^2$ ligands of the subject metallocene can be bridged by a linking group of the formula $>ER^1R^2$, wherein E is carbon or silicon, $R^1$ is a $C_1$-$C_{10}$ hydrocarbyl group, and $R^2$ is a $C_3$-$C_{10}$ alkenyl group having a terminal C=C double bond. For example, $R^1$ of linking group $ER^1R^2$ can be selected from hydrogen, methyl, ethyl, n-propyl, n-butyl, phenyl, or tolyl. In another aspect, $R^2$ of linking group $ER^1R^2$ is selected from $-[(CH_2)_mCH=CH_2]$ wherein m is an integer from 1 to 4.

Therefore, one aspect provides that the linking group of the formula $ER^1R^2$ can be selected from $>CH[(CH_2)_2CH=CH_2]$, $>C(CH_3)[(CH_2)_2CH=CH_2]$, $>C(C_6H_5)[(CH_2)_2CH=CH_2]$, $>SiH[(CH_2)_2CH=CH_2]$, $>Si(CH_3)[(CH_2)_2CH=CH_2]$, $>Si(C_6H_5)[(CH_2)_2CH=CH_2]$, $>CH[(CH_2)_3CH=CH_2]$, $>C(CH_3)[(CH_2)_3CH=CH_2]$, $>C(C_6H_5)[(CH_2)_3CH=CH_2]$, $>SiH[(CH_2)_3CH=CH_2]$, $>Si(CH_3)[(CH_2)_3CH=CH_2]$, or $>Si(C_6H_5)[(CH_2)_3CH=CH_2]$. In another aspect, the linking group of the formula $ER^1R^2$ can be selected from $>C(CH_3)[(CH_2)_2CH=CH_2]$ or $>C(CH_3)[(CH_2)_2CH=CH_2]$.

As understood by the person of ordinary skill, in one aspect, the $X^3$ and $X^4$ ligands of the metallocene can be selected from ligands which are capable of interacting with an activator such as a chemically-treated solid oxide or aluminoxane to form a cationic complex or incipient cationic complex, which can activate the metallocene toward olefin polymerization. In another aspect, the $X^3$ and $X^4$ ligands of the subject metallocene can be selected from ligands which can initiate olefin polymerization without any further alkylation or treatment of the metallocene, when in contact with an activator such as a chemically-treated solid oxide or aluminoxane. In further aspect, the $X^3$ and $X^4$ ligands of the metallocene can be selected from ligands which are capable of being replaced by a ligand which can function to initiate olefin polymerization such as an alkyl or a hydride ligand, when contacted with an activator as a chemically-treated solid oxide or aluminoxane. For example, and while not intending to be theory bound, $X^3$ and $X^4$ can be halide ligands, which are thought to be capable of interacting with an activator to form a cationic complex or incipient cationic complex, and are capable of being replaced by an alkyl or hydride ligand, or are capable of serving both these functions.

In an aspect, $X^3$ and $X^4$ can be independently selected from F, $C_1$, Br, a hydride, a $C_1$-$C_{12}$ hydrocarbyl group, a $C_1$-$C_{12}$ hydrocarbyloxide group, a $C_1$-$C_{12}$ hydrocarbylamino group, or a trihydrocarbylsilyl group wherein each hydrocarbyl is independently a $C_1$-$C_{12}$ hydrocarbyl group. According to another aspect, $X^3$ and $X^4$ can be independently selected from $C_1$, hydride, or methyl. In an aspect, $X^3$ and $X^4$ are conveniently chloride ligands which are derived from the starting material such as $ZrCl_4$, and the metallocene dichloride is used in the presence of a co-catalyst such as a trialkylaluminum compound, which in the presence of an activator form the catalyst composition.

In an aspect of this disclosure, the metallocene compound can be selected from the following compounds:

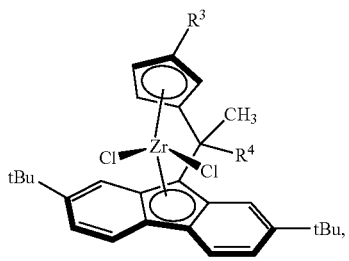

wherein
$R^3$ is selected from $[CH_2]_nOCH_3$, $[CH_2]_nOCH_2CH_3$, $[CH_2]_nOC_6H_5$, $[CH_2]_nOC_6H_4$-4-$CH_3$, or $[CH_2]_nOC_6H_4$-4-$OCH_3$, wherein n is selected from an integer from 1 to 4, and $R^4$ is selected from $—[(CH_2)_mCH=CH_2]$ wherein m is an integer from 1 to 4.

In yet another aspect, the metallocene compound can be selected from the following compounds:

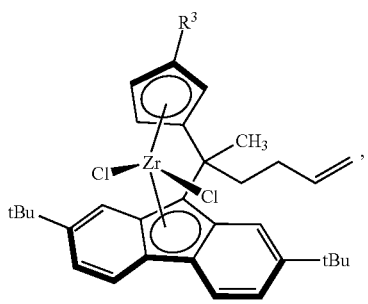

wherein
$R^3$ is selected from $[CH_2]_nOCH_3$ or $[CH_2]_nOC_6H_5$, wherein n is selected from an integer from 2 to 4.

In another aspect, the metallocene can be selected from

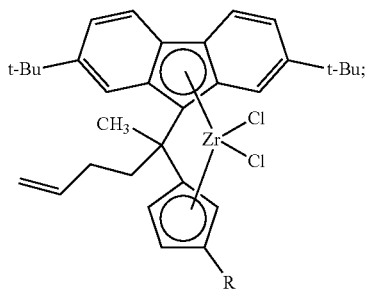

wherein
R can be selected from $[CH_2]_nOCH_3$, $[CH_2]_nOCH_2CH_3$, $[CH_2]_nOC_6H_5$, $[CH_2]_nOC_6H_4$-4-$CH_3$, or $[CH_2]_nOC_6H_4$-4-$OCH_3$, wherein n is selected from an integer from 1 to 4. According to another aspect, R can be selected from $CH_2CH_2OCH_3$, $CH_2CH_2CH_2OCH_3$, $CH_2CH_2CH_2CH_2OCH_3$, $CH_2CH_2OC_6H_5$, $CH_2CH_2CH_2O C_6H_5$, or $CH_2CH_2CH_2CH_2OC_6H_5$.

The Co-Catalyst

One aspect of this disclosure provides a catalyst composition and a process for producing an olefin polymer composition, in which the catalyst composition and process can utilize a co-catalyst. In some aspects, the co-catalyst can be optional. While not intending to be bound by theory, it is thought that in some embodiments, for example when a metallocene comprises a ligand such as an alkyl ligand, a co-catalyst may not be required. That is, when the contact product of the metallocene and an activator can initiate olefin polymerization without any further alkylation or treatment of the metallocene. However, even in cases in which polymerization activity can be initiated without the addition of a co-catalyst as a component of the catalyst composition, it may be desirable to include a co-catalyst in the catalyst composition.

One aspect of this disclosure provides for a catalyst composition for polymerizing olefins and a process for polymerizing olefins using a catalyst composition, comprising contacting at least one olefin and a catalyst composition, wherein the catalyst composition can comprise a metallocene compound and optionally a co-catalyst. In any embodiment provided here, the catalyst composition can further comprise an activator, such as a solid oxide treated with an electron-withdrawing anion, an organoboron compound, an organoborate compound, an ionizing ionic compound, an aluminoxane compound, or any combination thereof.

In an aspect, for example, the co-catalyst can comprise, consist of, consist essentially or, or can be selected from an organoaluminum compound, an organoboron compound, an organozinc compound, an organomagnesium compound, an organolithium compound, or any combination thereof. In another aspect, the co-catalyst can comprise or can be selected from an organoaluminum compound, an organozinc compound, an organomagnesium compound, an organolithium compound, or any combination thereof. Examples of co-catalysts include, but are not limited to:

a) $M^3(X^{10})_n(X^{11})_{3-n}$, wherein $M^3$ is boron or aluminum and n is from 1 to 3 inclusive;

b) $M^4(X^{10})_n(X^{11})_{2-n}$, wherein $M^4$ is magnesium or zinc and n is from 1 to 2 inclusive; and/or c) $M^5X^{10}$, wherein $M^5$ is Li;

wherein
i) $X^{10}$ is independently hydride or a $C_1$ to $C_{20}$ hydrocarbyl; and
ii) $X^{11}$ is independently a halide, a hydride, a $C_1$ to $C_{20}$ hydrocarbyl, or a $C_1$ to $C_{20}$ hydrocarbyloxide.

For example, the co-catalyst can comprise, consist of, consist essentially of, or be selected from an organoaluminum compound having a formula $Al(X^{12})_s(X^{13})_{3-s}$, wherein $X^{12}$ is independently a $C_1$ to $C_{12}$ hydrocarbyl, $X^{11}$ is independently a halide, a hydride, or a $C_1$ to $C_{12}$ hydrocarboxide, and s is an integer from 1 to 3 (inclusive).

In an aspect, the co-catalyst can comprise or can be selected from an organoaluminum compound, wherein the organoaluminum compound can comprise, can consist essentially of, or can be selected from trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, or any combination thereof. For example, the co-catalyst can comprise, consist of, consist essentially of, or be selected from triethylaluminum, triisobutylaluminum, diethylaluminum ethoxide, diethylaluminum chloride, or any combination thereof.

In a further aspect, the catalyst composition and/or the reaction mixture to prepare and use the catalyst composition can be substantially free of aluminoxane compounds, organoboron or organoborate compounds, ionizing ionic compounds, or combinations thereof. That is, "substantially free" is used to indicated that none of the recited compounds is intentionally added into the catalyst composition or reaction system. In another aspect, the catalyst composition and/or the reaction mixture to prepare and use the catalyst composition can be substantially free of aluminoxane compounds, meaning that no aluminoxane or reagents which form aluminoxane in the presence of an aluminum hydrocarbyl compound (such as water) are intentionally added to the catalyst composition.

Compounds which can constitute a co-catalyst are described in more detail below.

Organoaluminum Compounds

One aspect of this disclosure provides a catalyst composition and a process for producing an olefin polymer composition, in which the catalyst composition and process can utilize a co-catalyst such as an organoaluminum compound. In a further aspect of any embodiment provided here, the catalyst composition can comprise, either in combination with the chemically-treated solid oxide or any other activators or alone, at least one organoaluminum compound.

Organoaluminum compounds that can be used in the catalyst composition of this disclosure include but are not limited to compounds having the formula:

$$Al(X^{10})_n(X^{11})_{3-n}.$$

In an embodiment, each $X^{10}$ can be independently a $C_1$ to $C_{20}$ hydrocarbyl; alternatively, a $C_1$ to $C_{10}$ hydrocarbyl; alternately, a $C_6$ to $C_{20}$ aryl; alternatively, a $C_6$ to $C_{10}$ aryl; alternatively, a $C_1$ to $C_{20}$ alkyl; alternatively, a $C_1$ to $C_{10}$ alkyl; or alternatively, a $C_1$ to $C_5$ alkyl. In an embodiment, each $X^{11}$ can be independently a halide, a hydride, or a $C_1$ to $C_{20}$ hydrocarboxide; alternatively, a halide, a hydride, or a $C_1$ to $C_{10}$ hydrocarboxide; alternatively, a halide, a hydride, or a $C_6$ to $C_{20}$ aryloxide; alternatively, a halide, a hydride, or a $C_6$ to $C_{10}$ aryloxide; alternatively, a halide, a hydride, or a $C_1$ to $C_{20}$ alkoxide; alternatively, a halide, a hydride, or a $C_1$ to $C_{10}$ alkoxide; alternatively, a halide, a hydride, or, or a $C_1$ to $C_5$ alkoxide. In an embodiment, n can be a number (whole or otherwise) from 1 to 3, inclusive. In another aspect and in any embodiment, organoaluminum compounds that can be used in the catalyst composition of this disclosure include but are not limited to compounds having the formula:

$$Al(X^{10})_n(X^{11})_{3-n}, \text{ wherein}$$

$X^{10}$ can be a hydrocarbyl having from 1 to about 20 carbon atoms;

$X^{11}$ can be selected from alkoxide or aryloxide, any one of which having from 1 to about 20 carbon atoms, halide, or hydride; and n can be a number (whole or otherwise) from 1 to 3, inclusive.

For example, $X^{10}$ can be selected independently from a $C_1$ to $C_{12}$ hydrocarbyl, $X^{11}$ can be selected independently from a halide, a hydride, or a $C_1$ to $C_{12}$ hydrocarboxide, and s can be an integer from 1 to 3 (inclusive).

In one aspect of the formula $Al(X^{10})_n(X^{11})_{3-n}$, $X^{10}$ can be an alkyl having from 1 to about 10 carbon atoms. Examples of $X^{10}$ alkyl group are described herein and may be utilized to describe the alkyl aluminum compounds without limitation. In an aspect, $X^{11}$ may be independently selected from fluoro or chloro. In yet another aspect, $X^{11}$ may be chloro.

In the formula $Al(X^{10})_n(X^{11})_{3-n}$, n can be a number (whole or otherwise) from 1 to 3 inclusive, and typically, n is 2 or s is 3. The value of n is not restricted to be an integer, therefore this formula includes sesquihalide compounds or other organoaluminum cluster compounds.

Generally, examples of organoaluminum compounds that can be used in this disclosure include, but are not limited to, trialkylaluminum compounds, dialkylaluminium halide compounds, alkylaluminum dihalide compounds, dialkylaluminum alkoxide compounds, dialkylaluminum hydride compounds, and combinations thereof. Specific examples of organoaluminum compounds that are useful in this disclosure include, but are not limited to: trimethylaluminum (TMA), triethylaluminum (TEA), ethylaluminum dichloride, tripropylaluminum, diethylaluminum ethoxide, tributylaluminum, diisobutylaluminum hydride, triisobutylaluminum, diethylaluminum chloride (DEAC), and combinations thereof.

In one aspect, the present disclosure provides for precontacting the metallocene compound with at least one organoaluminum compound and an olefin monomer to form a precontacted mixture, prior to contact this precontacted mixture with the solid oxide activator-support to form the active catalyst. When the catalyst composition is prepared in this manner, typically, though not necessarily, a portion of the organoaluminum compound can be added to the precontacted mixture and another portion of the organoaluminum compound can be added to the postcontacted mixture prepared when the precontacted mixture can be contacted with the solid oxide activator. However, all the organoaluminum compound may be used to prepare the catalyst in either the precontacting or postcontacting step. Alternatively, all the catalyst components may be contacted in a single step.

Further, more than one organoaluminum compounds may be used, in either the precontacting or the postcontacting step. When an organoaluminum compound is added in multiple steps, the amounts of organoaluminum compound disclosed herein include the total amount of organoaluminum compound used in both the precontacted and postcontacted mixtures, and any additional organoaluminum compound added to the polymerization reactor. Therefore, total amounts of organoaluminum compounds are disclosed, regardless of whether a single organoaluminum compound is used, or more than one organoaluminum compound. In another aspect, triethylaluminum (TEA) or triisobutylaluminum are typical organoaluminum compounds used in this disclosure.

In one aspect and in any embodiment disclosed herein, the molar ratio of the organoaluminum compound to the metallocene compound can be from 0.001:1 to 100,000:1. Alternatively and in any embodiment, the molar ratio of the organoaluminum compound to the metallocene compound can be from 0.01:1 to 10,000:1; alternatively from 0.1:1 to 100:1; alternatively, from 0.5:1 to 10:1; or alternatively, from 0.2:1 to 5:1.

Organozinc and Organomagnesium Compounds

In an aspect, the co-catalyst of this disclosure can comprise, consist of, consist essentially or, or be selected from an organozinc compound, an organomagnesium compound, or a combination thereof. Organozinc compounds and organomagnesium compounds that can be used in the catalyst composition of this disclosure include but are not limited to compounds having the formula:

$$M^4X^{12}X^{13},$$

wherein $M^4$ is magnesium or zinc. In an embodiment, each $X^{12}$ is independently a $C_1$ to $C_{20}$ hydrocarbyl; alternatively, a $C_1$ to $C_{10}$ hydrocarbyl; alternatively, a $C_6$ to $C_{20}$ aryl; alternatively, a $C_6$ to $C_{10}$ aryl; alternatively, a $C_1$ to $C_{20}$ alkyl; alternatively, a $C_1$ to $C_{10}$ alkyl; or alternatively, $C_1$ to $C_5$ alkyl. In an embodiment, each $X^{13}$ is independently a halide, a hydride, or a $C_1$ to $C_{20}$ hydrocarbyl; alternatively, a halide, a hydride, or a $C_1$ to $C_{10}$ hydrocarbyl; alternatively, a halide, a hydride, or a $C_6$ to $C_{20}$ aryl; alternatively, a halide, a hydride, or a $C_6$ to $C_{10}$ aryl; alternatively, a halide, a hydride, or a $C_1$ to $C_{20}$ alkyl; alternatively, a halide, a hydride, or a $C_1$ to $C_{10}$ alkyl; alternatively, a halide, a hydride, or a $C_1$ to $C_5$ alkyl; alternatively, a halide, a hydride, or a $C_1$ to $C_{20}$ hydrocarboxide; alternatively, a halide, a hydride, or a $C_1$ to $C_{10}$ hydrocarboxide; alternatively, a halide, a hydride, or a $C_6$ to $C_{20}$ aryloxide; alternatively, a halide, a hydride, or a $C_6$ to $C_{10}$ aryloxide; alternatively, a halide, a hydride, or a $C_1$ to $C_{20}$ alkoxide; alternatively, a halide, a hydride, or a $C_1$ to $C_{10}$ alkoxide; or alternatively, a halide, a hydride, or a $C_1$ to $C_5$ alkoxide.

In a further aspect and in any disclosed embodiment, the catalyst composition can further comprise an organozinc or organomagnesium co-catalyst, selected from a compound with the following formula:

$$M^4X^{12}X^{13}, \text{ wherein:}$$

$M^4$ is Zn or Mg;

$X^{12}$ is a hydrocarbyl having from 1 to about 20 carbon atoms; and $X^{13}$ is selected from a hydrocarbyl, an alkoxide, or an aryloxide having from 1 to about 20 carbon atoms, halide, or hydride.

In another aspect, and in the various embodiments of this disclosure, useful organozinc compounds can be selected from or alternatively can comprise dimethylzinc, diethylzinc, dipropylzinc, dibutylzinc, dineopentylzinc, di(trimethylsilylmethyl)zinc, and the like, including any combinations thereof; alternatively, dimethylzinc; alternatively, diethylzinc; alternatively, dipropylzinc; alternatively, dibutylzinc; alternatively, dineopentylzinc; or alternatively, di(trimethylsilylmethyl)zinc.

In one aspect and in any embodiment disclosed herein, the molar ratio of the organozinc compound to the metallocene compound can be from 0.001:1 to 100,000:1. Alternatively and in any embodiment, the molar ratio of the organozinc compound to the metallocene compound can be from 0.01:1 to 10,000:1; alternatively from 0.1:1 to 100:1; alternatively, from 0.5:1 to 10:1; or alternatively, from 0.2:1 to 5:1.

Activators

The activators according to this disclosure can comprise, consist of, consist essentially of, or be selected independently from a solid oxide treated with an electron-withdrawing anion, an organoboron compound, a borate or an organoborate compound, an ionizing ionic compound, an aluminoxane compound, or any combination thereof.

Activator-Support (Chemically-Treated Solid Oxide)

The activator-support that is used in the processes and the catalyst composition can comprise, consist essentially of, or can be selected from a solid oxide chemically-treated with an electron withdrawing anion, also termed a "chemically-treated solid oxide". That is, any solid oxide or combinations of solid oxides disclosed herein that have been contacted and/or chemically-treated with any electron-withdrawing anion or combinations of electron-withdrawing anions disclosed herein can be used. Each of these components is set out in more detail below. Generally, examples of solid oxide that can be used in this disclosure include, but are not limited to, silica, alumina, silica-alumina, silica-coated alumina, aluminum phosphate, silica-zirconia, silica-titania, or any combination thereof, and the like. Generally, examples of the electron withdrawing anions that can be used in accordance with this disclosure include, but are not limited to, fluoride, chloride, phosphate, triflate, sulfate, bisulfate, and the like. Therefore sources of these anions are used in preparing the chemically-treated solid oxide.

According to a further aspect, in the processes or catalyst composition disclosed herein, the solid oxide chemically-treated with an electron withdrawing anion can comprise, consist essentially of, or be selected from at least one solid oxide treated with at least two electron-withdrawing anions, and the at least two electron-withdrawing anions can comprise, consist essentially of, or be selected from fluoride and phosphate, fluoride and sulfate, chloride and phosphate, chloride and sulfate, triflate and sulfate, or triflate and phosphate.

In an aspect, the solid oxide treated with an electron-withdrawing anion can comprise a sulfur oxoacid anion-modified solid oxide, a phosphorus oxoacid anion-modified solid oxide, or a halide ion-modified solid oxide. In another aspect, the solid oxide treated with an electron-withdrawing anion can be generated by treatment of a solid oxide with an acid or a salt of an electron-withdrawing anion. In an aspect, following treatment of the solid oxide with the acid or the salt of an electron-withdrawing anion, the solid oxide treated with an electron-withdrawing anion can be dried and calcined.

While further details of a chemically-treated solid oxide are set out below, generally, a wide range of solid oxides and sources of electron-withdrawing anions can be used to prepare the chemically-treated solid oxide. For example, in various aspects: 1) the solid oxide chemically-treated with an electron withdrawing anion can have a surface area from about 100 m$^2$/g to about 1000 m$^2$/g, a pore volume from about 0.25 mL/g to about 3.0 mL/g, and an average particle size from about 5 microns to about 150 microns; 2) the solid oxide chemically-treated with an electron withdrawing anion can have a pore volume from about 0.5 mL/g to about 2.5 mL/g; and/or the solid oxide chemically-treated with an electron withdrawing anion can have a surface area from about 150 m$^2$/g to about 700 m$^2$/g.

The term "chemically-treated solid oxide" is used interchangeably with "activator support" and similar terms such as, "solid oxide treated with an electron-withdrawing anion," "treated solid oxide," or "solid super acid," which is also termed "SSA." While not intending to be bound by theory, it is thought that the chemically-treated solid oxide can serve as an acidic activator-support. In an aspect, the chemically-treated solid oxide typically can be used in combination with a co-catalyst such as an organoaluminum compound or similar activating agent or alkylating agent. In another aspect, the metallocene compound can be "pre-activated" by, for example, being alkylated prior to its use in the catalyst composition, prior to contacting the chemically-treated solid oxide.

In one aspect of this disclosure, the catalyst composition can comprise at least one chemically-treated solid oxide comprising at least one solid oxide treated with at least one electron-withdrawing anion, wherein the solid oxide can comprise any oxide that is characterized by a high surface area, and the electron-withdrawing anion can comprise any anion that increases the acidity of the solid oxide as compared to the solid oxide that is not treated with at least one electron-withdrawing anion.

In another aspect of this disclosure, the catalyst composition can comprise a chemically-treated solid oxide comprising a solid oxide treated with an electron-withdrawing anion, wherein: the solid oxide comprises, consists of, consists essentially of, or is selected from silica, alumina, titania, zirconia, magnesia, boria, calcia, zinc oxide, silica-alumina, silica-coated alumina, silica-titania, silica-zirconia, silica-magnesia, alumina-titania, alumina-zirconia, zinc-aluminate, alumina-boria, silica-boria, aluminum phosphate, aluminophosphate, aluminophosphate-silica, magnesium aluminate, titania-zirconia, boehmite, heteropolytungstates, mixed oxides thereof, a pillared clay such as a pillared montmorillonite, or any combination thereof.

According to a further aspect, the catalyst composition can comprise a chemically-treated solid oxide comprising a solid oxide treated with an electron-withdrawing anion, wherein the electron-withdrawing anion comprises or is selected from fluoride, chloride, bromide, iodide, sulfate, bisulfate, fluorosulfate, phosphate, fluorophosphate, triflate, mesylate, tosylate, thiosulfate, $C_1$-$C_{10}$ alkyl sulfonate, $C_6$-$C_{14}$ aryl sulfonate, trifluoroacetate, fluoroborate, fluorozirconate, fluorotitanate, or any combination thereof.

In this aspect, the activator-support can comprise, consist of, consist essentially of, or be selected from a solid oxide treated with an electron-withdrawing anion, wherein:
  a) the solid oxide comprises, consists of, consists essentially of, or is selected from silica, alumina, silica-alumina, silica-coated alumina, aluminum phosphate, aluminophosphate, heteropolytungstate, titania, zirconia, magnesia, boria, zinc oxide, a mixed oxide thereof, or any mixture thereof; and
  b) the electron-withdrawing anion comprises, consists of, consists essentially of, or is selected from sulfate, bisulfate, fluorosulfate, phosphate, fluorophosphates, fluoride, or chloride.

In another aspect, the catalyst composition can comprise a chemically-treated solid oxide comprising a solid oxide treated with an electron-withdrawing anion, wherein: the solid oxide is selected from silica, alumina, silica-alumina, silica-coated alumina, titania, zirconia, mixed oxides thereof, or mixtures thereof; and the electron-withdrawing anion is selected from fluoride, chloride, bisulfate, sulfate, or any combination thereof.

In a further aspect, the solid oxide treated with an electron withdrawing anion can comprise at least one solid oxide treated with at least two electron-withdrawing anions, and wherein the at least two electron-withdrawing anions comprise fluoride and phosphate, fluoride and sulfate, chloride and phosphate, chloride and sulfate, triflate and sulfate, or triflate and phosphate, or any combination of two electron-withdrawing anions or sources for electron-withdrawing anions disclosed herein.

According to a further aspect, the solid oxide treated with an electron-withdrawing anion can be generated by treatment of a solid oxide with sulfuric acid, sulfate ion, bisulfate ion, fluorosulfuric acid, fluorosulfate ion, phosphoric acid, phosphate ion, fluorophosphoric acid, monofluorophosphate ion, triflic (trifluoromethanesulfonic) acid, triflate trifluoromethanesulfonate) ion, methanesulfonic acid, mesylate (methanesulfonate) ion, toluenesulfonic acid, tosylate (toluenesulfonate) ion, thiosulfate ion, $C_1$-$C_{10}$ alkyl sulfonic acid, $C_1$-$C_{10}$ alkyl sulfonate ion, $C_6$-$C_{14}$ aryl sulfonic acid, $C_6$-$C_{14}$ aryl sulfonate ion, fluoride ion, chloride ion, or any combination thereof. In an aspect, the solid oxide treated with an electron withdrawing anion comprises a sulfated solid oxide, bisulfated (hydrogen sulfated) solid oxide, fluorosulfated solid oxide, phosphated solid oxide, fluorophosphated solid oxide, fluoride solid oxide, or chloride solid oxide.

In an aspect, various examples of a solid oxide chemically-treated with an electron withdrawing anion (or "chemically-treated solid oxide" or CTSO) that can be used can comprise, can consist essentially of, or can be selected from fluorided alumina, chlorided alumina, bromided alumina, sulfated alumina, fluorided silica-alumina, chlorided silica-alumina, bromided silica-alumina, sulfated silica-alumina, fluorided silica-coated alumina, chlorided silica-coated alumina, bromided silica-coated alumina, fluorided silica-zirconia, chlorided silica-zirconia, bromided silica-zirconia, sulfated silica-zirconia, or a pillared clay such as a pillared montmorillonite that is treated with fluoride, chloride, or sulfate, phosphated alumina, or other aluminophosphates treated with sulfate, fluoride, or chloride, or any combination of these activator-supports.

According to an aspect, the electron withdrawing anion can comprise or can be selected from a sulfur oxoacid anion-modified solid oxide generated by sulfuric acid treatment or sulfate ion treatment. In another aspect, the electron withdrawing anion comprises or is selected from a phosphorus oxoacid anion-modified solid oxide generated by phosphoric acid treatment or phosphate ion treatment. The solid oxide treated with an electron withdrawing anion can include any solid oxide or combinations of solid oxides disclosed herein, treated with any electron-withdrawing anion or combinations of electron-withdrawing anions disclosed herein. Further, the solid oxide treated with an electron-withdrawing anion can be produced by a process comprising contacting any suitable solid oxide and any suitable solid oxide with an electron-withdrawing anion to provide a mixture, and concurrently and/or subsequently drying and/or calcining the mixture.

Further, and in yet another aspect, the chemically-treated solid oxide can further comprise a metal or metal ion selected from zinc, nickel, vanadium, titanium, silver, copper, gallium, tin, tungsten, molybdenum, or any combination thereof. Therefore, in another aspect and in any embodiment of this disclosure, for example, the chemically-treated solid oxide can be selected from any chemically-treated solid oxide disclosed herein, which can further comprise a metal or metal ion selected from zinc, nickel, vanadium, silver, copper, gallium, tin, tungsten, molybdenum, or any combination thereof. By example, the activator-support can comprise, consist essentially or, or can be selected from fluorided alumina, chlorided alumina, sulfated alumina, fluorided silica-alumina, chlorided silica-alumina, sulfated silica-alumina, fluorided silica-coated alumina, chlorided silica-coated alumina, bromided silica-coated alumina, fluorided silica-zirconia, sulfated silica-zirconia, or any combination thereof, that further can further comprise a metal or metal ion selected from zinc, nickel, vanadium, tin, or any combination thereof.

In an aspect, the chemically-treated solid oxides that further comprise a metal or metal ion can comprise, consist essentially of, or be selected from zinc- or titanium-impregnated fluorided alumina, zinc- or titanium-impregnated chlorided alumina, zinc- or titanium-impregnated bromided alumina, zinc- or titanium-impregnated sulfated alumina, zinc- or titanium-impregnated fluorided silica-alumina, zinc- or titanium-impregnated chlorided silica-alumina, zinc- or titanium-impregnated bromided silica-alumina, zinc- or titanium-impregnated sulfated silica-alumina, chlorided zinc aluminate, fluorided zinc aluminate, bromided zinc aluminate, sulfated zinc aluminate, or any combination thereof. In another aspect, the chemically-treated solid oxides that further comprise a metal or metal ion can comprise, consist essentially of, or be selected from zinc- or titanium-impregnated fluorided silica-zirconia, zinc- or titanium-impregnated chlorided silica-zirconia, zinc- or titanium-impregnated bromided silica-zirconia, zinc- or titanium-impregnated sulfated silica-zirconia, zinc- or titanium-impregnated fluorided silica-coated alumina, zinc- or titanium-impregnated chlorided silica-coated alumina, zinc- or titanium-impregnated bromided silica-coated alumina, zinc- or titanium-impregnated sulfated silica-coated alumina, or any combination thereof.

In yet a further aspect and in any embodiment of this disclosure, the chemically-treated solid oxide can comprise the contact product of at least one solid oxide compound and at least one electron-withdrawing anion source. The solid oxide compound and electron-withdrawing anion source are described independently herein and may be utilized in any combination to further describe the chemically-treated solid oxide comprising the contact product of at least one solid oxide compound and at least one electron-withdrawing anion source. That is, the chemically-treated solid oxide is provided upon contacting or treating the solid oxide with the electron-withdrawing anion source. In one aspect, the solid oxide compound can comprise or alternatively be selected from, an inorganic oxide. It is not required that the solid oxide compound be calcined prior to contacting the electron-withdrawing anion source. The contact product may be calcined either during or after the solid oxide compound is contacted with the electron-withdrawing anion source. In this aspect, the solid oxide compound may be calcined or uncalcined. In another aspect, the activator-support may comprise the contact product of at least one calcined solid oxide compound and at least one electron-withdrawing anion source.

While not intending to be bound by theory, the chemically-treated solid oxide, also termed the activator-support, exhibits enhanced acidity as compared to the corresponding untreated solid oxide compound. The chemically-treated solid oxide also functions as a catalyst activator as compared to the corresponding untreated solid oxide. While the chemically-treated solid oxide may activate the metallocene compound in the absence of additional activators, additional activators may be utilized in the catalyst composition. By way of example, it may be useful to include an organoaluminum compound in the catalyst composition along with the metallocene compound(s) and chemically-treated solid oxide. The activation function of the activator-support is evident in the enhanced activity of catalyst composition as a whole, as compared to a catalyst composition containing the corresponding untreated solid oxide.

In one aspect, the chemically-treated solid oxide of this disclosure can comprise a solid inorganic oxide material, a mixed oxide material, or a combination of inorganic oxide materials, that is chemically-treated with an electron-withdrawing component, and optionally treated with a metal. Thus, the solid oxide of this disclosure encompasses oxide materials such as alumina, "mixed oxide" compounds thereof such as silica-alumina, and combinations and mixtures thereof. The mixed oxide compounds such as silica-alumina can be single or multiple chemical phases with more than one metal combined with oxygen to form a solid oxide compound, and are encompassed by this disclosure. The solid inorganic oxide material, mixed oxide material, combination of inorganic oxide materials, electron-withdrawing component, and optional metal are independently described herein and may be utilized in any combination to further described the chemically-treated solid oxide.

In another aspect, the chemically-treated solid oxide of this disclosure can comprise a solid oxide of relatively high porosity, which exhibits Lewis acidic or Brønsted acidic behavior. The solid oxide is chemically-treated with an electron-withdrawing component, typically an electron-withdrawing anion, to form an activator-support. While not intending to be bound by the following statement, it is believed that treatment of the inorganic oxide with an electron-withdrawing component augments or enhances the acidity of the oxide. Thus in one aspect, the activator-support exhibits Lewis or Brønsted acidity which is typically greater than the Lewis or Brønsted acid strength than the untreated solid oxide, or the activator-support has a greater number of acid sites than the untreated solid oxide, or both. One method to quantify the acidity of the chemically-treated and untreated solid oxide materials is by comparing the oligomerization activities of the treated and untreated oxides under acid catalyzed reactions.

In one aspect, the chemically-treated solid oxide can comprise a solid inorganic oxide comprising oxygen and at least one element selected from Group 2, 3, 4, 5, 6, 7, 8, 9, 10, 11, 12, 13, 14, or 15 of the periodic table, or comprising oxygen and at least one element selected from the lanthanide or actinide elements; alternatively, the chemically-treated solid oxide can comprise a solid inorganic oxide comprising oxygen and at least one element selected from Group 4, 5, 6, 12, 13, or 14 of the periodic table, or comprising oxygen and at least one element selected from the lanthanide elements. (See: *Hawley's Condensed Chemical Dictionary*, 11$^{th}$ Ed., John Wiley & Sons; 1995; Cotton, F. A.; Wilkinson, G.; Murillo; C. A.; and Bochmann; M. *Advanced Inorganic Chemistry*, 6$^{th}$ Ed., Wiley-Interscience, 1999.) Usually, the inorganic oxide can comprise oxygen and at least one element selected from Al, B, Be, Bi, Cd, Co, Cr, Cu, Fe, Ga, La, Mn, Mo, Ni, Sb, Si, Sn, Sr, Th, Ti, V, W, P, Y, Zn or Zr; alternatively, the inorganic oxide can comprise oxygen and at least one element selected from Al, B, Si, Ti, P, Zn or Zr.

Further suitable examples of solid oxide materials or compounds that can be used in the chemically-treated solid oxide of the present disclosure include, but are not limited to, $Al_2O_3$, $B_2O_3$, BeO, $Bi_2O_3$, CdO, $Co_3O_4$, $Cr_2O_3$, CuO, $Fe_2O_3$, $Ga_2O_3$, $La_2O_3$, $Mn_2O_3$, $MoO_3$, $Na_2O$, NiO, $P_2O_5$, $Sb_2O_5$, $SiO_2$, $SnO_2$, SrO, $ThO_2$, $TiO_2$, $V_2O_5$, $WO_3$, $Y_2O_3$, ZnO, $ZrO_2$, $K_2O$, CaO, $La_2O_3$, $Ce_2O_3$, and the like, including mixtures thereof, mixed oxides thereof, and any combinations thereof. Alternatively, suitable examples of solid oxide materials or compounds that can be used in the chemically-treated solid oxide of the present disclosure include, but are not limited to, $Al_2O_3$, $B_2O_3$, $SiO_2$, $SnO_2$, $TiO_2$, $V_2O_5$, $WO_3$, $Y_2O_3$, ZnO, $ZrO_2$, and the like, including mixed oxides thereof, and combinations thereof, for example, silica-alumina. Alternatively, suitable examples of solid oxide materials or compounds that can be used in the chemically-treated solid oxide of the present disclosure include, but are not limited to, $Al_2O_3$, $SiO_2$, $TiO_2$, $ZrO_2$, and the like, including mixed oxides thereof, and combinations thereof.

Examples of mixed oxides that can be used in the activator-support of the present disclosure include, but are not limited to, silica-alumina, silica-titania, silica-zirconia, zeolites, many clay minerals, alumina-titania, alumina-zirconia, zinc-aluminate and the like; alternatively, examples of mixed oxides that can be used in the activator-support of the present disclosure include, but are not limited to, silica-alumina, silica-titania, silica-zirconia, alumina-titania, alumina-zirconia, zinc-aluminate and the like; alternatively, examples of mixed oxides that can be used in the activator-support of the present disclosure include, but are not limited to, silica-alumina, silica-titania, silica-zirconia, alumina-titania, and the like.

In one aspect of this disclosure, the solid oxide material is chemically-treated by contacting it with at least one electron-withdrawing component, typically an electron-withdrawing anion source. Further, the solid oxide material can be chemically-treated with a metal ion if desired, then calcining to form a metal-containing or metal-impregnated chemically-treated solid oxide. Alternatively, a solid oxide material and an electron-withdrawing anion source are contacted and calcined simultaneously. The method by which the oxide is contacted with an electron-withdrawing component, typically a salt or an acid of an electron-withdrawing anion, includes, but is not limited to, gelling, co-gelling, impregnation of one compound onto another, and the like. Typically, following any contacting method, the contacted mixture of oxide compound, electron-withdrawing anion, and the metal ion if present can be calcined.

The electron-withdrawing component used to treat the oxide is any component that increases the Lewis or Brønsted acidity of the solid oxide upon treatment. In one aspect, the electron-withdrawing component is an electron-withdrawing anion derived from a salt, an acid, or other compound such as a volatile organic compound that may serve as a source or precursor for that anion. Examples of electron-withdrawing anions include, but are not limited to, sulfate, bisulfate, fluoride, chloride, bromide, iodide, fluorosulfate, fluoroborate, phosphate, fluorophosphate, trifluoroacetate, triflate, fluorozirconate, fluorotitanate, trifluoroacetate, triflate, and the like, including mixtures and combinations thereof. Generally, fluoride, sources of fluoride, chloride, bisulfate, sulfate, and the like, including mixtures and combinations thereof, are particularly useful. In addition, other ionic or non-ionic compounds that serve as sources for these electron-withdrawing anions may also be employed in the present disclosure.

When the electron-withdrawing component can comprise a salt of an electron-withdrawing anion, the counterion or cation of that salt may be selected from any cation that allows the salt to revert or decompose back to the acid during calcining. Factors that dictate the suitability of the particular salt to serve as a source for the electron-withdrawing anion include, but are not limited to, the solubility of the salt in the desired solvent, the lack of adverse reactivity of the cation, ion-pairing effects between the cation and anion, hygroscopic properties imparted to the salt by the cation, and the like, and thermal stability of the anion. Examples of suitable cations in the salt of the electron-withdrawing anion include, but are not limited to, ammonium, trialkyl ammonium, tetraalkyl ammonium, tetraalkyl phosphonium, $H^+$, $[H(OEt_2)_2]^+$, and the like; alternatively, ammonium; alternatively, trialkyl ammonium; alternatively, tetraalkyl ammonium; alternatively, tetraalkyl phosphonium; or alternatively, $H^+$, $[H(OEt_2)_2]^+$.

Further, combinations of one or more different electron withdrawing anions, in varying proportions, can be used to tailor the specific acidity of the activator-support to the desired level. Combinations of electron withdrawing components may be contacted with the oxide material simultaneously or individually, and any order that affords the desired chemically-treated solid oxide acidity. For example, one aspect of this disclosure is employing two or more electron-withdrawing anion source compounds in two or more separate contacting steps. Thus, one example of such a process by which an chemically-treated solid oxide is prepared is as follows: a selected solid oxide compound, or combination of oxide compounds, is contacted with a first electron-withdrawing anion source compound to form a first mixture, this first mixture is then calcined, the calcined first mixture is then contacted with a second electron-withdrawing anion source compound to form a second mixture, followed by calcining said second mixture to form a treated solid oxide compound. In such a process, the first and second electron-withdrawing anion source compounds are typically different compounds, although they may be the same compound.

In one aspect of the disclosure, the solid oxide activator-support (chemically-treated solid oxide) may be produced by a process comprising:

1) contacting a solid oxide compound with at least one electron-withdrawing anion source compound to form a first mixture; and 2) calcining the first mixture to form the solid oxide activator-support.

In another aspect of this disclosure, the solid oxide activator-support (chemically-treated solid oxide) is produced by a process comprising:

1) contacting at least one solid oxide compound with a first electron-withdrawing anion source compound to form a first mixture; and 2) calcining the first mixture to produce a calcined first mixture;

3) contacting the calcined first mixture with a second electron-withdrawing anion source compound to form a second mixture; and 4) calcining the second mixture to form the solid oxide activator-support. Thus, the solid oxide activator-support is sometimes referred to simply as a treated solid oxide compound.

Another aspect of this disclosure is producing or forming the chemically-treated solid oxide by contacting at least one solid oxide with at least one electron-withdrawing anion source compound, wherein the at least one solid oxide compound is calcined before, during or after contacting the electron-withdrawing anion source, and wherein there is a substantial absence of aluminoxanes and organoborates.

In one aspect of this disclosure, once the solid oxide has been treated and dried, it may be subsequently calcined. Calcining of the treated solid oxide is generally conducted in an ambient atmosphere; alternatively, in a dry ambient atmosphere. The solid oxide may be calcined at a temperature from about 200° C. to about 900° C.; alternatively, from about 300° C. to about 800° C.; alternatively, from about 400° C. to about 700° C.; or alternatively, from about 350° C. to about 550° C. The period of time at which the solid oxide is maintained at the calcining temperature may be about 1 minute to about 100 hours; alternatively, from about 1 hour to about 50 hours; alternatively, from about 3 hours to about 20 hours; or alternatively from about 1 to about 10 hours.

Further, any type of suitable ambient atmosphere can be used during calcining. Generally, calcining is conducted in an oxidizing atmosphere, such as air. Alternatively, an inert atmosphere, such as nitrogen or argon, or a reducing atmosphere such as hydrogen or carbon monoxide, may be used.

In another aspect of the disclosure, the solid oxide component used to prepare the chemically-treated solid oxide has a pore volume greater than about 0.1 cc/g. In another aspect, the solid oxide component has a pore volume greater than about 0.5 cc/g, and in yet another aspect, greater than about 1.0 cc/g.

In still another aspect, the solid oxide component has a surface area from about 100 to about 1000 m²/g. In another aspect, solid oxide component has a surface area from about 200 to about 800 m²/g, and in still another aspect, from about 250 to about 600 m²/g.

According to another aspect, the solid oxide treated with an electron withdrawing anion has any of the following properties: a) a surface area from about 100 m²/g to about 1000 m²/g; b) a pore volume from about 0.25 mL/g to about 3.0 mL/g; c) an average particle size from about 5 microns to about 150 microns; or d) any combination thereof.

Regarding the sources of the electron-withdrawing anions, generally, the solid oxide material can be treated with a source of halide ion or sulfate ion or other electron withdrawing anions, optionally treated with a metal ion if desired, then calcined to provide the chemically-treated solid oxide in the form of a particulate solid. Thus, reference is made herein to the source of the sulfate ion (termed a sulfating agent), the source of chloride ion (termed a chloriding agent), the source of fluoride ion (termed a fluoriding agent) and the like, used to provide the chemically-treated solid oxide.

In one aspect of this disclosure, the chemically-treated solid oxide can comprise a fluorided solid oxide in the form of a particulate solid, thus a source of fluoride ion is added to the oxide by treatment with a fluoriding agent. In still another aspect, fluoride ion may be added to the oxide by forming a slurry of the oxide in a suitable solvent such as alcohol or water, including, but are not limited to, the one to three carbon alcohols because of their volatility and low surface tension. Examples of fluoriding agents that can be used in this disclosure include, but are not limited to, hydrofluoric acid (HF), ammonium fluoride ($NH_4F$), ammonium bifluoride ($NH_4HF_2$), ammonium tetrafluoroborate ($NH_4BF_4$), ammonium silicofluoride (hexafluorosilicate) (($NH_4$)$_2SiF_6$), ammonium hexafluorophosphate ($NH_4PF_6$), analogs thereof, and combinations thereof; alternatively, hydrofluoric acid (HF), ammonium fluoride ($NH_4F$), ammonium bifluoride ($NH_4HF_2$), ammonium tetrafluoroborate ($NH_4BF_4$), analogs thereof, and combinations thereof. For example, ammonium bifluoride $NH_4HF_2$ may be used as the fluoriding agent, due to its ease of use and ready availability.

In another aspect of the present disclosure, the solid oxide can be treated with a fluoriding agent during the calcining step. Any fluoriding agent capable of thoroughly contacting the solid oxide during the calcining step can be used. For example, in addition to those fluoriding agents described previously, volatile organic fluoriding agents may be used. Examples of volatile organic fluoriding agents useful in this aspect of the disclosure include, but are not limited to, freons, perfluorohexane, perfluorobenzene, fluoromethane, trifluoroethanol, and combinations thereof. Gaseous hydrogen fluoride or fluorine itself can also be used with the solid oxide is fluorided during calcining. One convenient method of contacting the solid oxide with the fluoriding agent is to vaporize a fluoriding agent into a gas stream used to fluidize the solid oxide during calcination.

Similarly, in another aspect of this disclosure, the chemically-treated solid oxide can comprise a chlorided solid oxide in the form of a particulate solid, thus a source of chloride ion is added to the oxide by treatment with a chloriding agent. The chloride ion may be added to the oxide by forming a slurry of the oxide in a suitable solvent. In another aspect of the present disclosure, the solid oxide can be treated with a chloriding agent during the calcining step. Any chloriding agent capable of serving as a source of chloride and thoroughly contacting the oxide during the calcining step can be used. For example, volatile organic chloriding agents may be used. Examples of volatile organic chloriding agents useful in this aspect of the disclosure include, but are not limited to, certain freons, perchlorobenzene, chloromethane, dichloromethane, chloroform, carbon tetrachloride, trichloroethanol, or any combination thereof. Gaseous hydrogen chloride or chlorine itself can also be used with the solid oxide during calcining. One convenient method of contacting the oxide with the chloriding agent is to vaporize a chloriding agent into a gas stream used to fluidize the solid oxide during calcination.

In one aspect, the amount of fluoride or chloride ion present before calcining the solid oxide is generally from about 2 to about 50% by weight, where the weight percents are based on the weight of the solid oxide, for example silica-alumina or silica-coated alumina before calcining. In another aspect, the amount of fluoride or chloride ion present before calcining the solid oxide is from about 3 to about 25% by weight, and in another aspect, from about 4 to about 20% by weight. Once impregnated with halide, the halided oxide may be dried by any method known in the art including, but not limited to, suction filtration followed by evaporation, drying under vacuum, spray drying, and the like, although it is also possible to initiate the calcining step immediately without drying the impregnated solid oxide.

In an aspect, silica-alumina or silica-coated alumina may be utilized as the solid oxide material. The silica-alumina or silica-coated alumina used to prepare the treated solid oxide can have a pore volume greater than about 0.5 cc/g. In one aspect, the pore volume may be greater than about 0.8 cc/g, and in another aspect, the pore volume may be greater than about 1.0 cc/g. Further, the silica-alumina or silica-coated alumina may have a surface area greater than about 100 m²/g. In one aspect, the surface area is greater than about 250 m²/g, and in another aspect, the surface area may be greater than about 350 m²/g. Generally, the silica-alumina or silica-coated alumina of this disclosure has an alumina content from about 5 to about 95%. In one aspect, the alumina content of the silica-alumina or silica-coated alumina may be from about 5 to about 50%, and in another aspect, the alumina content of the silica-alumina or silica-coated alumina may be from about 8% to about 30% alumina by weight. In yet another aspect, the solid oxide component can comprise alumina without silica and in another aspect, the solid oxide component can comprise silica without alumina.

The sulfated solid oxide can comprise sulfate and a solid oxide component such as alumina, silica-alumina, or silica-coated alumina in the form of a particulate solid. The sulfated oxide can be further treated with a metal ion if desired such that the calcined sulfated oxide can comprise a metal. In one aspect, the sulfated solid oxide can comprise sulfate and alumina. In one aspect of this disclosure, the sulfated alumina is formed by a process wherein the alumina is treated with a sulfate source, for example selected from, but not limited to, sulfuric acid or a sulfate salt such as ammonium sulfate. In one aspect, this process may be performed by forming a slurry of the alumina in a suitable solvent such as alcohol or water, in which the desired concentration of the sulfating agent has been added. Suitable organic solvents include, but are not limited to, the one to three carbon alcohols because of their volatility and low surface tension.

In one aspect of the disclosure, the amount of sulfate ion present before calcining is generally from about 0.5 parts by weight to about 100 parts by weight sulfate ion to about 100 parts by weight solid oxide. In another aspect, the amount of sulfate ion present before calcining is generally from about 1 part by weight to about 50 parts by weight sulfate ion to about 100 parts by weight solid oxide, and in still another aspect, from about 5 parts by weight to about 30 parts by weight sulfate ion to about 100 parts by weight solid oxide. These weight ratios are based on the weight of the solid oxide before calcining. Once impregnated with sulfate, the sulfated oxide may be dried by any method known in the art including, but not limited to, suction filtration followed by evaporation, drying under vacuum, spray drying, and the like, although it is also possible to initiate the calcining step immediately.

Further, any method of impregnating the solid oxide material with a metal may be used. The method by which the oxide is contacted with a metal source, typically a salt or metal-containing compound, includes, but is not limited to, gelling, co-gelling, impregnation of one compound onto another, and the like. Following any contacting method, the contacted mixture of oxide compound, electron-withdrawing anion, and the metal ion is typically calcined. Alternatively, a solid oxide material, an electron-withdrawing anion source, and the metal salt or metal-containing compound are contacted and calcined simultaneously.

In an aspect, the metallocene compound or combination of metallocene compounds may be precontacted with an olefin and/or an co-catalyst such as an organoaluminum compound for a first period of time prior to contacting this mixture with the chemically-treated solid oxide. Once the precontacted mixture of the metallocene compound, olefin, and/or organoaluminum compound is contacted with the chemically-treated solid oxide, the composition further comprising the chemically-treated solid oxide is termed the "postcontacted" mixture. The postcontacted mixture can be allowed to remain in further contact for a second period of time prior to being charged into the reactor in which the polymerization process will be carried out.

Various processes to prepare solid oxide activator-supports that can be employed in this disclosure have been reported. For example, U.S. Pat. Nos. 6,107,230, 6,165,929, 6,294,494, 6,300,271, 6,316,553, 6,355,594, 6,376,415, 6,391,816, 6,395,666, 6,524,987, 6,548,441, 6,750,302, 6,831,141, 6,936,667, 6,992,032, 7,601,665, 7,026,494, 7,148,298, 7,470,758, 7,517,939, 7,576,163, 7,294,599, 7,629,284, 7,501,372, 7,041,617, 7,226,886, 7,199,073, 7,312,283, 7,619,047, and U.S. Patent Appl. Publ. No. 2010/0076167, describe such methods, each of which is incorporated by reference herein, in pertinent part.

Aluminoxane Compounds

In a further aspect of any embodiment provided here, the catalyst composition can comprise, either in combination with the chemically-treated solid oxide or any other activators(s) or alone, at least one aluminoxane. In a further aspect, the catalyst compositions and polymerization processes disclosed herein may be absent an aluminoxane. Aluminoxanes are also referred to as poly(hydrocarbyl aluminum oxides), organoaluminoxanes, or alumoxanes.

Alumoxane compounds that can be used in the catalyst composition of this disclosure include, but are not limited to, oligomeric compounds. The oligomeric aluminoxane compounds can comprise linear structures, cyclic, or cage structures, or mixtures of all three. Oligomeric aluminoxanes, whether oligomeric or polymeric compounds, have the repeating unit formula:

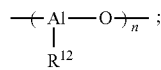

wherein $R^{12}$ is a linear or branched alkyl having from 1 to 10 carbon atoms, and n is an integer from 3 to about 10 are encompassed by this disclosure. Linear aluminoxanes having the formula:

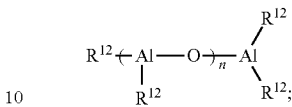

wherein $R^{12}$ is a linear or branched alkyl having from 1 to 10 carbon atoms, and n is an integer from 1 to about 50, are also encompassed by this disclosure.

Further, aluminoxanes may also have cage structures of the formula $R^t_{5m+\alpha}R^b_{m-\alpha}Al_{4m}O_{3m}$, wherein m is 3 or 4 and $\alpha$ is $=n_{Al(3)}-n_{O(2)}+n_{O(4)}$; wherein $n_{Al(3)}$ is the number of three coordinate aluminum atoms, $n_{O(2)}$ is the number of two coordinate oxygen atoms, $n_{O(4)}$ is the number of 4 coordinate oxygen atoms, $R^t$ represents a terminal alkyl group, and $R^b$ represents a bridging alkyl group; wherein R is a linear or branched alkyl having from 1 to 10 carbon atoms.

Aluminoxanes that can serve as activators in this disclosure are generally represented by formulas such as $(R^{12}-Al-O)_n$, $R^{12}(R^{12}-Al-O)_nAl(R^{12})_2$, and the like, wherein the $R^{12}$ group is typically a linear or branched $C_1$-$C_6$ alkyl such as methyl, ethyl, propyl, butyl, pentyl, or hexyl wherein n typically represents an integer from 1 to about 50. In one embodiment, the aluminoxane compounds of this disclosure include, but are not limited to, methylaluminoxane (MAO), ethylaluminoxane, modified methylaluminoxane (MMAO) such as an isobutyl-modified methyl alumoxane, n-propyl-aluminoxane, iso-propylaluminoxane, n-butylaluminoxane, t-butyl-aluminoxane, sec-butylaluminoxane, iso-butylaluminoxane, t-butyl aluminoxane, 1-pentyl-aluminoxane, 2-pentylaluminoxane, 3-pentylaluminoxane, iso-pentylaluminoxane, neopentylaluminoxane, or combinations thereof.

While organoaluminoxanes with different types of "R" groups such as $R^{12}$ are encompassed by the present disclosure, methyl aluminoxane (MAO), ethyl aluminoxane, or isobutyl aluminoxane are typical aluminoxane activators used in the catalyst compositions of this disclosure. These aluminoxanes are prepared from trimethylaluminum, triethylaluminum, or triisobutylaluminum, respectively, and are sometimes referred to as poly(methylaluminum oxide), poly (ethylaluminum oxide), and poly(isobutylaluminum oxide), respectively. It is also within the scope of the disclosure to use an aluminoxane in combination with a trialkylaluminum, such as disclosed in U.S. Pat. No. 4,794,096, which is herein incorporated by reference in its entirety.

The present disclosure contemplates many values of n in the aluminoxane formulas $(R^{12}-Al-O)_n$ and $R^{12}(R^1-Al-O)_nAl(R^{12})_2$, and preferably n is at least about 3. However, depending upon how the organoaluminoxane is prepared, stored, and used, the value of n may be variable within a single sample of aluminoxane, and such a combination of organoaluminoxanes are comprised in the methods and compositions of the present disclosure.

Organoaluminoxanes can be prepared by various procedures which are well known in the art. Examples of organoaluminoxane preparations are disclosed in U.S. Pat. Nos. 3,242,099 and 4,808,561, each of which is incorporated by reference herein, in its entirety. One example of how an aluminoxane may be prepared is as follows. Water which is dissolved in an inert organic solvent may be reacted with an aluminum alkyl compound such as $AlR_3$ to form the desired organoaluminoxane compound. While not intending to be bound by this statement, it is believed that this synthetic method can afford a mixture of both linear and cyclic (R—Al—O)$_n$ aluminoxane species, both of which are encompassed by this disclosure. Alternatively, organoaluminoxanes may be prepared by reacting an aluminum alkyl compound such as AlR$_3$ with a hydrated salt, such as hydrated copper sulfate, in an inert organic solvent.

The other catalyst components may be contacted with the aluminoxane in a saturated hydrocarbon compound solvent, though any solvent which is substantially inert to the reactants, intermediates, and products of the activation step can be used. The catalyst composition formed in this manner may be collected by methods known to those of skill in the art, including but not limited to filtration, or the catalyst composition may be introduced into the oligomerization reactor without being isolated.

Organoboron and Organoborate Compounds

In a further aspect of any embodiment provided here, the catalyst composition can comprise, either in combination with the chemically-treated solid oxide or any other activators(s) or alone, at least one organoboron, borate, or organoborate compound as an activator. In a further aspect, the catalyst compositions and polymerization processes disclosed herein may be absent an organoboron, a borate, or an organoborate compound.

Organoboron compounds that can be used in the catalyst composition of this disclosure are varied. In one aspect, the organoboron compound can comprise neutral boron compounds, borate salts, or combinations thereof. For example, the organoboron compounds of this disclosure can comprise a fluoroorgano boron compound, a fluoroorgano borate compound, or a combination thereof. Any fluoroorgano boron or fluoroorgano borate compound known in the art can be utilized. The term fluoroorgano boron compound has its usual meaning to refer to neutral compounds of the form BY$_3$. The term fluoroorgano borate compound also has its usual meaning to refer to the monoanionic salts of a fluoroorgano boron compound of the form [cation]$^+$[BY$_4$]$^-$, where Y represents a fluorinated organic group. For convenience, fluoroorgano boron and fluoroorgano borate compounds are typically referred to collectively by organoboron compounds, or by either name as the context requires.

Examples of fluoroorgano borate compounds that can be used as activators in the present disclosure include, but are not limited to, fluorinated aryl borates such as, N,N-dimethylanilinium tetrakis(pentafluorophenyl)borate, triphenylcarbenium tetrakis(pentafluorophenyl)borate, lithium tetrakis(pentafluorophenyl)borate, N,N-dimethylanilinium tetrakis[3,5-bis(trifluoro-methyl)phenyl]borate, triphenylcarbenium tetrakis[3,5-bis(trifluoromethyl)phenyl]borate, and the like, including mixtures thereof; alternatively, N,N-dimethylanilinium tetrakis-(pentafluorophenyl)borate; alternatively, triphenylcarbenium tetrakis(pentafluorophenyl)borate; alternatively, lithium tetrakis(pentafluorophenyl)borate; alternatively, N,N-dimethylanilinium tetrakis[3,5-bis(trifluoromethyl)phenyl]borate; or alternatively, triphenylcarbenium tetrakis[3,5-bis(trifluoromethyl)phenyl]borate. Examples of fluoroorgano boron compounds that can be used as activators in the present disclosure include, but are not limited to, tris(pentafluorophenyl)-boron, tris[3,5-bis(trifluoromethyl)phenyl]boron, and the like, including mixtures thereof.

Although not intending to be bound by the following theory, these examples of fluoroorgano borate and fluoroorgano boron compounds, and related compounds, are thought to form "weakly-coordinating" anions when combined with organometal compounds, as disclosed in U.S. Pat. No. 5,919,983, which is incorporated herein by reference in its entirety.

Generally, any amount of organoboron compound can be utilized in this disclosure. In one aspect and in any embodiment disclosed herein, the molar ratio of the organoboron compound to the metallocene compound can be from 0.001:1 to 100,000:1. Alternatively and in any embodiment, the molar ratio of the organoboron compound to the metallocene compound can be from 0.01:1 to 10,000:1; alternatively from 0.1:1 to 100:1; alternatively, from 0.5:1 to 10:1; or alternatively, from 0.2:1 to 5:1. Typically, the amount of the fluoroorgano boron or fluoroorgano borate compound used as an activator for the metallocene compounds can be in a range of from about 0.5 mole to about 10 moles of boron compound per total mole of metallocene compound employed. In one aspect, the amount of fluoroorgano boron or fluoroorgano borate compound used as an activator for the metallocene compound(s) is in a range of about 0.8 moles to 5 moles of boron compound per total moles of metallocene compound(s).

Ionizing Ionic Compounds

In a further aspect of any embodiment provided here, the catalyst composition can comprise, either in combination with the chemically-treated solid oxide or any other activators(s) or alone, at least one ionizing ionic compound. In a further aspect, the catalyst compositions and polymerization processes disclosed herein may be absent an ionizing ionic compound. Examples of ionizing ionic compound are disclosed in U.S. Pat. Nos. 5,576,259 and 5,807,938, each of which is incorporated herein by reference, in its entirety.

An ionizing ionic compound is an ionic compound which can function to enhance the activity of the catalyst composition. While not bound by theory, it is believed that the ionizing ionic compound may be capable of reacting with the metallocene compound and converting it into a cationic metallocene compound or a metallocene compound that is an incipient cation. Again, while not intending to be bound by theory, it is believed that the ionizing ionic compound may function as an ionizing compound by at least partially extracting an anionic ligand such as a chloride or alkoxide from the metallocene compound(s). However, the ionizing ionic compound is an activator regardless of whether it ionizes the metallocene compound(s), abstracts an anionic ligand in a fashion as to form an ion pair, weakens the metal-anionic ligand bond in the metallocene compound, simply coordinates to anionic ligand, or any other mechanism by which activation may occur.

Further, it is not necessary that the ionizing ionic compound activate the metallocene compounds only. The activation function of the ionizing ionic compound is evident in the enhanced activity of catalyst composition as a whole, as compared to a catalyst composition that does not comprise any ionizing ionic compound. It is also not necessary that the ionizing ionic compound activate different metallocene compounds to the same extent.

In one aspect and in any embodiment disclosed herein, the ionizing ionic compound can have the formula:

[Q]$^+$[M$^6$Z$_4$]$^-$.

In an embodiment, Q is selected from [NR$^A$R$^B$R$^C$R$^D$]$^+$, [CR$^E$R$^F$R$^G$]$^+$, [C$_7$H$_7$]$^+$, Li$^+$, Na$^+$, and K$^+$; alternatively, [NR$^A$R$^B$R$^C$R$^D$]$^+$; alternatively, [CR$^E$R$^F$R$^G$]$^+$; alternatively, [C$_7$H$_7$]$^+$; alternatively, Li$^+$; alternatively, Na$^+$; alternatively, K$^+$. In an embodiment, R$^A$, R$^B$, and R$^C$ are each selected independently from hydrogen, and a C$_1$ to C$_{20}$ hydrocarbyl; alternatively, hydrogen and a C$_1$ to C$_{10}$ hydrocarbyl; alternatively, hydrogen and a $C_6$ to $C_{20}$ aryl; alternatively, hydrogen and a $C_6$ to $C_{10}$ aryl; alternatively, hydrogen and a $C_1$ to $C_{20}$ alkyl; alternatively, hydrogen and a $C_1$ to $C_{10}$ alkyl; or alternatively, hydrogen and a $C_1$ to $C_5$ alkyl. In an embodiment, $R^D$ is selected from hydrogen, a halide, and a $C_1$ to $C_{20}$ hydrocarbyl; alternatively, hydrogen, a halide, and a $C_1$ to $C_{10}$ hydrocarbyl; alternatively, hydrogen, a halide, and a $C_6$ to $C_{20}$ aryl; alternatively, hydrogen, a halide, and a $C_6$ to $C_{10}$ aryl; alternatively, hydrogen, a halide, and a $C_1$ to $C_{20}$ alkyl; alternatively, hydrogen, a halide, and a $C_1$ to $C_{10}$ alkyl; or alternatively, hydrogen, a halide, and a $C_1$ to $C_5$ alkyl. In an embodiment, $R^E$, $R^F$, and $R^G$ are each selected independently from hydrogen, a halide, and a $C_1$ to $C_{20}$ hydrocarbyl; alternatively, hydrogen, a halide, and a $C_1$ to $C_{10}$ hydrocarbyl; alternatively, hydrogen, a halide, and a $C_6$ to $C_{20}$ aryl; or alternatively, hydrogen, a halide, and a $C_6$ to $C_{10}$ aryl. In some embodiments, Q may be a trialkyl ammonium or a dialkylarylamine (e.g. dimethyl anilinium); alternatively, triphenylcarbenium or substituted triphenyl carbenium; alternatively, tropylium or a substituted tropylium; alternatively, a trialkyl ammonium; alternatively, a dialkylarylamine (e.g. dimethyl anilinium) alternatively, a triphenylcarbenium; or alternatively, tropylium. In other embodiments, Q may be tri(n-butyl) ammonium, N,N-dimethylanilinium, triphenylcarbenium, tropylium, lithium, sodium, and potassium; alternatively, tri(n-butyl) ammonium and N,N-dimethylanilinium; alternatively, triphenylcarbenium, tropylium; or alternatively, lithium, sodium and potassium. In an embodiment, $M^6$ is B or Al; alternatively, B; or alternatively, Al. In an embodiment, Z is selected independently from halide and

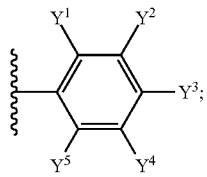

alternatively, halide; or alternatively,

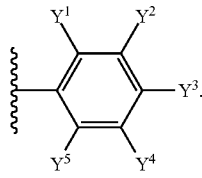

In an embodiment, $Y^1$, $Y^2$, $Y^3$, $Y^4$, and $Y^5$ are each selected independently from hydrogen, a halide, a $C_1$ to $C_{20}$ hydrocarbyl, a $C_1$ to $C_{20}$ hydrocarboxy; alternatively, hydrogen, a halide, a $C_1$ to $C_{10}$ hydrocarbyl, a $C_1$ to $C_{10}$ hydrocarboxide; alternatively, hydrogen, a halide, a $C_6$ to $C_{20}$ aryl, a $C_1$ to $C_{20}$ alkyl, a $C_6$ to $C_{20}$ aryloxide, a $C_1$ to $C_{20}$ alkoxide; alternatively, hydrogen, a halide, a $C_6$ to $C_{10}$ aryl, a $C_1$ to $C_{10}$ alkyl, a $C_6$ to $C_{10}$ aryloxide, a $C_1$ to $C_{10}$ alkoxide; or alternatively, hydrogen, a halide, a $C_1$ to $C_5$ alkyl, a $C_1$ to $C_5$ alkoxide. In some embodiments, $Y^1$, $Y^2$, $Y^3$, $Y^4$, and $Y^5$ may be selected independently from phenyl, p-tolyl, m-tolyl, 2,4-dimethylphenyl, 3,5-dimethylphenyl, pentafluorophenyl, and 3,5-bis(trifluoromethyl)phenyl; alternatively, phenyl; alternatively, p-tolyl; alternatively, m-tolyl; alternatively, 2,4-dimethylphenyl; alternatively, 3,5-dimethylphenyl; alternatively, pentafluorophenyl; or alternatively, 3,5-bis(trifluoromethyl)phenyl. In some embodiments, any hydrocarbyl, aryl, alkyl, hydrocarboxide, aryloxide, or alkoxide can be substituted by one or more halide, $C_1$ to $C_5$ alkyl, halide-substituted $C_1$ to $C_5$ alkyl, $C_1$ to $C_5$ alkoxide, or halide-substituted $C_1$ to $C_5$ alkoxide group. Particular halide, hydrocarbyl, aryl, alkyl, hydrocarboxide, and alkoxide are described herein and may be utilized without limitation to provide particular ionizing ionic compound having the formula $[Q]^+[M^6Z_4]^-$.

Examples of ionizing ionic compounds include, but are not limited to, the following compounds: tri(n-butyl)ammonium tetrakis(p-tolyl)borate, tri(n-butyl)ammonium tetrakis(m-tolyl)borate, tri(n-butyl)ammonium tetrakis(2,4-dimethylphenyl)borate, tri(n-butyl)ammonium tetrakis(3,5-dimethylphenyl)borate, tri(n-butyl)ammonium tetrakis[3,5-bis(trifluoro-methyl)phenyl]borate, tri(n-butyl)ammonium tetrakis(pentafluorophenyl)borate, N,N-dimethylanilinium tetrakis(p-tolyl)borate, N,N-dimethylanilinium tetrakis(m-tolyl)borate, N,N-dimethylanilinium tetrakis(2,4-dimethylphenyl)borate, N,N-dimethylanilinium tetrakis(3,5-dimethylphenyl)borate, N,N-dimethylanilinium tetrakis[3,5-bis(trifluoromethyl)phenyl]borate, or N,N-dimethylanilinium tetrakis(pentafluorophenyl)borate; alternatively, triphenylcarbenium tetrakis(p-tolyl)borate, triphenylcarbenium tetrakis(m-tolyl)borate, triphenylcarbenium tetrakis(2,4-dimethylphenyl)borate, triphenylcarbenium tetrakis(3,5-dimethylphenyl)borate, triphenylcarbenium tetrakis[3,5-bis(trifluoromethyl)phenyl]borate, or triphenylcarbenium tetrakis(pentafluorophenyl)borate; alternatively, tropylium tetrakis(p-tolyl)borate, tropylium tetrakis(m-tolyl)borate, tropylium tetrakis(2,4-dimethylphenyl)borate, tropylium tetrakis(3,5-dimethylphenyl)borate, tropylium tetrakis[3,5-bis(trifluoromethyl)phenyl]borate, or tropylium tetrakis(pentafluorophenyl)borate; alternatively, lithium tetrakis(pentafluorophenyl)borate, lithium tetrakis(phenyl)borate, lithium tetrakis(p-tolyl)borate, lithium tetrakis(m-tolyl)borate, lithium tetrakis(2,4-dimethylphenyl)borate, lithium tetrakis(3,5-dimethylphenyl)borate, or lithium tetrafluoroborate; alternatively, sodium tetrakis(pentafluorophenyl)borate, sodium tetrakis(phenyl) borate, sodium tetrakis(p-tolyl)borate, sodium tetrakis(m-tolyl)borate, sodium tetrakis(2,4-dimethylphenyl)borate, sodium tetrakis(3,5-dimethylphenyl)borate, or sodium tetrafluoroborate; alternatively, potassium tetrakis(pentafluorophenyl)borate, potassium tetrakis(phenyl)borate, potassium tetrakis(p-tolyl)borate, potassium tetrakis(m-tolyl)borate, potassium tetrakis(2,4-dimethylphenyl)borate, potassium tetrakis(3,5-dimethylphenyl)borate, or potassium tetrafluoroborate; alternatively, tri(n-butyl)ammonium tetrakis(p-tolyl)aluminate, tri(n-butyl)ammonium tetrakis(m-tolyl)aluminate, tri(n-butyl)ammonium tetrakis(2,4-dimethylphenyl)aluminate, tri(n-butyl)ammonium tetrakis(3,5-dimethylphenyl)aluminate, tri(n-butyl)ammonium tetrakis(pentafluorophenyl)aluminate, N,N-dimethylanilinium tetrakis(p-tolyl)-aluminate, N,N-dimethylanilinium tetrakis(m-tolyl)aluminate, N,N-dimethylanilinium tetrakis(2,4-dimethylphenyl)aluminate, N,N-dimethylanilinium tetrakis(3,5-dimethylphenyl)aluminate, or N,N-dimethylanilinium tetrakis (pentafluorophenyl) aluminate; alternatively, triphenylcarbenium tetrakis(p-tolyl)aluminate, triphenylcarbenium tetrakis(m-tolyl) aluminate, triphenylcarbenium tetrakis(2,4-dimethylphenyl) aluminate, triphenylcarbenium tetrakis(3,5-dimethylphenyl) aluminate, or triphenylcarbenium tetrakis-(pentafluorophenyl)aluminate; alternatively, tropylium tetrakis(p-tolyl)aluminate, tropylium tetrakis(m-tolyl)aluminate, tropylium tetrakis(2,4-dimethylphenyl)aluminate, tropylium tetrakis(3,5-dimethylphenyl)aluminate, or tropylium tetrakis(pentafluorophenyl)aluminate; alternatively, lithium tetrakis(pentafluorophenyl)aluminate, lithium tetrakis(phenyl)aluminate, lithium tetrakis(p-tolyl)aluminate, lithium tetrakis(m-tolyl)aluminate, lithium tetrakis(2,4-dimethylphenyl)aluminate, lithium tetrakis(3,5-dimethylphenyl)aluminate, or lithium tetrafluoroaluminate; alternatively, sodium tetrakis(pentafluorophenyl)aluminate, sodium tetrakis(phenyl)aluminate, sodium tetrakis(p-tolyl)aluminate, sodium tetrakis(m-tolyl)aluminate, sodium tetrakis(2,4-dimethylphenyl)aluminate, sodium tetrakis(3,5-dimethylphenyl)aluminate, or sodium tetrafluoroaluminate; or alternatively, potassium tetrakis(pentafluorophenyl)aluminate, potassium tetrakis(phenyl)aluminate, potassium tetrakis(p-tolyl)aluminate, potassium tetrakis(m-tolyl)aluminate, potassium tetrakis(2,4-dimethylphenyl)aluminate, potassium tetrakis (3,5-dimethylphenyl)aluminate, potassium tetrafluoroaluminate. In some embodiments, the ionizing ionic compound may be tri(n-butyl)ammonium tetrakis(3,5-dimethylphenyl)borate, tri(n-butyl)-ammonium tetrakis[3,5-bis(trifluoromethyl)phenyl]borate, tri(n-butyl)ammonium tetrakis(pentafluorophenyl)borate, N,N-dimethylanilinium tetrakis(p-tolyl)borate, N,N-dimethylanilinium tetrakis(m-tolyl)borate, N,N-dimethylanilinium tetrakis[3,5-bis(trifluoro-methyl)phenyl]borate, N,N-dimethylanilinium tetrakis(pentafluorophenyl)borate, triphenyl-carbenium tetrakis (p-tolyl)borate, triphenylcarbenium tetrakis(m-tolyl)borate, triphenylcarbenium tetrakis(2,4-dimethylphenyl)borate, triphenylcarbenium tetrakis(3,5-dimethylphenyl)borate, or triphenylcarbenium tetrakis[3,5-bis(trifluoromethyl)phenyl] borate, lithium tetrakis(p-tolyl)aluminate, lithium tetrakis (m-tolyl)aluminate, lithium tetrakis(2,4-dimethylphenyl) aluminate, or lithium tetrakis(3,5-dimethylphenyl) aluminate.

Alternatively and in some embodiments, the ionizing ionic compound can be tri(n-butyl)-ammonium tetrakis[3,5-bis(trifluoromethyl)phenyl]borate, tri(n-butyl)ammonium tetrakis(pentafluorophenyl)borate, N,N-dimethylanilinium tetrakis[3,5-bis(trifluoro-methyl)phenyl]borate, N,N-dimethylanilinium tetrakis(pentafluorophenyl)borate, triphenyl-carbenium tetrakis[3,5-bis(trifluoromethyl)phenyl]borate, lithium tetrakis(p-tolyl)aluminate, or lithium tetrakis(m-tolyl)aluminate; alternatively, tri(n-butyl)ammonium tetrakis[3,5-bis(trifluoromethyl)phenyl]borate; alternatively, tri (n-butyl)ammonium tetrakis(pentafluorophenyl)borate; alternatively, N,N-dimethylanilinium tetrakis[3,5-bis(trifluoromethyl)phenyl]borate; alternatively, N,N-dimethylanilinium tetrakis(pentafluorophenyl)borate; alternatively, triphenylcarbenium tetrakis[3,5-bis(trifluoromethyl)phenyl] borate; alternatively, lithium tetrakis(p-tolyl)aluminate; or alternatively, lithium tetrakis(m-tolyl)aluminate. In other embodiments, the ionizing compound may be a combination of any ionizing compound recited herein. However, the ionizing ionic compound is not limited thereto in the present disclosure.

In one aspect and in any embodiment disclosed herein, the molar ratio of the ionizing ionic compound to the metallocene compound can be from 0.001:1 to 100,000:1. Alternatively and in any embodiment, the molar ratio of the ionizing ionic compound to the metallocene compound can be from 0.01:1 to 10,000:1; alternatively from 0.1:1 to 100:1; alternatively, from 0.5:1 to 10:1; or alternatively, from 0.2:1 to 5:1.

Diluent

In an aspect, the polymerization process and the method for making a catalyst composition can be carried out using a diluent or carrier for the components of the catalyst composition. Therefore, there is provided a process for polymerizing olefins, a catalyst composition, or a method of making a catalyst composition according to any one of aspects disclosed herein, wherein the catalyst composition further comprises a diluent or wherein the contacting step comprises contacting the recited elements in a diluent.

According to an aspect, the diluent can comprise, consist of, consist essentially of, or can be selected from any suitable non-protic solvent, or any non-protic solvent disclosed herein. For example, in an aspect, the diluent can comprise any suitable non-coordinating solvent such as the hydrocarbon solvents disclosed herein.

For example, the diluent can comprise any suitable aliphatic hydrocarbon solvent, or any aliphatic hydrocarbon solvent disclosed herein. In an aspect, the diluent can comprise, consist of, consist essentially of, or be selected from at least one olefin monomer in the case of bulk polymerizations, propane, butanes (for example, n-butane, iso-butane), pentanes (for example, n-pentane, iso-pentane), hexanes, heptanes, octanes, petroleum ether, light naphtha, heavy naphtha, and the like, or any combination thereof.

In another aspect, the diluent can comprise any suitable aromatic hydrocarbon solvent, or any aromatic hydrocarbon solvent disclosed herein, for example, benzene, xylene, toluene, and the like.

The term "solvent" as used herein does not imply that all or any of the components of the catalyst composition are soluble, but rather "solvent" is used interchangeably with the term "carrier" or "diluent". The skilled person will appreciate that not all metallocene compounds, co-catalysts, and activators may be highly stable in all of the diluents described herein, and it is not intended to reflect that this is the case.

Polymerization Processes

In an aspect, this disclosure encompasses a process for polymerizing olefins by contacting at least one olefin monomer and a catalyst composition under polymerization conditions to form an olefin polymer, wherein the catalyst composition comprises the metallocene compounds, the optional co-catalyst such as an organoaluminum compound, and activator such as a solid oxide treated with an electron withdrawing anion as disclosed herein. In one aspect, the contacting step can comprise contacting the recited components in the following order:
  a) the solid oxide treated with an electron-withdrawing anion, optionally contacted with a diluent, and constituting a first composition, is contacted with:
  b) the co-catalyst, forming a second composition, which is contacted with:
  c) the metallocene compound.

According to one aspect, the contacting steps and the polymerization process can be conducted in a hydrocarbon slurry. The at least one olefin monomer can comprise ethylene or ethylene in combination with an olefin co-monomer selected from propylene, butene (e.g., 1-butene), pentene, hexene (e.g., 1-hexene), heptene, octene (e.g., 1-octene), styrene, and the like. Moreover, the polymerization process can further comprise a step of monitoring the concentration of at least one reaction mixture component, at least one elimination reaction product, or a combination thereof.

Useful examples of the polymerization method include a process by which at least one olefin monomer and the catalyst composition can be contacted under any one or any combination of more than one of the following conditions:

a) the molar ratio of the co-catalyst to the metallocene compound(s) is from about 1:1 to about 500:1;
b) the weight ratio of the activator-support to the metallocene compound(s) is from about 5:1 to about 1,000:1; and/or
c) the weight ratio of the at least one olefin monomer to the metallocene compound(s) is from about 1,000:1 to about 100,000,000:1.

In another aspect, for example, the at least one olefin monomer and the catalyst composition can be contacted under any one or any combination of more than one of the following conditions:
  a) the co-catalyst comprises an organoaluminum compound and the molar ratio of the co-catalyst to the metallocene compound(s) is from about 10:1 to about 500:1;
  b) the activator-support comprises a fluorided silica-alumina or a fluorided silica-coated alumina and the weight ratio of the activator-support to the metallocene compound(s) is from about 5:1 to about 1,000:1; and/or
  c) the weight ratio of the at least one olefin monomer to the metallocene compound(s) is from about 1,000:1 to about 100,000,000:1.

According to a further aspect, the polymerization conditions can include any one or any combination of more than one of the following conditions:
  a) a temperature range from about 40° C. to about 160° C.;
  b) a partial pressure of the olefin monomer comprising ethylene from about 15 psi to about 1500 psi; and/or
  c) a time of the contacting step of from about 1 minute to about 3 hours.

In a further aspect, wherein the at least one olefin monomer and the catalyst composition can be contacted under any of following conditions, or the polymerization can be conducted under any of the following conditions:
  a) the molar ratio of the co-catalyst to the metallocene is from about 1:1 to about 500:1;
  b) the weight ratio of the activator-support to the metallocene is from about 5:1 to about 1,000:1; and/or
  c) the weight ratio of the at least one olefin monomer to the metallocene is from about 1,000:1 to about 100,000,000:1; or
  d) any combination thereof.

The polymerization process is not limited to a specific reactor design or method. For example, the process for polymerizing olefins can be conducted in a polymerization reactor system comprising a batch reactor, a slurry reactor, a loop-slurry reactor, a gas phase reactor, a solution reactor, a high pressure reactor, a tubular reactor, an autoclave reactor, a continuous stirred tank reactor (CSTR), or a combination thereof. A loop-slurry reactor can be particularly useful. Further, the polymerization can be conducted in a polymerization reactor system comprising a single reactor, or can be conducted in a polymerization reactor system comprising two or more reactors.

For example, in an aspect, the polymerization conditions suitable to form a polyethylene can comprise a polymerization reaction temperature from about 50° C. to about 160° C. and a reaction pressure from about 100 psig to about 1000 psig (about 1.4 to about 6.9 MPa). Alternatively, the polymerization reaction temperature can be from about 60° C. to about 160° C. and a reaction pressure from about 200 psig to about 1000 psig. In another aspect, no hydrogen is added to the polymerization reactor system. In a further aspect, hydrogen is added to the polymerization reactor system when desired.

In an aspect, the polymerization conditions can comprise contacting the catalyst composition with at least one olefin monomer in the presence of a diluent selected from at least one olefin monomer in the case of bulk polymerizations, propane, butanes (for example, n-butane, iso-butane), pentanes (for example, n-pentane, iso-pentane), hexanes, heptanes, octanes, petroleum ether, light naphtha, heavy naphtha, and the like, or any combination thereof. In another aspect, the polymerization conditions can comprise contacting the catalyst composition with at least one olefin monomer in the presence of a diluent selected from any suitable aromatic hydrocarbon solvent, or any aromatic hydrocarbon solvent disclosed herein, for example, benzene, xylene, toluene, and the like.

The polymerization conditions also can comprise a co-polymerization of ethylene with a co-monomer or more than one co-monomer as described herein. For example, the olefin monomer can further comprise at least one $C_3$ to $C_{20}$ olefin comonomer. In one aspect, the olefin monomer can further comprise at least one olefin comonomer, the comonomer comprising, consisting essentially of, or being selected from propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-1-hexene, 1-heptene, 2-heptene, 3-heptene, 1-octene, 1-decene, styrene, or a combination thereof.

The disclosure also provides for, in an aspect, a process for polymerizing an olefin wherein the step of providing a catalyst composition further comprises providing the contact product in a solvent. That is, the step of contacting the catalyst composition components can be and typically is carried out in a solvent or a combination of solvents. Moreover, any order of contacting the components can be used. For example, the co-catalyst can be contacted in a solvent prior to contact with the metallocene compound(s). In another aspect, the co-catalyst, the activator such as an activator-support, and the at least one olefin monomer comprising ethylene can be contacted in a solvent prior to contact with the metallocene compound(s). According to other aspects, the co-catalyst and the metallocene compound can be contacted in a solvent in the presence or absence of the at least one olefin monomer comprising ethylene, prior to contacting with the activator-support. A further aspect provides that the activator-support and the metallocene compound can be contacted in a solvent in the presence or absence of the at least one olefin monomer comprising ethylene, prior to contacting with the co-catalyst.

According to an aspect, the polymerization process can be conducted in a tubular reactor, under suitable polymerization conditions. In a further aspect, the polymerization process can be conducted in continuous stirred tank reactor (CSTR), under suitable polymerization conditions.

In some aspects, a catalyst composition prepared according to this disclosure can be characterized by a total activator-support activity in a range from about 20 g/g·h (grams polyethylene per gram of activator-support per hour) to about 10,000 g/g·h. In other aspects, a catalyst composition prepared according to this disclosure can be characterized by a total metallocene activity in a range from about 10,000 g/g·h (grams polyethylene per gram of metallocene per hour) to about 2,000,000 g/g·h.

Polymer Properties

In an aspect, the polyethylene (PE) prepared by the process disclosed herein can be characterized by a number-average molecular weight (Mn) in a range of from about 10,000 g/mol to about 250,000 g/mol, from about 20,000 g/mol to about 200,000 g/mol, or from about 30,000 g/mol to about 150,000 g/mol. The PE prepared by the process disclosed herein can be characterized by a weight-average molecular weight (Mw) in a range of from about 40,000 g/mol to about 500,000 g/mol, from about 60,000 g/mol to about 450,000 g/mol, or from about 75,000 g/mol to about 400,000 g/mol.

In a further aspect, polyethylene (PE) prepared by the process disclosed herein can be characterized by a density of the olefin polymer in a range of from about 0.915 g/cm$^3$ to about 0.960 g/cm$^3$, or from about 0.92 g/cm$^3$ to about 0.95 g/cm$^3$. The PE prepared by this process also can be characterized by a melt index (MI) in a range of from about 0 g/10 min to about 10 g/10 min, from about 0.1 g/10 min to about 5 g/10 min, or from about 0.5 g/10 min to about 5 g/10 min.

Articles

This disclosure also provides, in an aspect, a method for forming or preparing an article of manufacture comprising an olefin polymer, in which the method can comprise
  a) performing the olefin polymerization process according to any process disclosed herein; and
  b) fabricating the article of manufacture comprising the olefin polymer by any technique disclosed herein.

In another aspect, the article of manufacture comprising the olefin polymer that can be fabricated or made can be, for example, an agricultural film, an automobile part, a bottle, a drum, a fiber or fabric, a food packaging film or container, a container preform, a food service article, a fuel tank, a geomembrane, a household container, a liner, a molded product, a medical device or material, a pipe, a sheet or tape, or a toy.

The present disclosure is further illustrated by the following examples, which are not to be construed in any way as imposing limitations upon the scope thereof. On the contrary, it is to be clearly understood that resort can be had to various other aspects, embodiments, modifications, and equivalents thereof which, after reading the description herein, may suggest themselves to one of ordinary skill in the art without departing from the spirit of the present invention or the scope of the appended claims.

In the following examples, unless otherwise specified, the syntheses and preparations described therein were carried out under an inert atmosphere such as nitrogen and/or argon. Solvents were purchased from commercial sources and were typically dried prior to use. Unless otherwise specified, reagents were obtained from commercial sources.

EXAMPLES

General Considerations

Unless otherwise noted, all manipulations using air sensitive reagents were performed under standard Schlenk line or dry box techniques. Anhydrous ether (diethyl ether), heptane, and toluene were sparged with nitrogen and stored over 4 Å molecular sieves prior to use. All reagents were purchased from Aldrich Chemical Company and used as received unless otherwise specified. The deuterated solvents $C_6D_6$, $CD_2Cl_2$, and $CDCl_3$ (Cambridge Isotope Laboratories) were degassed and stored over 4 Å molecular sieves in a dry box prior to use.

Polymer Characterization Resin properties include molecular weight distribution (MWD), short chain branching (SCB), density, weight average molecular weight (Mw), number average molecular weight (Mn), polydispersity index ("PDI", Mw/Mn), and the like.

Melt index (MI, g/10 min or dg/min) was measured by measuring the rate of flow of a molten resin through an orifice of 0.0825 inch diameter as determined in accordance with ASTM D1238 at 190° C., with a 2,160 gram weight. High Load Melt Index (HMLI, dg/min) was measured by measuring the rate of flow of a molten resin through an orifice of 0.0825 inch diameter when subjected to a force of 21.6 kg at 190° C. in accordance with ASTM D1238.

Density was determined in grams per cubic centimeter (g/cm$^3$) on a compression molded sample, cooled at 15° C. per hour, and conditioned for 40 hours at room temperature in accordance with ASTM D1505 and ASTM D4703.

Molecular weights and molecular weight distributions were obtained using a PL-GPC 220 (Polymer Labs, an Agilent Company) system equipped with a IR4 detector (Polymer Char, Spain) and three Styragel HMW-6E GPC columns (Waters, Mass.) running at 145° C. The flow rate of the mobile phase 1,2,4-trichlorobenzene (TCB) containing 0.5 g/L 2,6-di-t-butyl-4-methylphenol (BHT) was set at 1 mL/min, and polymer solution concentrations were in the range of 0.5-1.0 mg/mL, depending on the molecular weight. Sample preparation was conducted at 150° C. for nominally 4 hours with occasional and gentle agitation, before the solutions were transferred to sample vials for injection. An injection volume of about 400 µL was used. The integral calibration method was used to deduce molecular weights and molecular weight distributions using a Chevron Phillips Chemical Company's HDPE polyethylene resin, MARLEX® BHB5003, as the standard. The integral table of the standard was predetermined in a separate experiment with SEC-MALS. Mn is the number-average molecular weight, Mw is the weight-average molecular weight, Mz is the z-average molecular weight, and Mp is the peak molecular weight (location, in molecular weight, of the highest point of the molecular weight distribution curve). The IB parameter was determined from the molecular weight distribution curve (that is, a plot of dW/d(Log M) vs. Log M; normalized to an area under the curve), and is defined as $1/[dW/d(\text{Log } M)]_{MAX}$.

Melt rheological characterizations were performed as follows. Small-strain (less than 10%) oscillatory shear measurements were performed on an Anton Paar MCR rheometer using parallel-plate geometry. All rheological tests were performed at 190° C. The complex viscosity |η*| versus frequency (ω) data were then curve fitted using the modified three parameter Carreau-Yasuda (CY) empirical model to obtain the zero shear viscosity—$η_0$, characteristic viscous relaxation time—$τ_η$, and the breadth parameter, α (CY-a parameter). The simplified Carreau-Yasuda (CY) empirical model is as follows:

$$|\eta^*(\omega)| = \frac{\eta_0}{[1 + (\tau_\eta \omega)^\alpha]^{(1-n)/\alpha}}$$

wherein:
  |η*(ω)|=magnitude of complex shear viscosity;
  $η_0$=zero shear viscosity;
  $τ_η$=viscous relaxation time (Tau(η));
  α="breadth" parameter (CY-a parameter);
  n=fixes the final power law slope, fixed at 2/11; and
  ω=angular frequency of oscillatory shearing deformation.

Details of the significance and interpretation of the CY model and derived parameters can be found in: C. A. Hieber and H. H. Chiang, *Rheol. Acta,* 28, 321 (1989); C. A. Hieber and H. H. Chiang, *Polym. Eng. Sci.,* 32, 931 (1992); and R. B. Bird, R. C. Armstrong and O. Hasseger, *Dynamics of*

Polymeric Liquids, Volume 1, Fluid Mechanics, 2nd Edition, John Wiley & Sons (1987); each of which is incorporated herein by reference in its entirety.

Activator-Support Preparation

Fluorided silica-coated alumina activator-supports (mullites) were prepared as follows. Bohemite was obtained from W.R. Grace & Company under the designation "Alumina A" and having a surface area of 300 m$^2$/g, a pore volume of 1.3 mL/g, and an average particle size of 100 microns. The alumina was first calcined in dry air at about 600° C. for approximately 6 hours, cooled to ambient temperature, and then contacted with tetraethylorthosilicate in isopropanol to equal 25 wt. % SiO$_2$. After drying, the silica-coated alumina was calcined at 600° C. for 3 hours. Fluorided silica-coated alumina (7 wt. % F) was prepared by impregnating the calcined silica-coated alumina with an ammonium bifluoride solution in methanol, drying, and then calcining for 3 hours at 600° C. in dry air. Afterward, the fluorided silica-coated alumina (mullite) was collected and stored under dry nitrogen, and was used without exposure to the atmosphere.

Ligand Preparation Procedure

A 250 mL flask was charged with 0.0375 mol of 2,7-di-tert-butylfluorene and 100 mL of diethyl ether. At ambient temperature, 0.075 mol of n-BuLi (2.5 M, in heptane) was added over 30 minutes. After the resulting mixture was stirred overnight at room temperature, 0.0375 mol of fulvene (6,6-dimethylfulvene or 6-butenyl-6-methylfulvene) was added at –30° C. After this mixture was stirred overnight at room temperature, 0.0375 mol of BrR (R=CH$_2$CH$_2$OCH$_3$, CH$_2$CH$_2$OC$_6$H$_5$, CH$_2$CH$_2$CH$_2$CH$_2$OCH$_3$, or CH$_2$CH$_2$CH$_2$CH$_2$OC$_6$H$_5$) was added at –30° C. The mixture was stirred overnight at room temperature and then cooled in an ice bath. To the flask, 100 mL of a saturated aqueous solution of ammonium chloride was added. The solution was extracted with diethyl ether, the combined organics were washed with water, dried over magnesium sulfate and the volatiles removed on a rotary evaporator. The resulting white or light-yellow solid was washed by methanol and dried under vacuum (55-85% yield).

Metallocene Compound Preparation Procedure

The metallocene preparation procedure is outlined in Scheme 1. A 250 mL flask was charged with 0.00375 mol of the ligand prepared as described above and 150 mL of diethyl ether. At ambient temperature, 0.0075 mol of n-BuLi (1.6 M, in heptane) was added over 30 minutes. After this mixture was stirred overnight at room temperature, 0.00375 mol of ZrCl$_4$ was added at –30° C. This mixture was then stirred overnight at room temperature. The volatiles from this mixture were removed in vacuo, the residue was dissolved in toluene and the mixture was filtered to remove LiCl. The solution was concentrated in vacuo, and pentane was added causing the precipitation of a solid. The solid was collected by filtration, washed multiple times with pentane and dried in vacuo (35-65% yield).

Scheme 1

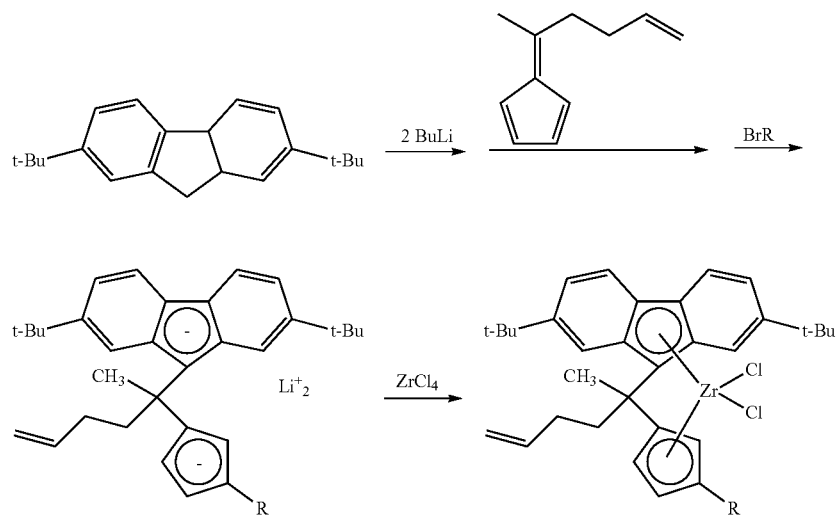

R = CH$_2$CH$_2$OC$_6$H$_5$ (1), CH$_2$CH$_2$CH$_2$CH$_2$OC$_6$H$_5$ (2), and CH$_2$CH$_2$CH$_2$CH$_2$OCH$_3$ (3)

Polymerization Procedure

All polymerization runs were conducted in a one-gallon stainless steel reactor. Isobutane (approximately 2 L) was used in all runs. A metallocene solution of the desired bridged metallocene compound was prepared at a concentration of about 1 mg/mL in toluene. A 0.8 mL portion of triisobutylaluminum (1.0 M in heptane), approximately 100 mg of mullite (fluorided silica-coated alumina), and 1.0 mL or 0.5 mL of metallocene solution were added in that order through a charge port, while slowly venting isobutane vapor. The charge port was closed, and isobutane was added. The contents of the reactor were stirred and heated to the desired run temperature, and 1-hexene and ethylene/H$_2$ were then introduced into the reactor. Ethylene was fed on demand to maintain the target pressure. The reactor was maintained at the desired temperature throughout the run by an automated heating-cooling system. Once the polymerization run was finished, feeds were closed, and the reactor was vented and cooled to ambient conditions. The resulting polymer fluff was removed and dried under vacuum at 50° C.

Table 1 through Table 4 summarize the conditions of each polymerization run using metallocene compounds 1 (Table 1), 2 (Table 2), 3 (Table 3), and 5 (Table 4) according to the general polymerization procedure outlined above. Table 5 through Table 8 summarize the resin properties of the resins generated according to the conditions set out in Table 1 through Table 4, respectively, that is, using metallocene compounds 1 (Table 5), 2 (Table 6), 3 (Table 7), and 5 (Table 8). Finally, Table 9 sets out a molecular weight distribution (MWD) comparison between resins made using metallocene 1 and metallocene 4.

In the data tables, the metallocene compounds 1, 2, and 3 were prepared as described above and used in polymerization studies.

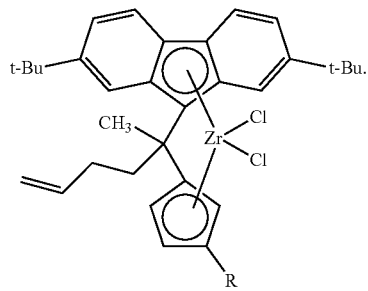

R = CH$_2$CH$_2$OC$_6$H$_5$ (1);
R = CH$_2$CH$_2$CH$_2$CH$_2$OC$_6$H$_5$ (2); and
R = CH$_2$CH$_2$CH$_2$CH$_2$OCH$_3$ (3)

The comparative metallocenes used in the polymerization studies are shown below as metallocene compounds 4 and 5.

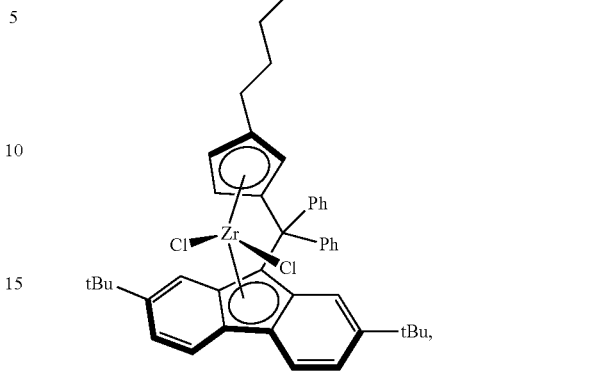

(4)

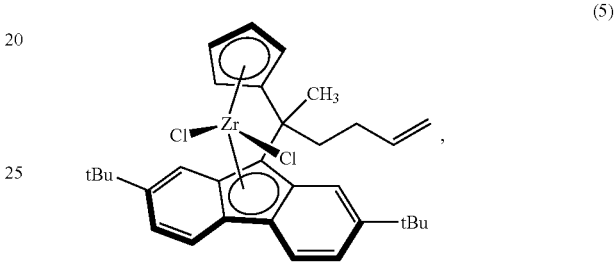

(5)

In the tables, the following abbreviations are used: Met, metallocene; TIBA, triisobutyl aluminum; $C_2^=$, ethylene; H2, hydrogen; Temp, temperature; $C_6^=$, 1-hexene; mullite, fluorided silica-coated alumina; PE, polyethylene; MI, melt index; HLMI, high load melt index; Mn, number average molecular weight; Mw, weight average molecular weight; Mz, z average molecular weight; Mw/Mn, molecular weight distribution or polydispersity; Eta-0 ($\eta_0$), zero shear viscosity; and Tau-eta (Tau($\eta$) or $\tau_\eta$), viscous relaxation time.

TABLE 1

Evaluation of metallocene 1

| Example | Met(mg) | TIBA (mL) | $C_2^=$ (psi) | H2 (ppm) | Temp (° C.) | Time (min) | $C_6^=$(g) | mullite (g) | PE(g) |
|---|---|---|---|---|---|---|---|---|---|
| 1 | 1 | 0.5 | 403 | 0 | 90 | 30 | 0 | 0.206 | 276 |
| 2 | 1 | 0.5 | 403 | 100 | 90 | 30 | 0 | 0.102 | 87 |
| 3 | 1 | 0.5 | 403 | 150 | 90 | 30 | 0 | 0.075 | 75 |
| 4 | 1 | 0.5 | 403 | 200 | 90 | 30 | 0 | 0.1 | 117 |
| 5 | 1 | 0.5 | 403 | 250 | 90 | 30 | 0 | 0.103 | 80 |
| 6 | 1 | 0.5 | 320 | 150 | 80 | 30 | 5 | 0.101 | 39 |
| 7 | 1 | 0.5 | 320 | 150 | 80 | 30 | 25 | 0.101 | 96 |
| 8 | 1 | 0.5 | 320 | 150 | 80 | 30 | 35 | 0.1 | 100 |
| 9 | 1 | 0.8 | 320 | 250 | 80 | 30 | 40 | 0.095 | 116 |
| 10 | 1 | 0.8 | 320 | 200 | 80 | 30 | 30 | 0.093 | 160 |
| 11 | 1.5 | 0.8 | 320 | 275 | 80 | 30 | 38 | 0.135 | 168 |
| 12 | 1.5 | 0.8 | 320 | 300 | 80 | 30 | 35 | 0.12 | 137 |
| 13 | 1.5 | 0.8 | 320 | 350 | 80 | 30 | 35 | 0.142 | 128 |
| 14 | 1.5 | 0.8 | 320 | 400 | 80 | 30 | 35 | 0.14 | 142 |
| 15 | 1.5 | 0.8 | 320 | 250 | 80 | 30 | 0 | 0.143 | 136 |
| 16 | 1.5 | 0.8 | 320 | 300 | 80 | 30 | 0 | 0.121 | 121 |
| 17 | 1.5 | 0.8 | 320 | 350 | 80 | 30 | 0 | 0.144 | 108 |
| 18 | 1.5 | 0.8 | 320 | 400 | 80 | 30 | 0 | 0.141 | 103 |

TABLE 2

Evaluation of metallocene 2

| Example# | Met(mg) | TIBA (mL) | $C_2^=$ (psi) | H2 (ppm) | Temp (° C.) | Time (min) | $C_6^=$ (g) | mullite (g) | PE (g) |
|---|---|---|---|---|---|---|---|---|---|
| 19 | 0.5 | 0.8 | 320 | 150 | 80 | 30 | 35 | 0.09 | 203 |
| 20 | 0.5 | 0.8 | 320 | 100 | 80 | 30 | 35 | 0.122 | 210 |
| 21 | 0.5 | 0.8 | 320 | 150 | 80 | 30 | 35 | 0.111 | 201 |
| 22 | 0.5 | 0.8 | 320 | 100 | 80 | 30 | 35 | 0.111 | 200 |
| 23 | 0.5 | 0.8 | 320 | 200 | 80 | 30 | 35 | 0.117 | 265 |
| 24 | 0.5 | 0.8 | 320 | 300 | 80 | 30 | 35 | 0.113 | 176 |

TABLE 3

Evaluation of metallocene 3

| Example | Met(mg) | TIBA (mL) | $C_2^=$ (psi) | H2 (ppm) | Temp (° C.) | Time (min) | $C_6^=$ (g) | mullite (g) | PE(g) |
|---|---|---|---|---|---|---|---|---|---|
| 25 | 0.5 | 0.8 | 320 | 150 | 80 | 30 | 35 | 0.104 | 226 |
| 26 | 0.5 | 0.8 | 320 | 100 | 80 | 30 | 35 | 0.113 | 151 |
| 27 | 0.5 | 0.8 | 320 | 150 | 80 | 30 | 35 | 0.109 | 200 |
| 28 | 0.5 | 0.8 | 320 | 200 | 80 | 30 | 35 | 0.122 | 261 |
| 29 | 0.5 | 0.8 | 320 | 300 | 80 | 30 | 35 | 0.104 | 257 |

TABLE 4

LLDPE conditions using metallocene 5

| Example | Met(mg) | TIBA (mL) | $C_2^=$ (psi) | H2 (ppm) | Temp (° C.) | Time (min) | $C_6^=$ (g) | mullite (g) | PE (g) |
|---|---|---|---|---|---|---|---|---|---|
| 30 | 1 | 0.8 | 320 | 150 | 80 | 30 | 38 | 0.093 | 239 |

TABLE 5

Polyethylene resins made using metallocene 1

| Example | MI | HLMI | density | Mn/1000 | Mw/1000 | Mz/1000 | Mw/Mn | Mz/Mw | Eta_0 | Tau_eta |
|---|---|---|---|---|---|---|---|---|---|---|
| 1 | 0.00 | 0.00 | 0.9379 | 148.35 | 360.31 | 755.44 | 2.43 | 2.10 | 8.92E+05 | 1.22E+00 |
| 2 | 0.00 | 0.00 | 0.9476 | 70.89 | 173.92 | 332.08 | 2.45 | 1.91 | 2.74E+04 | 3.60E-02 |
| 3 | 0.00 | 0.00 | 0.9431 | 91.49 | 223.86 | 418.71 | 2.45 | 1.87 | 7.94E+04 | 1.11E-01 |
| 4 | 0.36 | 13.00 | 0.9519 | 47.79 | 132.97 | 268.42 | 2.78 | 2.02 | 8.36E+03 | 1.04E-02 |
| 5 | 1.00 | 26.90 | 0.9550 | 36.4 | 98.5 | 192.18 | 2.71 | 1.95 | 3.48E+03 | 4.14E-03 |
| 6 | 0.00 | 1.80 | 0.9347 | 84.85 | 208.85 | 413.15 | 2.46 | 1.98 | 1.56E+05 | 1.53E-01 |
| 7 | 0.25 | 5.60 | 0.9168 | 67.82 | 154.73 | 301.17 | 2.28 | 1.95 | 6.22E+04 | 4.49E-02 |
| 8 | 0.35 | 7.30 | 0.9130 | 65.67 | 147.09 | 276.07 | 2.24 | 1.88 | 2.32E+04 | 2.46E-02 |
| 9 | 0.58 | 17.00 | 0.9134 | 45.2 | 108.25 | 198.35 | 2.39 | 1.83 | 6.90E-03 | 6.90E-03 |
| 10 | 0.27 | 10.25 | 0.9222 | 46.81 | 122.4 | 243.04 | 2.61 | 1.99 | 1.00E-02 | 1.00E-02 |
| 11 | 0.89 | 31.00 | 0.9208 | 37.7 | 105.25 | 213.59 | 2.79 | 2.03 | 4.28E+03 | 4.36E-03 |
| 12 | 0.54 | 21.40 | 0.9170 | 43.94 | 107 | 203.17 | 2.44 | 1.90 | 4.22E+03 | 4.99E-03 |
| 13 | 0.75 | 31.80 | 0.9170 | 40.04 | 99.13 | 186.14 | 2.48 | 1.88 | 3.01E+03 | 3.99E-03 |
| 14 | 0.95 | 45.00 | 0.9170 | 35.54 | 91.19 | 181.62 | 2.57 | 1.99 | 2.04E+03 | 2.51E-03 |
| 15 | 0.58 | 19.22 | 0.9520 | 49.63 | 135.06 | 280.58 | 2.72 | 2.08 | 8.90E+03 | 9.13E-03 |
| 16 | 0.74 | 25.00 | 0.9532 | 43.38 | 121.25 | 245.01 | 2.8 | 2.02 | 6.26E+03 | 6.80E-03 |
| 17 | 1.34 | 46.00 | 0.9560 | 36.37 | 103.53 | 214.47 | 2.85 | 2.07 | 2.74E+03 | 3.54E-03 |
| 18 | 5.00 | 89.00 | 0.9579 | 31.25 | 90.92 | 187.27 | 2.91 | 2.06 | 1.65E+03 | 2.48E-03 |

TABLE 6

Polyethylene resins made using metallocene 2

| Example | MI | HLMI | density | Mn/1000 | Mw/1000 | Mz/1000 | Mw/Mn | Mz/Mw | Eta_0 | Tau_eta |
|---|---|---|---|---|---|---|---|---|---|---|
| 19 | 0.69 | 15.00 | 0.9195 | 50.53 | 141.28 | 311.38 | 2.8 | 2.20 | 1.85E+04 | 8.63E-03 |
| 20 | 0.16 | 5.60 | 0.9187 | 61.35 | 184.54 | 409.94 | 3.01 | 2.22 | 4.93E+04 | 4.39E-02 |
| 21 | 0.90 | 18.80 | 0.9202 | 47.6 | 137.13 | 293.44 | 2.88 | 2.14 | 9.59E+03 | 8.90E-03 |
| 22 | 0.20 | 6.80 | 0.9182 | 56.06 | 172.66 | 385.1 | 3.08 | 2.23 | 4.62E+04 | 2.60E-02 |
| 23 | 1.47 | 28.70 | 0.9196 | 41.42 | 123.43 | 281.26 | 2.98 | 2.28 | 5.73E+03 | 5.74E-03 |
| 24 | 1.80 | 32.00 | 0.9142 | 38.4 | 110.42 | 242.78 | 2.88 | 2.20 | 4.04E+03 | 3.51E-03 |

TABLE 7

Polyethylene resins made using metallocene 3

| Example | MI | HLMI | density | Mn/1000 | Mw/1000 | Mz/1000 | Mw/Mn | Mz/Mw | Eta_0 | Tau_eta |
|---|---|---|---|---|---|---|---|---|---|---|
| 25 | 1.20 | 28.00 | 0.9246 | 40.97 | 122.24 | 279.59 | 2.98 | 2.29 | 8.63E+03 | 9.47E−03 |
| 26 | 0.25 | 6.10 | 0.9196 | 70.49 | 174.96 | 367.3 | 2.48 | 2.10 | 5.17E+04 | 3.60E−02 |
| 27 | 0.44 | 13.10 | 0.9182 | 56.01 | 156.86 | 354.21 | 2.8 | 2.26 | 2.18E+04 | 2.16E−02 |
| 28 | 1.60 | 31.80 | 0.9227 | 40.52 | 108.24 | 214.22 | 2.67 | 1.98 | 4.12E+03 | 5.21E−03 |
| 29 | 2.90 | 58.98 | 0.9220 | 37.47 | 96.28 | 189.62 | 2.57 | 1.97 | 2.42E+03 | 3.35E−03 |

TABLE 8

Polyethylene resins made using metallocene 5

| Example | MI | HLMI | density | Mn/1000 | Mw/1000 | Mz/1000 | Mw/Mn | Mz/Mw | Eta_0 | Tau_eta |
|---|---|---|---|---|---|---|---|---|---|---|
| 30 | 1.00 | 23.00 | 0.9200 | | | | | | 5.11E+03 | 7.61E−03 |

TABLE 9

MWD (molecular weight distribution) comparison between resins made using metallocene 1 and metallocene 4

| Example | MI | HLMI | Mn/1000 | Mw/1000 | Mz/1000 | Mw/Mn | Mz/Mw |
|---|---|---|---|---|---|---|---|
| Resins made using metallocene 1 | | | | | | | |
| 7 | 0.25 | 5.60 | 67.82 | 154.73 | 301.17 | 2.28 | 1.95 |
| 17 | 1.34 | 46.00 | 36.37 | 10.3.53 | 214.47 | 2.85 | 2.07 |
| 18 | 5.00 | 89.00 | 31.25 | 90.92 | 187.27 | 2.91 | 2.06 |
| Resins made using metallocene 4 | | | | | | | |
| 31 | 0.25 | 10.8 | 43.32 | 175.43 | 464.76 | 4.05 | 2.65 |
| 32 | 1.31 | 54.1 | 26.38 | 137.68 | 436.77 | 5.22 | 3.17 |
| 33 | 5.4 | 168.9 | 10.17 | 98.81 | 567.75 | 9.72 | 5.75 |

Polymerization Results

One challenge in polyethylene production is to make LLDPE resins having a low melt index (less than 1 MI) using only a single metallocene catalyst. For example, LLDPE resins having this feature are generally made using two different metallocenes. Referring to the Examples and data tables, new metallocenes with pendant oxygen-containing heterohydrocarbyl groups were prepared according to Scheme 1 and evaluated in a bench reactor. These metallocenes produced LLDPE resins with lower MI using mullite (fluorided silica-coated alumina), as compared with the resins product using metallocene 5 and mullite under the same or similar conditions. Triisobutylaluminum was used as a co-catalyst in the polymerizations.

Metallocene 1 having a pendant $CH_2CH_2OC_6H_5$ group on the cyclopentadienyl ligand, characterized by an oxygen atom which is 3 atoms removed from the cyclopentadienyl ring, produces a higher molecular weight polymer compared with the polymer produced under similar polymerization conditions using metallocene 5. The hydrogen response observed for metallocene 1 is lower than that of metallocene 5 on mullite. For example, as compared to metallocene 5, almost double the amount of hydrogen is needed in the bench reactor to make melt index 1 LLDPE when using metallocene 1 on mullite.

Figure 2:
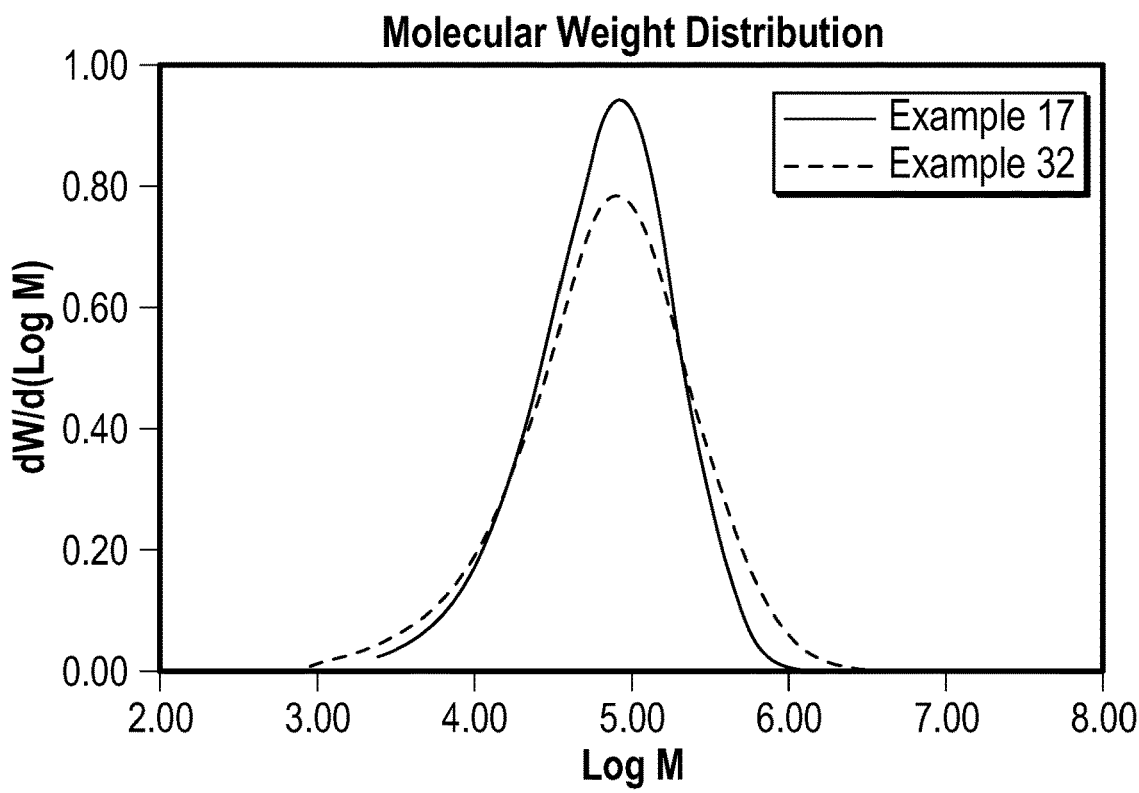
FIG. 2 illustrates the molecular weight distribution (MWD) profile comparison of two MI 1.3 dg/min polyethylenes, one produced using metallocene 1 according to Example 17 and the other produced using metallocene 4 according to Example 32.
Figure 3:
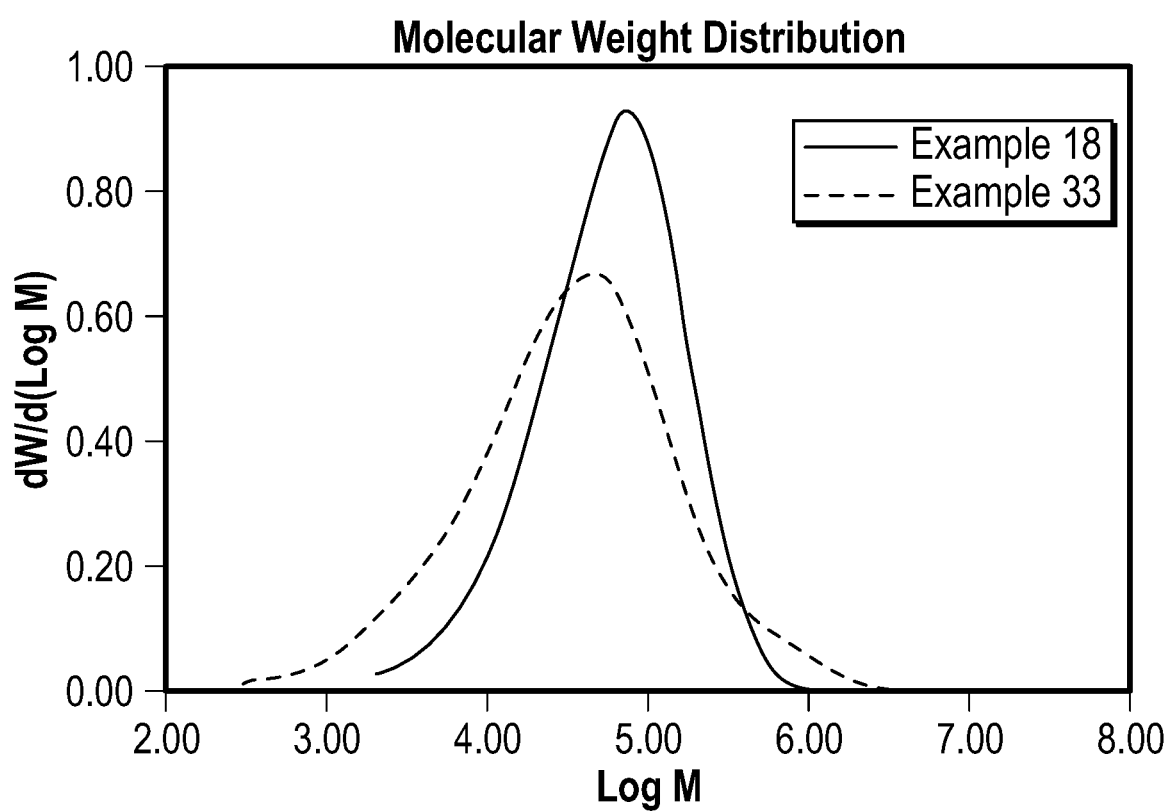
FIG. 3 illustrates the molecular weight distribution (MWD) profile comparison of two MI 5 dg/min polyethylenes, one produced using metallocene 1 according to Example 18 and the other produced using metallocene 4 according to Example 33.

Upon increasing the hydrogen concentration in the bench reactor, metallocene 1 still produced relatively narrow molecular weight distribution polymers. See FIG. 1, FIG. 2, FIG. 3, and Table 9. The molecular weight distribution of metallocene 1 polymers was narrower than resins made using metallocene 4. Because metallocene 1 not only produces high molecular weight low density resins but also produces low molecular weight high density resins with the narrow molecular weight distributions, it is applicable to metallocene-based dual loop polymerization applications.

It is also observed that the longer chain pendant ether groups (oxygen-containing heterohydrocarbyl groups) on the cyclopentadienyl ligand such as $CH_2CH_2CH_2CH_2OC_6H_5$ (metallocene 2) and $CH_2CH_2CH_2CH_2OCH_3$ (metallocene 3) impart less influence on the catalyst behaviors for ethylene polymerization than the pendant $CH_2CH_2OC_6H_5$ group on the cyclopentadienyl ligand in metallocene 1. Again, the new metallocenes are not only capable of producing high molecular weight low density resins but also producing low molecular weight high density resins with the narrow molecular weight distributions.

According, described herein is a catalyst composition, metallocenes, and processes for polymerizing olefins. These and other aspects of the invention can further include the various embodiments that are presented below.

ASPECTS OF THE DISCLOSURE

1. A metallocene compound having the formula:

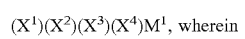

$(X^1)(X^2)(X^3)(X^4)M^1$, wherein $M^1$ is titanium, zirconium, or hafnium;

$X^1$ is a substituted or an unsubstituted fluorenyl ligand, wherein any substituent is selected independently from a $C_1$ to $C_{12}$ hydrocarbyl or a $C_1$ to $C_{12}$ heterohydrocarbyl;

$X^2$ is a cyclopentadienyl ligand substituted with a $C_2$-$C_{18}$ heterohydrocarbyl group comprising an oxygen atom positioned 5 atoms distance or less from the cyclopentadienyl ligand;

wherein $X^1$ and $X^2$ are bridged by a linking group of the formula >$ER^1R^2$, wherein E is C or Si, $R^1$ is hydrogen or a $C_1$-$C_{12}$ hydrocarbyl group, and $R^2$ is a $C_3$-$C_{12}$ alkenyl group having a terminal C=C double bond; and $X^3$ and $X^4$ are independently selected from a halide, hydride, a $C_1$-$C_{20}$ hydrocarbyl group, a $C_1$-$C_{20}$ heterohydrocarbyl group, tetrahydroborate, or $OBR^A{}_2$ or $OSO_2R^A$ wherein $R^A$ is independently a $C_1$-$C_{12}$ hydrocarbyl group.

2. A catalyst composition for polymerizing olefins, the catalyst composition comprising:

(a) metallocene compound having the formula:

$(X^1)(X^2)(X^3)(X^4)M^1$, wherein $M^1$ is titanium, zirconium, or hafnium;

$X^1$ is a substituted or an unsubstituted fluorenyl ligand, wherein any substituent is selected independently from a $C_1$ to $C_{12}$ hydrocarbyl or a $C_1$ to $C_{12}$ heterohydrocarbyl;

$X^2$ is a cyclopentadienyl ligand substituted with a $C_2$-$C_{18}$ heterohydrocarbyl group comprising an oxygen atom positioned 5 atoms distance or less from the cyclopentadienyl ligand;

wherein $X^1$ and $X^2$ are bridged by a linking group of the formula >$ER^1R^2$, wherein E is C or Si, $R^1$ is hydrogen or a $C_1$-$C_{12}$ hydrocarbyl group, and $R^2$ is a $C_3$-$C_{12}$ alkenyl group having a terminal C=C double bond; and $X^3$ and $X^4$ are independently selected from a halide, hydride, a $C_1$-$C_{20}$ hydrocarbyl group, a $C_1$-$C_{20}$ heterohydrocarbyl group, tetrahydroborate, or $OBR^A{}_2$ or $OSO_2R^A$ wherein $R^A$ is independently a $C_1$-$C_{12}$ hydrocarbyl group;

(b) optionally, a co-catalyst comprising an organoaluminum compound, an organoboron compound, an organozinc compound, an organomagnesium compound, an organolithium compound, or any combination thereof; and (c) an activator comprising a solid oxide treated with an electron-withdrawing anion (activator-support), an organoboron compound, an organoborate compound, an ionizing ionic compound, an aluminoxane compound, or any combination thereof.

3. A method of making a catalyst composition, the method comprising contacting in any order:

(a) metallocene compound having the formula:

$(X^1)(X^2)(X^3)(X^4)M^1$, wherein $M^1$ is titanium, zirconium, or hafnium;

$X^1$ is a substituted or an unsubstituted fluorenyl ligand, wherein any substituent is selected independently from a $C_1$ to $C_{12}$ hydrocarbyl or a $C_1$ to $C_{12}$ heterohydrocarbyl;

$X^2$ is a cyclopentadienyl ligand substituted with a $C_2$-$C_{18}$ heterohydrocarbyl group comprising an oxygen atom positioned 5 atoms distance or less from the cyclopentadienyl ligand;

wherein $X^1$ and $X^2$ are bridged by a linking group of the formula >$ER^1R^2$, wherein E is C or Si, $R^1$ is hydrogen or a $C_1$-$C_{12}$ hydrocarbyl group, and $R^2$ is a $C_3$-$C_{12}$ alkenyl group having a terminal C=C double bond; and $X^3$ and $X^4$ are independently selected from a halide, hydride, a $C_1$-$C_{20}$ hydrocarbyl group, a $C_1$-$C_{20}$ heterohydrocarbyl group, tetrahydroborate, or $OBR^A{}_2$ or $OSO_2R^A$ wherein $R^A$ is independently a $C_1$-$C_{12}$ hydrocarbyl group;

(b) optionally, a co-catalyst comprising an organoaluminum compound, an organoboron compound, an organozinc compound, an organomagnesium compound, an organolithium compound, or any combination thereof; and (c) an activator comprising a solid oxide treated with an electron-withdrawing anion (activator-support), an organoboron compound, an organoborate compound, an ionizing ionic compound, an aluminoxane compound, or any combination thereof.

4. A process for polymerizing olefins, the process comprising contacting at least one olefin monomer and a catalyst composition under polymerization conditions to form an olefin polymer, wherein the catalyst composition comprises:

(a) metallocene compound having the formula:

$(X^1)(X^2)(X^3)(X^4)M^1$, wherein $M^1$ is titanium, zirconium, or hafnium;

$X^1$ is a substituted or an unsubstituted fluorenyl ligand, wherein any substituent is selected independently from a $C_1$ to $C_{12}$ hydrocarbyl or a $C_1$ to $C_{12}$ heterohydrocarbyl;

$X^2$ is a cyclopentadienyl ligand substituted with a $C_2$-$C_{18}$ heterohydrocarbyl group comprising an oxygen atom positioned 5 atoms distance or less from the cyclopentadienyl ligand;

wherein $X^1$ and $X^2$ are bridged by a linking group of the formula >$ER^1R^2$, wherein E is C or Si, $R^1$ is hydrogen or a $C_1$-$C_{12}$ hydrocarbyl group, and $R^2$ is a $C_3$-$C_{12}$ alkenyl group having a terminal C=C double bond; and $X^3$ and $X^4$ are independently selected from a halide, hydride, a $C_1$-$C_{20}$ hydrocarbyl group, a $C_1$-$C_{20}$ heterohydrocarbyl group, tetrahydroborate, or $OBR^A{}_2$ or $OSO_2R^A$ wherein $R^A$ is independently a $C_1$-$C_{12}$ hydrocarbyl group;

b) optionally, a co-catalyst comprising an organoaluminum compound, an organoboron compound, an organozinc compound, an organomagnesium compound, an organolithium compound, or any combination thereof; and c) an activator comprising a solid oxide treated with an electron-withdrawing anion, an organoboron compound, an organoborate compound, an ionizing ionic compound, an aluminoxane compound, or any combination thereof.

5. A metallocene, a catalyst composition, a method of making a catalyst composition, or a process for polymerizing olefins according to any one of Aspects 1-4, wherein $M^1$ is Ti; alternatively, $M^1$ is Zr; alternatively, $M^1$ is Hf; or alternatively, $M^1$ is Zr or Hf.

6. A metallocene, a catalyst composition, a method of making a catalyst composition, or a process for polymerizing olefins according to any one of Aspects 1-5, wherein $X^1$ is a 2,7-dihydrocarbyl-substituted or 2,7-diheterohydrocarbyl-substituted fluorenyl ligand, wherein each hydrocarbyl and each heterohydrocarbyl is selected independently from a $C_1$ to $C_8$ hydrocarbyl or a $C_1$ to $C_8$ heterohydrocarbyl, respectively.

7. A metallocene, a catalyst composition, a method of making a catalyst composition, or a process for polymerizing olefins according to any one of Aspects 1-5, wherein $X^1$ is a 2,7-dihydrocarbyl-substituted or 2,7-diheterohydrocarbyl-substituted fluorenyl ligand, A metallocene, a catalyst composition, a method of making a catalyst composition, or a process for polymerizing olefins according to any one of Aspects, wherein each hydrocarbyl and each heterohydrocarbyl is selected independently from methyl, ethyl, n-propyl, isopropyl, tert-butyl, trimethylsilyl, neopentyl, or trimethylsilylmethyl.

8. A metallocene, a catalyst composition, a method of making a catalyst composition, or a process for polymerizing olefins according to any one of Aspects 1-7, wherein the heterohydrocarbyl group of $X^2$ is a $C_2$-$C_{12}$ heterohydrocarbyl group.

9. A metallocene, a catalyst composition, a method of making a catalyst composition, or a process for polymerizing olefins according to any one of Aspects 1-7, wherein the heterohydrocarbyl group of $X^2$ is selected from $[CH_2]_nOR^3$, wherein n is selected from an integer from 1 to 4 and $R^3$ is selected from a $C_1$-$C_{12}$ hydrocarbyl group or a $C_1$-$C_{12}$ heterohydrocarbyl group.

10. A metallocene, a catalyst composition, a method of making a catalyst composition, or a process for polymerizing olefins according to any one of Aspects 1-7, wherein the heterohydrocarbyl group of $X^2$ is selected from $[CH_2]_nOCH_3$, $[CH_2]_nOCH_2CH_3$, $[CH_2]_nOC_6H_5$, $[CH_2]_nOC_6H_4$-4-$CH_3$, or $[CH_2]_nOC_6H_4$-4-$OCH_3$, wherein n is selected from an integer from 1 to 4.

11. A metallocene, a catalyst composition, a method of making a catalyst composition, or a process for polymerizing olefins according to any one of Aspects 1-7, wherein the heterohydrocarbyl group of $X^2$ is selected from $CH_2CH_2OCH_3$, $CH_2CH_2OC_6H_5$, $CH_2CH_2CH_2CH_2OCH_3$, or $CH_2CH_2CH_2CH_2OC_6H_5$.

12. A metallocene, a catalyst composition, a method of making a catalyst composition, or a process for polymerizing olefins according to any one of Aspects 1-10, wherein the oxygen atom of $X^2$ is positioned 5 atoms distance from the cyclopentadienyl ligand.

13. A metallocene, a catalyst composition, a method of making a catalyst composition, or a process for polymerizing olefins according to any one of Aspects 1-10, wherein the oxygen atom of $X^2$ is positioned 4 atoms distance from the cyclopentadienyl ligand.

14. A metallocene, a catalyst composition, a method of making a catalyst composition, or a process for polymerizing olefins according to any one of Aspects 1-10, wherein the oxygen atom of $X^2$ is positioned 3 atoms distance from the cyclopentadienyl ligand.

15. A metallocene, a catalyst composition, a method of making a catalyst composition, or a process for polymerizing olefins according to any one of Aspects 1-14, wherein $X^1$ and $X^2$ are bridged by a linking group of the formula $>ER^1R^2$, wherein E is carbon or silicon, $R^1$ is a $C_1$-$C_{10}$ hydrocarbyl group, and $R^2$ is a $C_3$-$C_{10}$ alkenyl group having a terminal C=C double bond.

16. A metallocene, a catalyst composition, a method of making a catalyst composition, or a process for polymerizing olefins according to any one of Aspects 1-15, wherein $R^1$ of linking group $ER^1R^2$ is selected from hydrogen, methyl, ethyl, n-propyl, n-butyl, phenyl, or tolyl.

17. A metallocene, a catalyst composition, a method of making a catalyst composition, or a process for polymerizing olefins according to any one of Aspects 1-16, wherein $R^2$ of linking group $ER^1R^2$ is selected from —$[(CH_2)_mCH=CH_2]$ wherein m is an integer from 1 to 4.

18. A metallocene, a catalyst composition, a method of making a catalyst composition, or a process for polymerizing olefins according to any one of Aspects 1-14, wherein linking group of the formula $ER^1R^2$ is selected from $>CH[(CH_2)_2CH=CH_2]$, $>C(CH_3)[(CH_2)_2CH=CH_2]$, $>C(C_6H_5)[(CH_2)_2CH=CH_2]$, $>SiH[(CH_2)_2CH=CH_2]$, $>Si(CH_3)[(CH_2)_2CH=CH_2]$, $>Si(C_6H_5)[(CH_2)_2CH=CH_2]$, $>CH[(CH_2)_3CH=CH_2]$, $>C(CH_3)[(CH_2)_3CH=CH_2]$, $>C(C_6H_5)[(CH_2)_3CH=CH_2]$, $>SiH[(CH_2)_3CH=CH_2]$, $>Si(CH_3)[(CH_2)_3CH=CH_2]$, or $>Si(C_6H_5)[(CH_2)_3CH=CH_2]$.

19. A metallocene, a catalyst composition, a method of making a catalyst composition, or a process for polymerizing olefins according to any one of Aspects 1-14, wherein linking group of the formula $ER^1R^2$ is selected from $>C(CH_3)[(CH_2)_2CH=CH_2]$ or $>C(CH_3)[(CH_2)_3CH=CH_2]$.

20. A metallocene, a catalyst composition, a method of making a catalyst composition, or a process for polymerizing olefins according to any one of Aspects 1-19, wherein $X^3$ and $X^4$ are independently selected from F, Cl, Br, a hydride, a $C_1$-$C_{12}$ hydrocarbyl group, a $C_1$-$C_{12}$ hydrocarbyloxide group, a $C_1$-$C_{12}$ hydrocarbylamino group, or a trihydrocarbylsilyl group wherein each hydrocarbyl is independently a $C_1$-$C_{12}$ hydrocarbyl group.

21. A metallocene, a catalyst composition, a method of making a catalyst composition, or a process for polymerizing olefins according to any one of Aspects 1-19, wherein $X^3$ and $X^4$ are independently selected from Cl, hydride, or methyl.

22. A metallocene, a catalyst composition, a method of making a catalyst composition, or a process for polymerizing olefins according to any one of Aspects 1-4, wherein the metallocene compound is selected from:

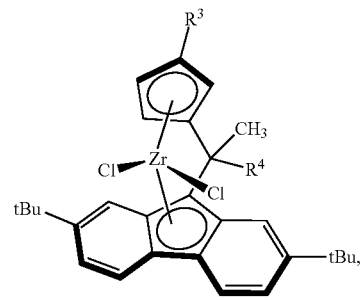

wherein $R^3$ is selected from $[CH_2]_nOCH_3$, $[CH_2]_nOCH_2CH_3$, $[CH_2]_nOC_6H_5$, $[CH_2]_nOC_6H_4$-4-$CH_3$, or $[CH_2]_nOC_6H_4$-4-$OCH_3$, wherein n is selected from an integer from 1 to 4, and $R^4$ is selected from —$[(CH_2)_mCH=CH_2]$ wherein m is an integer from 1 to 4.

23. A metallocene, a catalyst composition, a method of making a catalyst composition, or a process for polymerizing olefins according to any one of Aspects 1-4, wherein the metallocene compound is selected from:

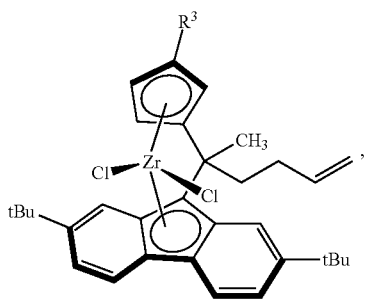

wherein $R^3$ is selected from $[CH_2]_nOCH_3$ or $[CH_2]_nOC_6H_5$, wherein n is selected from an integer from 2 to 4.

24. A metallocene, a catalyst composition, a method of making a catalyst composition, or a process for polymerizing olefins according to any one of Aspects 1-4, wherein the metallocene compound is selected from:

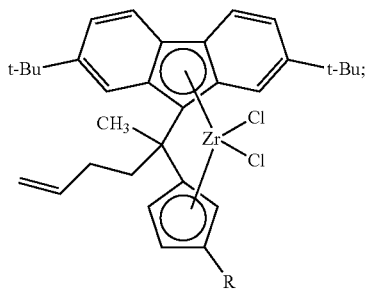

wherein (a) R is selected from $[CH_2]_nOCH_3$, $[CH_2]_nOCH_2CH_3$, $[CH_2]_nOC_6H_5$, $[CH_2]_nOC_6H_4\text{-}4\text{-}CH_3$, or $[CH_2]_nOC_6H_4\text{-}4\text{-}OCH_3$, and wherein n is selected from an integer from 1 to 4; or (b) R is selected from $CH_2CH_2OCH_3$, $CH_2CH_2CH_2OCH_3$, $CH_2CH_2CH_2CH_2OCH_3$, $CH_2CH_2OC_6H_5$, $CH_2CH_2CH_2O\ C_6H_5$, or $CH_2CH_2CH_2CH_2OC_6H_5$.

25. A metallocene, a catalyst composition, a method of making a catalyst composition, or a process for polymerizing olefins according to any one of Aspects 1-4, wherein the metallocene compound is selected from:

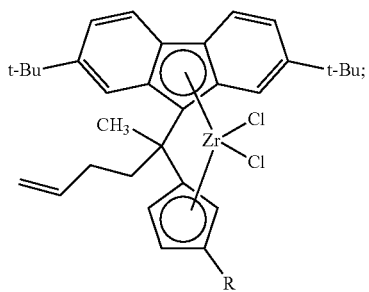

wherein

R is selected from $[CH_2]_nOCH_3$, $[CH_2]_nOCH_2CH_3$, $[CH_2]_nOC_6H_5$, $[CH_2]_nOC_6H_4\text{-}4\text{-}CH_3$, or $[CH_2]_nOC_6H_4\text{-}4\text{-}OCH_3$, wherein n is selected from an integer from 1 to 4.

26. A catalyst composition, a method of making a catalyst composition, or a process for polymerizing olefins according to any one of Aspects 2-25, wherein the solid oxide comprises or is selected from $Al_2O_3$, $B_2O_3$, BeO, $Bi_2O_3$, CdO, $Co_3O_4$, $Cr_2O_3$, CuO, $Fe_2O_3$, $Ga_2O_3$, $La_2O_3$, $Mn_2O_3$, $MoO_3$, $Na_2O$, NiO, $P_2O_5$, $Sb_2O_5$, $SiO_2$, $SnO_2$, SrO, $ThO_2$, $TiO_2$, $V_2O_5$, $WO_3$, $Y_2O_3$, ZnO, $ZrO_2$, $K_2O$, CaO, $La_2O_3$, $Ce_2O_3$, mixtures thereof, mixed oxides thereof, and any combinations thereof.

27. A catalyst composition, a method of making a catalyst composition, or a process for polymerizing olefins according to any one of Aspects 2-25, wherein the solid oxide comprises or is selected from silica, alumina, titania, zirconia, magnesia, boria, calcia, zinc oxide, silica-alumina, silica-coated alumina, silica-titania, silica-zirconia, silica-magnesia, alumina-titania, alumina-zirconia, zinc-aluminate, alumina-boria, silica-boria, aluminum phosphate, aluminophosphate, aluminophosphate-silica, magnesium aluminate, titania-zirconia, boehmite, heteropolytungstates, mixed oxides thereof, or any combination thereof.

28. A catalyst composition, a method of making a catalyst composition, or a process for polymerizing olefins according to any one of Aspects 2-27, wherein the electron-withdrawing anion comprises or is selected from fluoride, chloride, bromide, iodide, sulfate, bisulfate, fluorosulfate, phosphate, fluorophosphate, triflate, mesylate, tosylate, thiosulfate, $C_1$-$C_{10}$ alkyl sulfonate, $C_6$-$C_{14}$ aryl sulfonate, trifluoroacetate, fluoroborate, fluorozirconate, fluorotitanate, or any combination thereof.

29. A catalyst composition, a method of making a catalyst composition, or a process for polymerizing olefins according to any one of Aspects 2-27, wherein the solid oxide treated with an electron-withdrawing anion is generated by treatment of a solid oxide with sulfuric acid, sulfate ion, bisulfate ion, fluorosulfuric acid, fluorosulfate ion, phosphoric acid, phosphate ion, fluorophosphoric acid, monofluorophosphate ion, triflic (trifluoromethanesulfonic) acid, triflate trifluoromethanesulfonate) ion, methanesulfonic acid, mesylate (methanesulfonate) ion, toluenesulfonic acid, tosylate (toluenesulfonate) ion, thiosulfate ion, $C_1$-$C_{10}$ alkyl sulfonic acid, $C_1$-$C_{10}$ alkyl sulfonate ion, $C_6$-$C_{14}$ aryl sulfonic acid, $C_6$-$C_{14}$ aryl sulfonate ion, fluoride ion, chloride ion, or any combination thereof.

30. A catalyst composition, a method of making a catalyst composition, or a process for polymerizing olefins according to any one of Aspects 2-25, wherein:
  a) the solid oxide comprises, consists of, consists essentially of, or is selected from alumina, silica-alumina, silica-coated alumina, or a mixture thereof, and
  b) the electron-withdrawing anion comprises, consists of, consists essentially of, or is selected from fluoride, sulfate, or phosphate.

31. A catalyst composition, a method of making a catalyst composition, or a process for polymerizing olefins according to any one of Aspects 2-25, the solid oxide treated with an electron withdrawing anion comprises a fluorided silica-coated alumina (mullite).

32. A catalyst composition, a method of making a catalyst composition, or a process for polymerizing olefins according to any one of Aspects 2-25, wherein the solid oxide treated with an electron-withdrawing anion is produced by a process comprising contacting any suitable solid oxide and any suitable solid oxide with an electron-withdrawing anion to provide a mixture, and concurrently and/or subsequently drying and/or calcining the mixture.

33. A catalyst composition, a method of making a catalyst composition, or a process for polymerizing olefins according to any one of Aspects 2-32, wherein the solid oxide treated with an electron withdrawing anion has a surface area from about 100 m$^2$/g to about 1000 m$^2$/g, a pore volume from about 0.25 mL/g to about 3.0 mL/g, and an average particle size from about 5 microns to about 150 microns.

34. A catalyst composition, a method of making a catalyst composition, or a process for polymerizing olefins according to any one of Aspects 2-33, wherein the solid oxide treated with an electron withdrawing anion has a pore volume from about 0.5 mL/g to about 2.5 mL/g.

35. A catalyst composition, a method of making a catalyst composition, or a process for polymerizing olefins according to any one of Aspects 2-33, wherein the solid oxide treated with an electron withdrawing anion has a surface area from about 150 m$^2$/g to about 700 m$^2$/g.

36. A catalyst composition, a method of making a catalyst composition, or a process for polymerizing olefins according to any one of Aspects 2-35, wherein the co-catalyst is present.

37. A catalyst composition, a method of making a catalyst composition, or a process for polymerizing olefins according to any one of Aspects 2-35, wherein the co-catalyst is absent.

38. A catalyst composition, a method of making a catalyst composition, or a process for polymerizing olefins according to any one of Aspects 2-35, wherein the co-catalyst comprises an organoaluminum compound, an organoboron compound, an organozinc compound, an organomagnesium compound, or an organolithium compound.

39. A catalyst composition, a method of making a catalyst composition, or a process for polymerizing olefins according to any one of Aspects 2-35, wherein:
   a) the co-catalyst has a general formula:
      i) $M^3(X^{10})_n(X^{11})_{3-n}$, wherein $M^3$ is boron or aluminum and n is from 1 to 3 inclusive;
      ii) $M^4(X^{10})_n(X^{11})_{2-n}$, wherein $M^4$ is magnesium or zinc and n is from 1 to 2 inclusive; or
      iii) $M^5X^{10}$, wherein $M^5$ is Li;
   b) $X^{10}$ is independently hydride or a $C_1$ to $C_{20}$ hydrocarbyl; and
   c) $X^{11}$ is independently a halide, a hydride, a $C_1$ to $C_{20}$ hydrocarbyl, or a $C_1$ to $C_{20}$ hydrocarbyloxide.

40. A catalyst composition, a method of making a catalyst composition, or a process for polymerizing olefins according to any one of Aspects 2-35, wherein the co-catalyst comprises, consists of, consists essentially of, or is selected from an organoaluminum compound, wherein the organoaluminum compound comprises trimethylaluminum, triethylaluminum, tri-n-propylaluminum, tri-n-butylaluminum, tri-isobutylaluminum, tri-n-hexylaluminum, tri-n-octylaluminum, diisobutylaluminum hydride, diethylaluminum ethoxide, diethylaluminum chloride, or any combination thereof.

41. A catalyst composition, a method of making a catalyst composition, or a process for polymerizing olefins according to any one of Aspects 2-35, wherein the co-catalyst comprises, consists of, consists essentially of, or is selected from any organoaluminum compound having a formula $Al(X^{12})_s(X^{13})_{3-s}$, wherein $X^{12}$ is independently a $C_1$ to $C_{12}$ hydrocarbyl, $X^{11}$ is independently a halide, a hydride, or a $C_1$ to $C_{12}$ hydrocarboxide, and s is an integer from 1 to 3 (inclusive).

42. A catalyst composition, a method of making a catalyst composition, or a process for polymerizing olefins according to any one of Aspects 2-35, wherein the catalyst composition is substantially free of aluminoxane compounds, organoboron or organoborate compounds, ionizing ionic compounds, or combinations thereof.

43. A catalyst composition, a method of making a catalyst composition, or a process for polymerizing olefins according to any one of Aspects 2-35, wherein the catalyst composition is substantially free of aluminoxane compounds.

44. A catalyst composition, a method of making a catalyst composition, or a process for polymerizing olefins according to any one of Aspects 2-35, wherein the activator comprises, consists of, consists essentially of, or is selected from an aluminoxane compound.

45. A catalyst composition, a method of making a catalyst composition, or a process for polymerizing olefins according to any one of Aspects 2-35, wherein the activator comprises, consists of, consists essentially of, or is selected from an aluminoxane having the formula $(R^C$—Al—$O)_t$ or $R^C(R^C$—Al—$O)_tAl(R^C)_2$, wherein $R^C$ is a linear or branched $C_1$-$C_6$ alkyl such as methyl, ethyl, propyl, butyl, pentyl, or hexyl wherein t is an integer from 1 to 50, inclusive.

46. A catalyst composition, a method of making a catalyst composition, or a process for polymerizing olefins according to any one of Aspects 2-35, wherein activator comprises, consists of, consists essentially of, or is selected from methylaluminoxane (MAO), ethylaluminoxane, modified methylaluminoxane (MMAO) such as an isobutyl-modified methyl alumoxane, n-propylaluminoxane, iso-propylaluminoxane, n-butylaluminoxane, t-butylaluminoxane, sec-butylaluminoxane, iso-butylaluminoxane, t-butyl aluminoxane, 1-pentylaluminoxane, 2-pentylaluminoxane, 3-pentylaluminoxane, iso-pentylaluminoxane, neopentylaluminoxane, or combinations thereof.

47. A catalyst composition, a method of making a catalyst composition, or a process for polymerizing olefins according to any one of Aspects 2-46, wherein the catalyst composition further comprises a diluent or wherein the contacting step comprises contacting the recited elements in a diluent.

48. A catalyst composition, a method of making a catalyst composition, or a process for polymerizing olefins according to Aspect 47, wherein the diluent comprises any suitable non-protic solvent, or any non-protic solvent disclosed herein.

49. A catalyst composition, a method of making a catalyst composition, or a process for polymerizing olefins according to Aspect 47, wherein the diluent comprises any suitable aliphatic hydrocarbon solvent, or any aliphatic hydrocarbon solvent disclosed herein, e.g. at least one olefin monomer in the case of bulk polymerizations, propane, butanes (for example, n-butane, iso-butane), pentanes (for example, n-pentane, iso-pentane), hexanes, heptanes, octanes, petroleum ether, light naphtha, heavy naphtha, or any combination thereof.

50. A catalyst composition, a method of making a catalyst composition, or a process for polymerizing olefins according to Aspect 47, wherein the diluent comprises any suitable aromatic hydrocarbon solvent, or any aromatic hydrocarbon solvent disclosed herein, e.g., benzene, xylene, toluene, etc.

51. A catalyst composition, a method of making a catalyst composition, or a process for polymerizing olefins according to any one of Aspects 2-50, wherein any or all of the recited components are contacted in the presence of an olefin.

52. A catalyst composition, a method of making a catalyst composition, or a process for polymerizing olefins according to any one of Aspects 2-51, wherein the at least one olefin monomer comprises ethylene or ethylene in combination with an olefin co-monomer selected from propylene, butene (e.g., 1-butene), pentene, hexene (e.g., 1-hexene), heptene, octene (e.g., 1-octene), styrene, and the like.

53. A catalyst composition, a method of making a catalyst composition, or a process for polymerizing olefins according to any one of Aspects 2-51, wherein the at least one olefin monomer comprises ethylene, propylene, butene (e.g., 1-butene), pentene, hexene (e.g., 1-hexene), heptene, octene (e.g., 1-octene), styrene, and the like.

54. A catalyst composition, a method of making a catalyst composition, or a process for polymerizing olefins according to any one of Aspects 2-53, wherein the solid oxide treated with an electron withdrawing anion has any of the following properties:
a) a surface area from about 100 m$^2$/g to about 1000 m$^2$/g;
b) a pore volume from about 0.25 mL/g to about 3.0 mL/g;
c) an average particle size from about 5 microns to about 150 microns; or
d) any combination thereof.

55. A catalyst composition, a method of making a catalyst composition, or a process for polymerizing olefins according to any one of Aspects 2-54, the at least one olefin monomer and the catalyst composition are contacted under any of following conditions:
a) the molar ratio of the co-catalyst to the metallocene is from about 20:1 to about 500:1;
b) the weight ratio of the activator-support to the metallocene is from about 5:1 to about 1,000:1; and/or
c) the weight ratio of the at least one olefin monomer to the metallocene is from about 1,000:1 to about 100,000,000:1; or
d) any combination thereof.

56. A process for polymerizing olefins according to any one of Aspects 4-55, wherein the process is conducted in a polymerization reactor system comprising a batch reactor, a slurry reactor, a loop-slurry reactor, a gas phase reactor, a solution reactor, a high pressure reactor, a tubular reactor, an autoclave reactor, a continuous stirred tank reactor (CSTR), or a combination thereof.

57. A process for polymerizing olefins according to any one of Aspects 4-56, wherein the polymerization conditions suitable to form a polyethylene comprises a polymerization reaction temperature from about 50° C. to about 160° C. and a reaction pressure from about 100 psig to about 1000 psig (about 1.4 to about 6.9 MPa).

58. A catalyst composition according to any one of Aspects 4-57, wherein the catalyst is characterized by a total activator-support activity in a range from about 20 g/g·h (grams polyethylene per gram of activator-support per hour) to about 8,000 g/g·h.

59. A catalyst composition according to any one of Aspects 4-57, wherein the catalyst is characterized by a total metallocene activity in a range from about 30,000 g/g·h (grams polyethylene per gram of metallocene per hour) to about 1,500,000 g/g·h.

60. An olefin polymer produced by the process for polymerizing olefins of any one of Aspects 4-59.

61. An article comprising the olefin polymer according to Aspect 60.

62. An article according to Aspect 61, wherein the article is an agricultural film, an automobile part, a bottle, a drum, a fiber, a fabric, a food packaging film or container, a container preform, a food service article, a fuel tank, a geomembrane, a household container, a liner, a molded product, a medical device or material, a pipe, a sheet or tape, or a toy.

63. A method for making an article of manufacture comprising an olefin polymer, the method comprising:

a) performing the olefin polymerization process according to any one of Aspects 4-57; and
b) fabricating the article of manufacture comprising the olefin polymer.

We claim:
1. A metallocene compound having the formula:

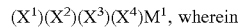

$M^1$ is titanium, zirconium, or hafnium;
$X^1$ is a substituted or an unsubstituted fluorenyl ligand, wherein the substituent is selected independently from a $C_1$ to $C_{12}$ hydrocarbyl or a $C_1$ to $C_{12}$ heterohydrocarbyl;
$X^2$ is a cyclopentadienyl ligand substituted with a $C_2$-$C_{18}$ heterohydrocarbyl group comprising an oxygen atom positioned 5 atoms distance or less from the cyclopentadienyl ligand;
wherein $X^1$ and $X^2$ are bridged by a linking group of the formula >$ER^1R^2$, wherein E is C or Si, $R^1$ is hydrogen or a $C_1$-$C_{12}$ hydrocarbyl group, and $R^2$ is a $C_3$-$C_{12}$ alkenyl group having a terminal C=C double bond; and
$X^3$ and $X^4$ are independently selected from a halide, hydride, a $C_1$-$C_{20}$ hydrocarbyl group, a $C_1$-$C_{20}$ heterohydrocarbyl group, tetrahydroborate, or $OBR^4{}_2$ or $OSO_2R^4$ wherein $R^4$ is independently a $C_1$-$C_{12}$ hydrocarbyl group.

2. A metallocene according to claim 1, wherein $X^1$ is a 2,7-dihydrocarbyl-substituted fluorenyl ligand, wherein each hydrocarbyl is selected independently from a $C_1$ to $C_8$ hydrocarbyl or a $C_1$ to $C_8$ heterohydrocarbyl.

3. A metallocene according to claim 1, wherein the heterohydrocarbyl group of $X^2$ is selected from $[CH_2]_nOR^3$, wherein n is selected from an integer from 1 to 4 and $R^3$ is selected from a $C_1$-$C_{12}$ hydrocarbyl group or a $C_1$-$C_{12}$ heterohydrocarbyl group.

4. A metallocene according to claim 1, wherein the heterohydrocarbyl group of $X^2$ is selected from $[CH_2]_nOCH_3$, $[CH_2]_nOCH_2CH_3$, $[CH_2]_nOC_6H_5$, $[CH_2]_nOC_6H_4$-4-$CH_3$, or $[CH_2]_nOC_6H_4$-4-$OCH_3$, wherein n is selected from an integer from 1 to 4.

5. A metallocene according to claim 1, wherein the oxygen atom of $X^2$ is positioned 5 atoms distance from the cyclopentadienyl ligand.

6. A metallocene according to claim 1, wherein the oxygen atom of $X^2$ is positioned 4 atoms distance from the cyclopentadienyl ligand.

7. A metallocene according to claim 1, wherein the oxygen atom of $X^2$ is positioned 3 atoms distance from the cyclopentadienyl ligand.

8. A metallocene according to claim 1, wherein linking group of the formula $ER^1R^2$ is selected from >CH[(CH$_2$)$_2$CH=CH$_2$], >C(CH$_3$)[(CH$_2$)$_2$CH=CH$_2$], >C(C$_6$H$_5$)[(CH$_2$)$_2$CH=CH$_2$], >SiH[(CH$_2$)$_2$CH=CH$_2$], >Si(CH$_3$)[(CH$_2$)$_2$CH=CH$_2$], >Si(C$_6$H$_5$)[(CH$_2$)$_2$CH=CH$_2$], >CH[(CH$_2$)$_3$CH=CH$_2$], >C(CH$_3$)[(CH$_2$)$_3$CH=CH$_2$], >C(C$_6$H$_5$)[(CH$_2$)$_3$CH=CH$_2$], >SiH[(CH$_2$)$_3$CH=CH$_2$], >Si(CH$_3$)[(CH$_2$)$_3$CH=CH$_2$], or >Si(C$_6$H$_5$)[(CH$_2$)$_3$CH=CH$_2$].

9. A metallocene according to claim 1, wherein linking group of the formula $ER^1R^2$ is selected from >C(CH$_3$)[(CH$_2$)$_2$CH=CH$_2$] or >C(CH$_3$)[(CH$_2$)$_3$CH=CH$_2$].

10. A metallocene according to claim 1, wherein $X^3$ and $X^4$ are independently selected from F, Cl, Br, a hydride, a $C_1$-$C_{12}$ hydrocarbyl group, a $C_1$-$C_{12}$ hydrocarbyloxide group, a $C_1$-$C_{12}$ hydrocarbylamino group, or a trihydrocarbylsilyl group wherein each hydrocarbyl is independently a $C_1$-$C_{12}$ hydrocarbyl group.

11. A metallocene according to claim 1, wherein the metallocene compound is selected from:

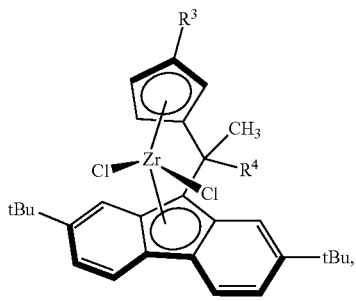

wherein
R³ is selected from [CH₂]ₙOCH₃, [CH₂]ₙOCH₂CH₃, [CH₂]ₙOC₆H₅, [CH₂]ₙOC₆H₄-4-CH₃, or [CH₂]ₙOC₆H₄-4-OCH₃, wherein n is selected from an integer from 1 to 4, and R⁴ is selected from —[(CH₂)ₘCH═CH₂] wherein m is an integer from 1 to 4.

12. A metallocene according to claim 1, wherein the metallocene compound is selected from:

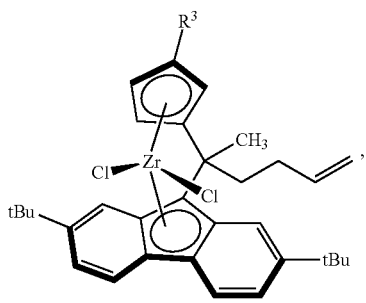

wherein
R³ is selected from [CH₂]ₙOCH₃ or [CH₂]ₙOC₆H₅, wherein n is selected from an integer from 2 to 4.

13. A metallocene according to claim 1, wherein the metallocene compound has the formula:

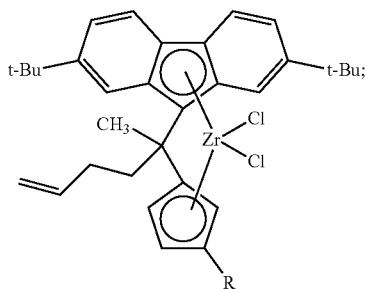

wherein
R is CH₂CH₂OCH₃.

14. A catalyst composition for polymerizing olefins, the catalyst composition comprising:
a) a metallocene compound according to claim 1;
b) optionally, a co-catalyst comprising an organoaluminum compound, an organoboron compound, an organozinc compound, an organomagnesium compound, an organolithium compound, or any combination thereof; and
c) an activator comprising a solid oxide treated with an electron-withdrawing anion (activator-support), an organoboron compound, an organoborate compound, an ionizing ionic compound, an aluminoxane compound, or any combination thereof.

15. A catalyst composition according to claim 14, wherein the activator comprises a solid oxide treated with an electron-withdrawing anion, and wherein:
the solid oxide comprises silica, alumina, titania, zirconia, magnesia, boria, calcia, zinc oxide, silica-alumina, silica-coated alumina, silica-titania, silica-zirconia, silica-magnesia, alumina-titania, alumina-zirconia, zinc-aluminate, alumina-boria, silica-boria, aluminum phosphate, aluminophosphate, aluminophosphate-silica, magnesium aluminate, titania-zirconia, boehmite, heteropolytungstates, mixed oxides thereof, or any combination thereof; and
the electron-withdrawing anion comprises fluoride, chloride, bromide, iodide, sulfate, bisulfate, fluorosulfate, phosphate, fluorophosphate, triflate, mesylate, tosylate, thiosulfate, $C_1$-$C_{10}$ alkyl sulfonate, $C_6$-$C_{14}$ aryl sulfonate, trifluoroacetate, fluoroborate, fluorozirconate, fluorotitanate, or any combination thereof.

16. A catalyst composition according to claim 14, wherein:
a) the solid oxide comprises alumina, silica-alumina, silica-coated alumina, or a mixture thereof, and
b) the electron-withdrawing anion comprises fluoride, sulfate, or phosphate.

17. A catalyst composition according to claim 14, wherein the activator comprises a solid oxide treated with an electron-withdrawing anion selected from fluorided alumina, fluorided silica, fluorided silica-alumina, or fluorided silica-coated alumina (mullite).

18. A catalyst composition according to claim 14, wherein:
the optional co-catalyst has a general formula:
i) $M^3(X^{10})_n(X^{11})_{3-n}$, wherein $M^3$ is boron or aluminum and n is from 1 to 3 inclusive;
ii) $M^4(X^{10})_n(X^{11})_{2-n}$, wherein $M^4$ is magnesium or zinc and n is from 1 to 2 inclusive; or
iii) $M^5X^{10}$, wherein $M^5$ is Li;
wherein $X^{10}$ is independently hydride or a $C_1$ to $C_{20}$ hydrocarbyl; and
$X^{11}$ is independently a halide, a hydride, a $C_1$ to $C_{20}$ hydrocarbyl, or a $C_1$ to $C_{20}$ hydrocarbyloxide.

19. A catalyst composition according to claim 14, wherein the optional co-catalyst comprises trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, or any combination thereof.

20. A process for polymerizing olefins, the process comprising contacting at least one olefin monomer and the catalyst composition according to claim 14 under polymerization conditions to form an olefin polymer, wherein the at least one olefin monomer comprises ethylene or ethylene in combination with an olefin co-monomer selected from propylene, butene, pentene, hexene, heptene, octene, styrene, or a combination thereof.

21. A metallocene according to claim 1, wherein the metallocene compound has the formula:

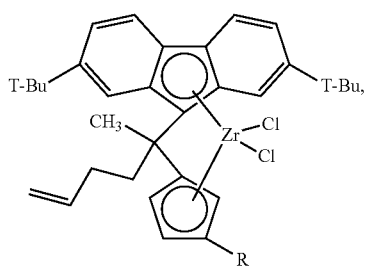

wherein
R is $CH_2CH_2CH_2OCH_3$.

22. A metallocene according to claim 1, wherein the metallocene compound has the formula:

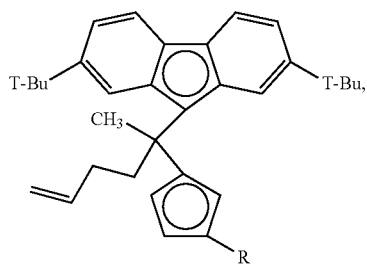

wherein
$R^3$ is $CH_2CH_2CH_2CH_2OCH_3$.

23. A metallocene according to claim 1, wherein the metallocene compound has the formula:

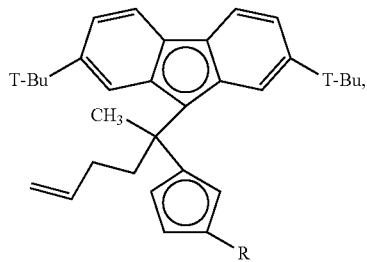

wherein
$R^3$ is $CH_2CH_2OC_6H_5$.

24. A metallocene according to claim 1, wherein the metallocene compound has the formula:

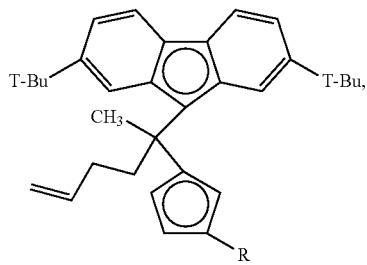

wherein
$R^3$ is $CH_2CH_2CH_2OC_6H_5$.

25. A metallocene according to claim 1, wherein the metallocene compound has the formula:

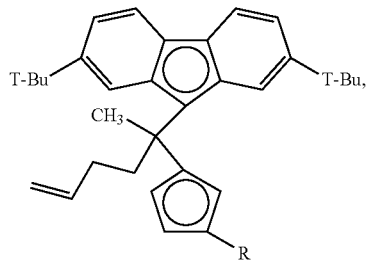

wherein
$R^3$ is $CH_2CH_2CH_2CH_2OC_6H_5$.

26. A metallocene according to claim 1, wherein the metallocene compound has the formula:

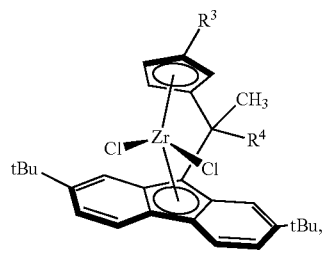

wherein
$R^3$ is $CH_2CH_2OC_6H_5$, and $R^4$ is $-[(CH_2)_3CH=CH_2]$.

27. A metallocene according to claim 1, wherein the metallocene compound has the formula:

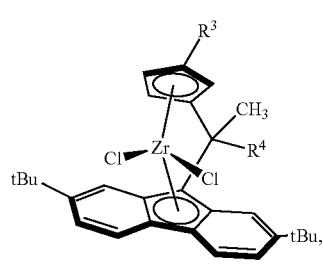

wherein
$R^3$ is $CH_2CH_2CH_2OC_6H_5$, and $R^4$ is $-[(CH_2)_3CH=CH_2]$.

* * * * *